US010310193B2

(12) United States Patent
Pepe et al.

(10) Patent No.: US 10,310,193 B2
(45) Date of Patent: Jun. 4, 2019

(54) OPTICAL WAVEGUIDE MODULE SYSTEM AND METHOD

(71) Applicant: CommScope Technologies LLC, Hickory, NC (US)

(72) Inventors: Paul John Pepe, Clemmons, NC (US); Joseph Christopher Coffey, Burnsville, MN (US)

(73) Assignee: CommScope Technologies LLC, Hickory, NC (US)

( * ) Notice: Subject to any disclaimer, the term of this patent is extended or adjusted under 35 U.S.C. 154(b) by 32 days.

(21) Appl. No.: 15/808,626

(22) Filed: Nov. 9, 2017

(65) Prior Publication Data
US 2018/0128994 A1 May 10, 2018

Related U.S. Application Data

(62) Division of application No. 14/775,035, filed as application No. PCT/US2014/024657 on Mar. 12, 2014, now Pat. No. 9,846,283.
(Continued)

(51) Int. Cl.
*G02B 6/24* (2006.01)
*G02B 6/38* (2006.01)
(Continued)

(52) U.S. Cl.
CPC .............. *G02B 6/3879* (2013.01); *G02B 6/30* (2013.01); *G02B 6/3825* (2013.01);
(Continued)

(58) Field of Classification Search
CPC ............. G02B 6/00; G02B 6/30; G02B 6/302
(Continued)

(56) References Cited

U.S. PATENT DOCUMENTS 4,186,997 A 2/1980 Schumacher
5,121,454 A * 6/1992 Iwano .................. G02B 6/3807
385/56
(Continued)

FOREIGN PATENT DOCUMENTS

EP 1939658 2/2008
GB 2 376 756 A 12/2002
(Continued)

OTHER PUBLICATIONS

"International Search Report for International Application No. PCT/US2014/024657 dated Aug. 18, 2014 (2 pages)".
(Continued)

*Primary Examiner* — Kaveh C Kianni
(74) *Attorney, Agent, or Firm* — Merchant & Gould P.C.

(57) ABSTRACT

The present disclosure relates to systems and methods for optically connecting circuit elements and optical fiber systems. In one embodiment, an optical waveguide module includes an optical light guide having opposite first and second planar surfaces extending between a first side edge and a second side edge. The optical light guide can be configured with a substrate supporting one or more optical pathways extending between the first and second side edges. The waveguide module can further include one or more first and second edge connectors, each of which has an adapter port and a first alignment slot opposite the adapter port. The alignment slots extend over the first and second planar surfaces at the first and second side edges to align the adapter ports with the one or more optical pathways in a first direction.

12 Claims, 50 Drawing Sheets

Related U.S. Application Data

(60) Provisional application No. 61/777,654, filed on Mar. 12, 2013, provisional application No. 61/878,388, filed on Sep. 16, 2013.

(51) Int. Cl.
  *G02B 6/30* (2006.01)
  *G02B 6/44* (2006.01)

(52) U.S. Cl.
  CPC ......... *G02B 6/3893* (2013.01); *G02B 6/3897* (2013.01); *G02B 6/3885* (2013.01); *G02B 6/4472* (2013.01)

(58) Field of Classification Search
  USPC .......................................................... 385/24
  See application file for complete search history.

(56) References Cited

U.S. PATENT DOCUMENTS

| | | | |
|---|---|---|---|
| 5,299,276 A | 3/1994 | Okamura et al. | |
| 5,414,786 A * | 5/1995 | Ohta | G02B 6/30 385/129 |
| 5,528,711 A * | 6/1996 | Iwano | G02B 6/3817 385/55 |
| 5,561,727 A * | 10/1996 | Akita | G02B 6/3897 361/785 |
| 5,611,010 A | 3/1997 | Shiino et al. | |
| 5,666,449 A | 9/1997 | Sawae et al. | |
| 5,673,346 A * | 9/1997 | Iwano | G02B 6/3817 385/60 |
| 5,694,506 A * | 12/1997 | Kobayashi | G02B 6/30 385/60 |
| 5,712,937 A * | 1/1998 | Asawa | G02B 6/12007 385/12 |
| 6,062,740 A | 5/2000 | Ohtuka et al. | |
| 6,359,789 B1 * | 3/2002 | Imabayashi | G02B 6/3897 361/730 |
| 6,477,290 B1 | 11/2002 | Wan et al. | |
| 6,501,869 B1 | 12/2002 | Athale | |
| 6,644,866 B1 * | 11/2003 | Kusuda | G02B 6/3879 385/136 |
| 6,905,256 B2 | 6/2005 | Morse et al. | |
| 6,920,268 B2 | 7/2005 | Kwon et al. | |
| 6,990,263 B2 | 1/2006 | Shimizu et al. | |
| 7,234,874 B2 | 6/2007 | Morse et al. | |
| 7,300,216 B2 | 11/2007 | Morse et al. | |
| 7,356,210 B2 | 4/2008 | Wong et al. | |
| 7,458,729 B2 | 12/2008 | Sasaki et al. | |
| 7,561,765 B2 | 7/2009 | Funabashi et al. | |
| 7,587,108 B2 | 9/2009 | Carpenter et al. | |
| 7,965,915 B2 | 6/2011 | Francis et al. | |
| 8,165,433 B2 | 4/2012 | Jenkins et al. | |
| 2002/0154879 A1 * | 10/2002 | Yasuda | G02B 6/2804 385/132 |
| 2003/0012544 A1 | 1/2003 | Matsumoto et al. | |
| 2003/0095758 A1 * | 5/2003 | Morse | G02B 6/30 385/89 |
| 2004/0105628 A1 * | 6/2004 | Morse | G02B 6/30 385/89 |
| 2005/0111782 A1 * | 5/2005 | Donval | G02B 6/264 385/16 |
| 2005/0123246 A1 * | 6/2005 | Morse | H01S 3/06704 385/53 |
| 2005/0141823 A1 * | 6/2005 | Han | G02B 6/4204 385/89 |
| 2006/0008199 A1 * | 1/2006 | Glebov | G02B 6/322 385/15 |
| 2006/0024012 A1 | 2/2006 | Yatsuda et al. | |
| 2007/0086707 A1 * | 4/2007 | Suzuki | G02B 6/255 385/58 |
| 2007/0196053 A1 * | 8/2007 | Kewitsch | G02B 6/3825 385/74 |
| 2008/0019642 A1 * | 1/2008 | Kewitsch | G02B 6/3825 385/72 |
| 2008/0199132 A1 * | 8/2008 | Pitwon | G02B 6/4249 385/53 |
| 2008/0205843 A1 * | 8/2008 | Castonguay | G02B 6/3897 385/135 |
| 2009/0060439 A1 * | 3/2009 | Cox | G02B 6/3897 385/135 |
| 2010/0008676 A1 * | 1/2010 | Kojima | G02B 6/4201 398/141 |
| 2010/0220957 A1 | 9/2010 | Asahi et al. | |
| 2010/0266235 A1 | 10/2010 | Lin et al. | |
| 2010/0316334 A1 * | 12/2010 | Kewitsch | G02B 6/3502 385/78 |
| 2011/0222823 A1 | 9/2011 | Pitwon | |
| 2012/0057836 A1 | 3/2012 | Andrezejewski et al. | |
| 2013/0198414 A1 * | 8/2013 | Julien | G02B 6/423 709/249 |
| 2014/0016901 A1 * | 1/2014 | Lambourn | G02B 6/3895 385/75 |
| 2014/0065570 A1 * | 3/2014 | Chen | A61N 5/0601 433/29 |
| 2014/0161402 A1 * | 6/2014 | Cunningham | G02B 6/4471 385/100 |
| 2014/0219615 A1 * | 8/2014 | Petersen | G02B 6/3817 385/88 |
| 2015/0207192 A1 * | 7/2015 | Privett | H01P 1/042 333/254 |
| 2015/0245530 A1 * | 8/2015 | Anderson | G02B 6/4452 361/679.02 |

FOREIGN PATENT DOCUMENTS

| | | |
|---|---|---|
| JP | 60-095409 A | 5/1985 |
| JP | H961663 | 3/1997 |
| JP | 10123373 | 5/1998 |
| JP | 2005-004014 A | 1/2005 |
| JP | 2007-025385 A | 2/2007 |
| JP | 2013-029624 A | 2/2013 |
| WO | 03065091 | 8/2003 |
| WO | 2010132391 A1 | 11/2010 |

OTHER PUBLICATIONS

"International Written Opinion for International Application No. PCT/US2014/024657 dated Aug. 14, 2014 (9 pages)".

"Extended European Search Report for European Patent Application No. 14779887.0 dated Sep. 20, 2016, 9 pages".

* cited by examiner

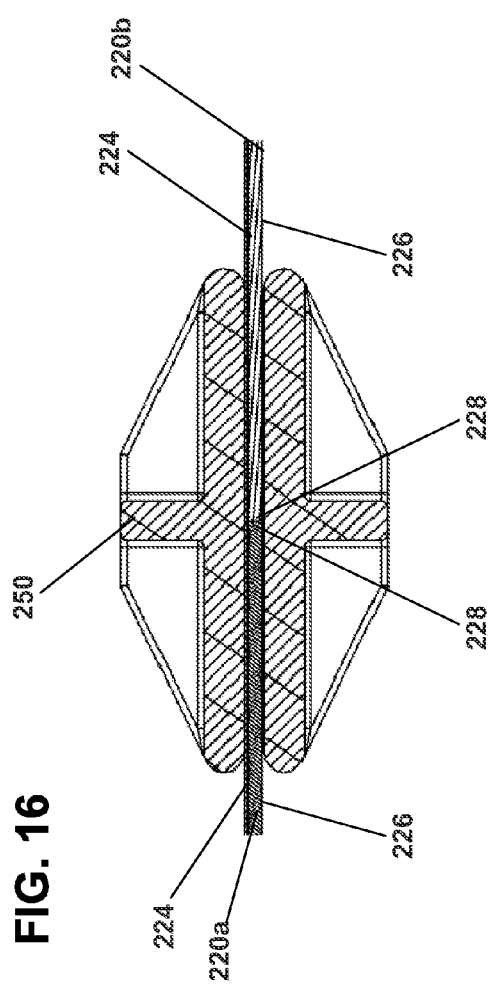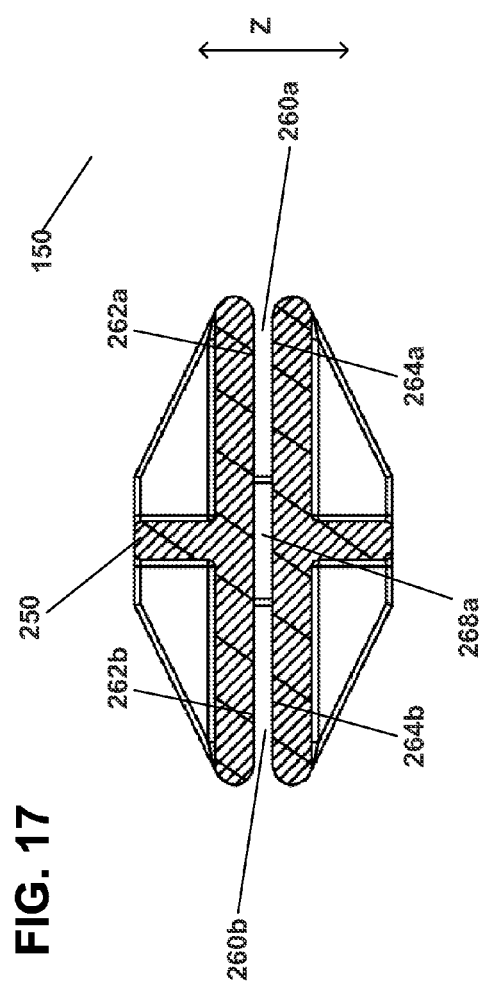

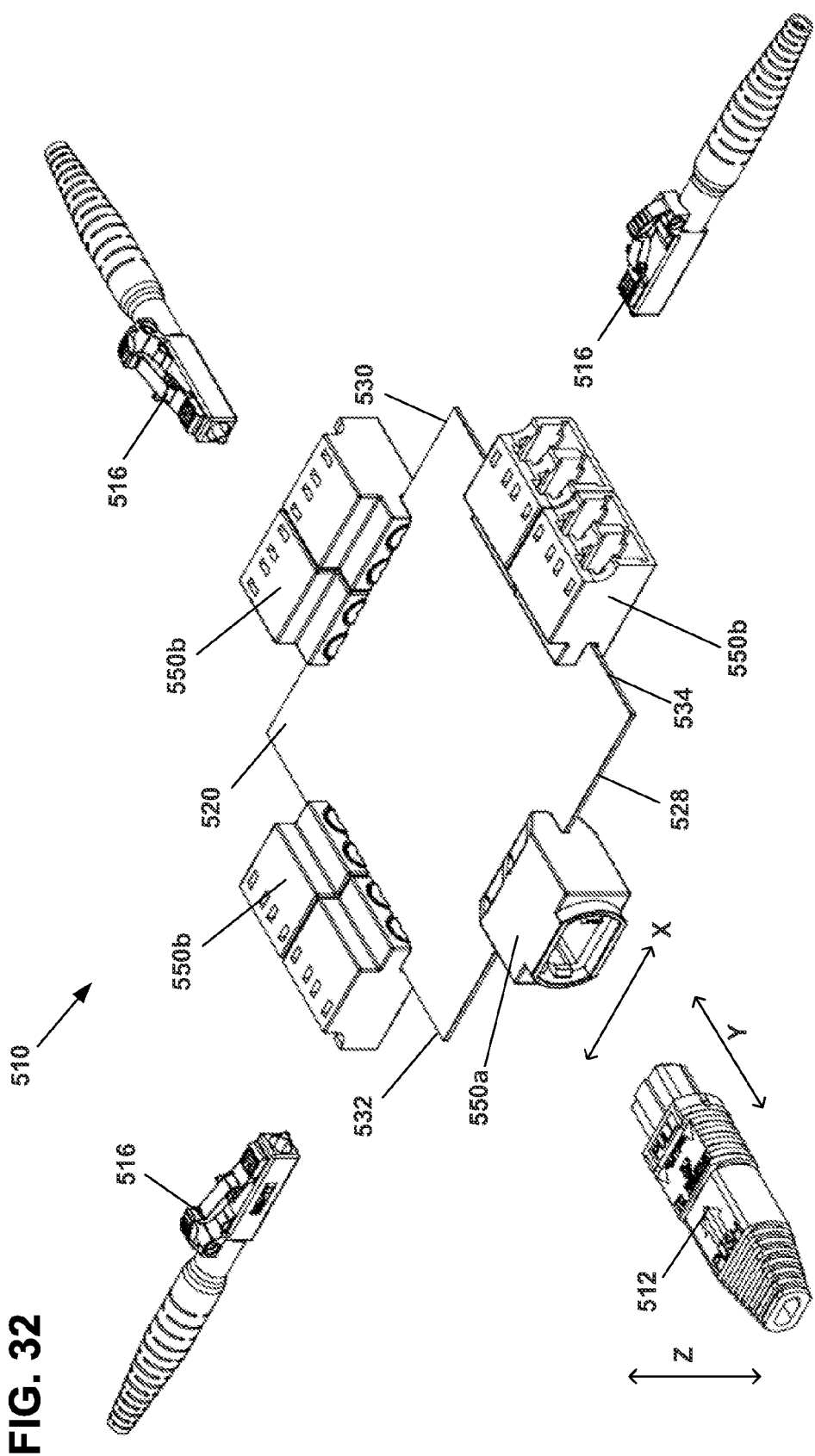

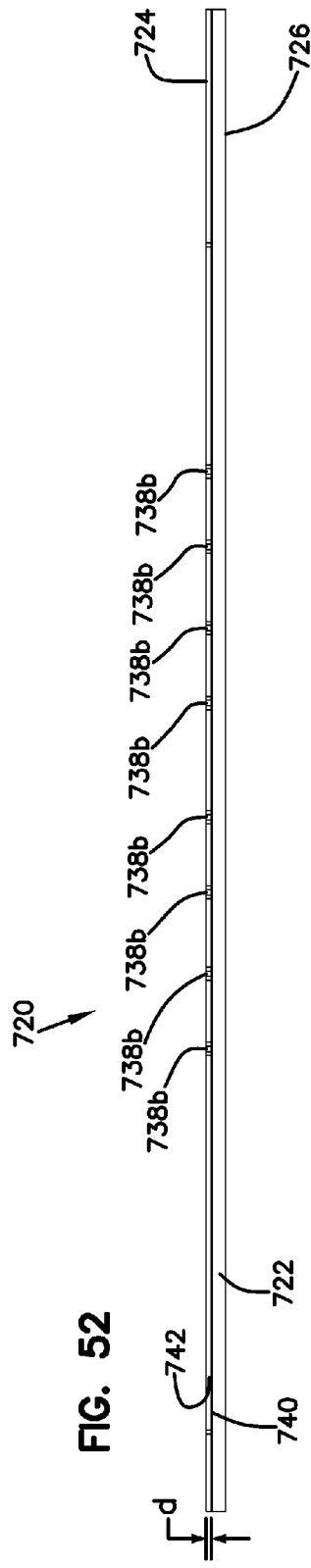
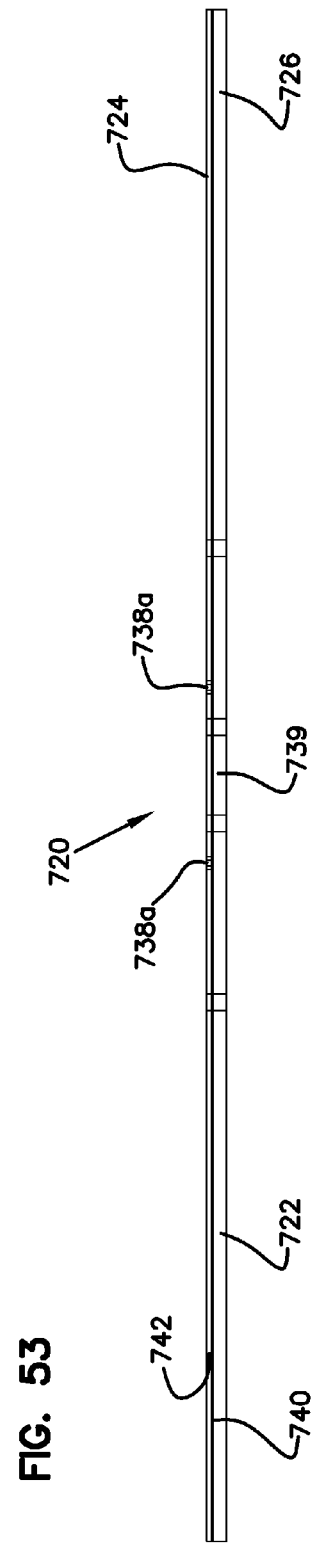

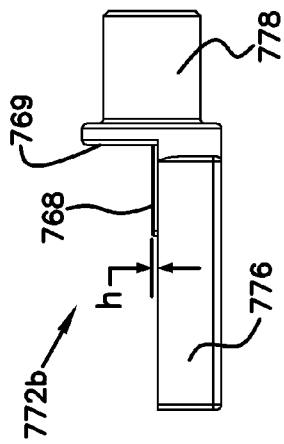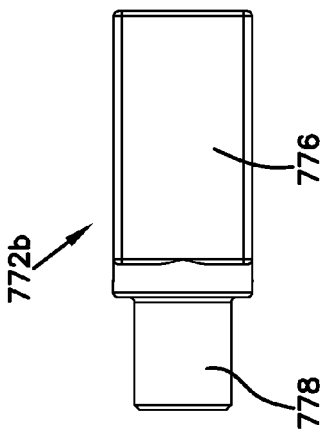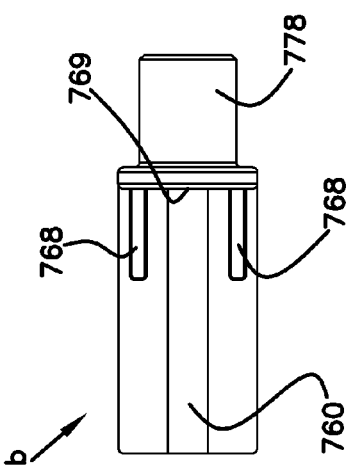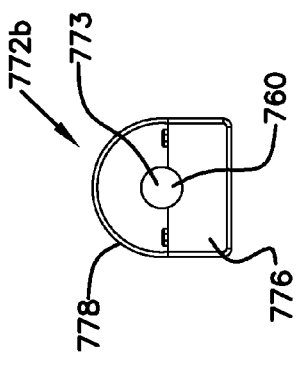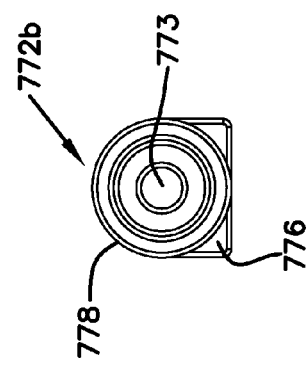

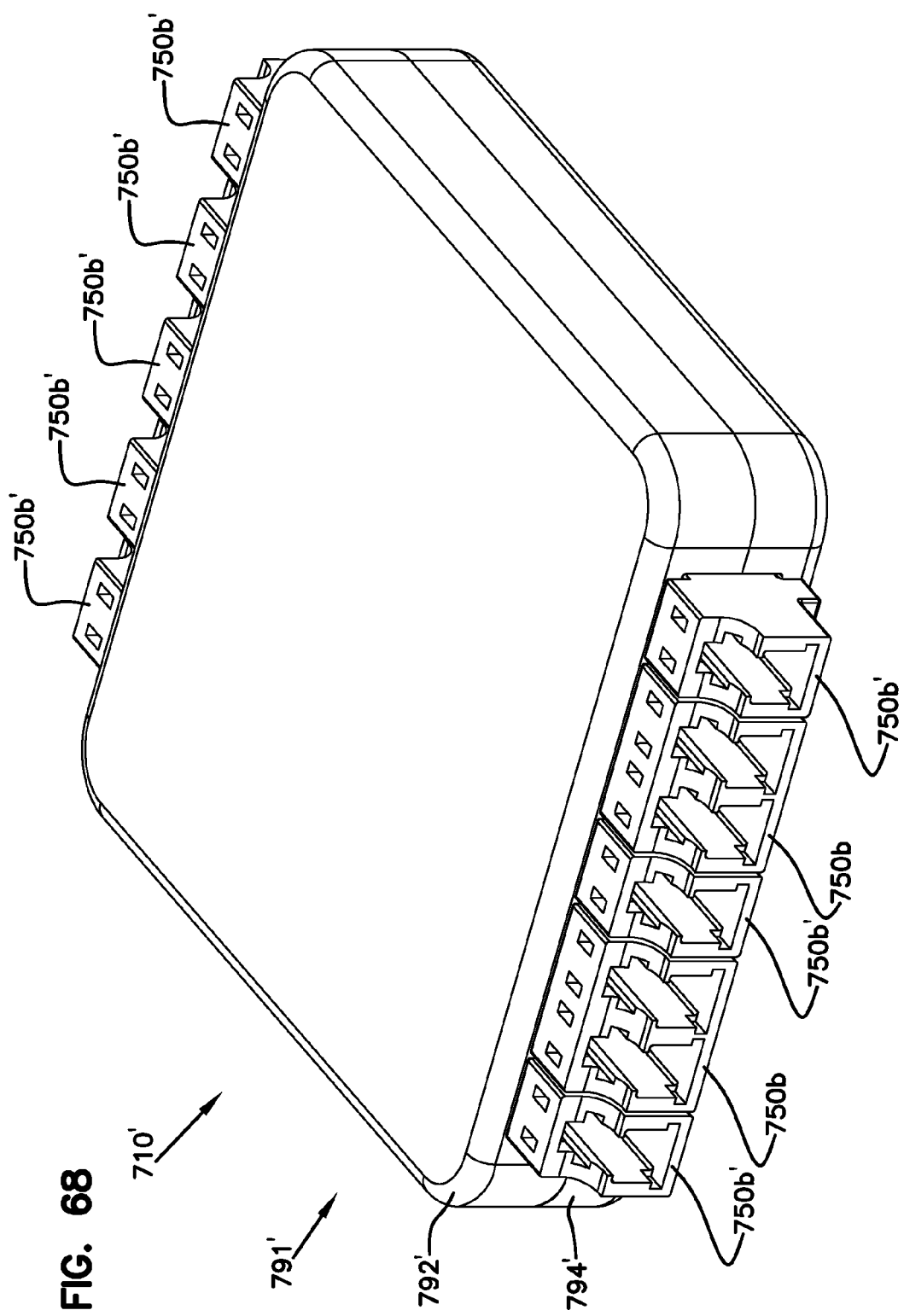

FIG. 73     FIG. 74
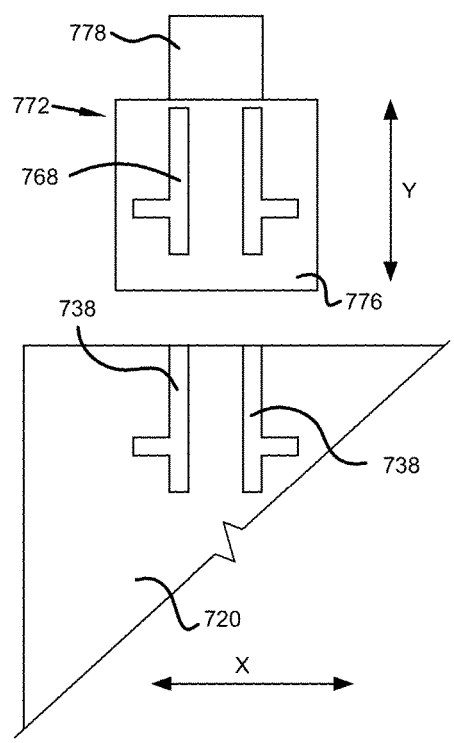
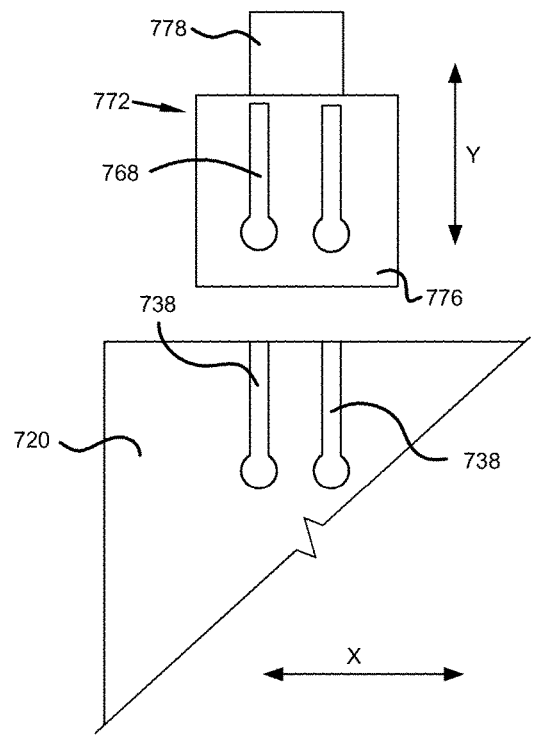

OPTICAL WAVEGUIDE MODULE SYSTEM AND METHOD

RELATED APPLICATIONS

This application is a Divisional Application of U.S. patent application Ser. No. 14/775,035, filed on 11 Sep. 2015, which is a National Stage of PCT International Patent application No. PCT/US2014/024657, filed on 12 Mar. 2014 and claims priority to U.S. Patent Application Ser. No. 61/777,654, filed on 12 Mar. 2013, and U.S. Patent Application Ser. No. 61/878,388, filed on 16 Sep. 2013 and which applications are incorporated here by reference. To the extent appropriate, a claim of priority is made to each of the above disclosed applications.

BACKGROUND

The present invention relates to systems and methods for optically connecting circuit elements in optical fiber systems. In some fiber optic systems, fiber optic cables are connected to one another through splices, or through connection systems including two connectors held in alignment by an adapter. Various connector and adapter formats are known including SC, LC, and MPO. SC and LC are single fiber formats. MPO connection systems are multiple fiber formats. There is a continuing need for connection systems for connecting fiber optic equipment.

SUMMARY

Optical waveguide modules are disclosed. In one embodiment, an optical waveguide module includes an optical light guide having opposite first and second planar surfaces extending between a first side edge and a second side edge. The optical light guide can be configured to include one or more optical pathways extending between the first and second side edges. The waveguide module can further include one or more first edge connectors, each of which has a first adapter port and a first alignment slot opposite the first adapter port. The first alignment slot extends over the optical light guide first and second planar surfaces at the first side edge to align the first adapter port with the one or more optical pathways in a first direction. The waveguide module can also include one or more second edge connectors, each of which has a second adapter port and a second alignment slot opposite the second adapter port wherein the second alignment slot extends over the optical light guide first and second planar surfaces at the second side edge to align the second adapter port with the one or more optical pathways in the first direction.

In one embodiment, the edge connectors include a first sleeve received within a cavity of a first body wherein the first body has a first adapter port. As presented, the first sleeve has a first alignment slot opposite the first adapter port, and the first alignment slot extends over the optical light guide first and second planar surfaces at the first side edge to align the first adapter port with the one or more optical pathways in the first direction. Likewise, the second edge connectors each have a second sleeve received within a cavity of a second body wherein the second body has a second adapter port. The second sleeve has a second alignment slot opposite the second adapter port. Also, the first alignment slot extends over the optical light guide first and second planar surfaces at the second side edge to align the second adapter port with the one or more optical pathways in the first direction.

In one embodiment, the optical waveguide module includes a first and second optical light guide. The first optical light guide can include first and second opposite surfaces extending between first and second opposite side edges wherein the optical light guide includes one or more first optical pathways extending between the first and second side edges. The second optical light guide can include first and second opposite surfaces extending between first and second opposite side edges wherein the second optical light guide supports one or more second optical pathways extending between the first and second side edges. A first edge coupler aligns the one or more first optical pathways of the first optical light guide with the one or more second optical pathways of the second optical light guide. In one embodiment, the first edge coupler has a first alignment slot and a second alignment slot opposite the first alignment slot. The first alignment slot extends over the first optical light guide first and second planar surfaces at the first side edge to align the first edge coupler with the one or more first optical pathways in a first direction. The second alignment slot extends over the second optical light guide first and second planar surfaces at the first side edge to align the first edge coupler with the one or more second optical pathways in the first direction.

Optical light guide edge protection features are provided in some examples. One example is in the form of an index matching film. Another example of a waveguide edge protection feature is in the form of a spaced end face.

Each of the described embodiments herein for the side edge connectors includes passive alignment features (e.g. alignment slots, tabs, notches, and protrusions), meaning that optical alignment between components is obtained by the passive alignment features without requiring measuring and adjusting the positions of the components after an initial alignment process. Furthermore, the fiber optic connectors (e.g. MPO, LC, etc.) and the disclosed side edge connectors can be easily and repeatedly connected and disconnected from each other without a loss in alignment and without requiring additional alignment steps.

BRIEF DESCRIPTION OF THE DRAWINGS

FIG. 16 shows a cross-sectional side view of the center portion of the waveguide module shown in FIG. 13.

FIG. 17 shows a cross-sectional side view of a side edge connector of the waveguide module shown in FIG. 13.

FIG. 32 shows a perspective view of a sixth embodiment of an assembled optical waveguide module having features that are examples of aspects in accordance with the principles of the present disclosure.

FIG. 52 shows a first end view of the optical light guide shown in FIG. 49.

FIG. 53 shows a second end view of the optical light guide shown in FIG. 49.

FIG. 56 shows a bottom view of the connector shown in FIG. 54.

FIG. 57 shows a top view of the connector shown in FIG. 54.

FIG. 58 shows a side view of the connector shown in FIG. 54.

FIG. 59 shows a first end view of the connector shown in FIG. 54.

FIG. 60 shows a second end view of the connector shown in FIG. 54.

FIG. 68 shows a perspective view of a ninth embodiment of an assembled optical waveguide module within a housing having features that are examples of aspects in accordance with the principles of the present disclosure.

FIG. 73 shows a schematic top view of a sleeve and optical light guide having a first alternative shape for the respective protrusions and notches described for the disclosed embodiments disclosed herein.

FIG. 74 shows a schematic top view of a sleeve and optical light guide having a second alternative shape for the respective protrusions and notches described for the embodiments disclosed herein.

DETAILED DESCRIPTION

Figure 1:
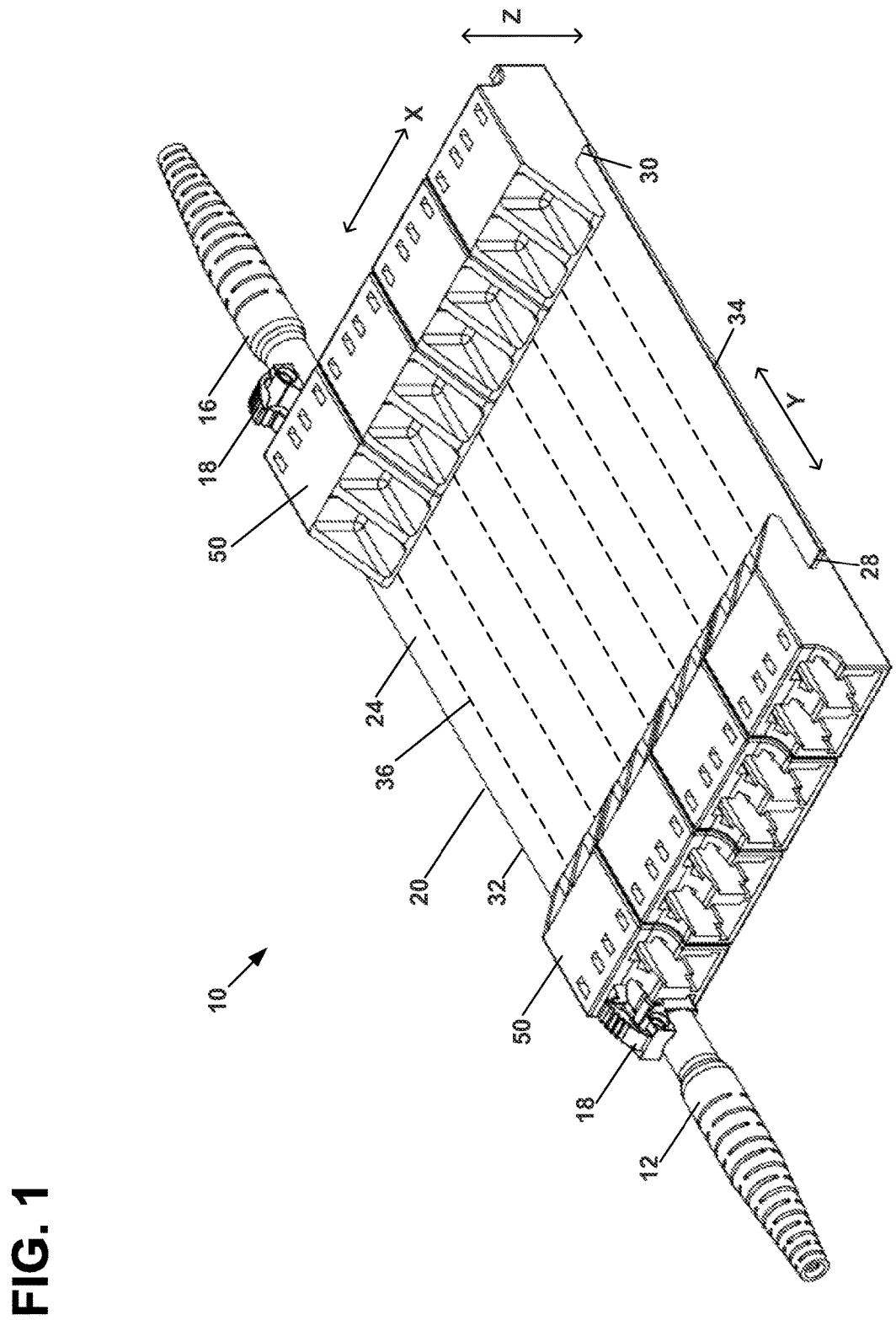
FIG. 1 shows a perspective view of an assembled and connected optical waveguide module having features that are examples of aspects in accordance with the principles of the present disclosure.
Figure 2:
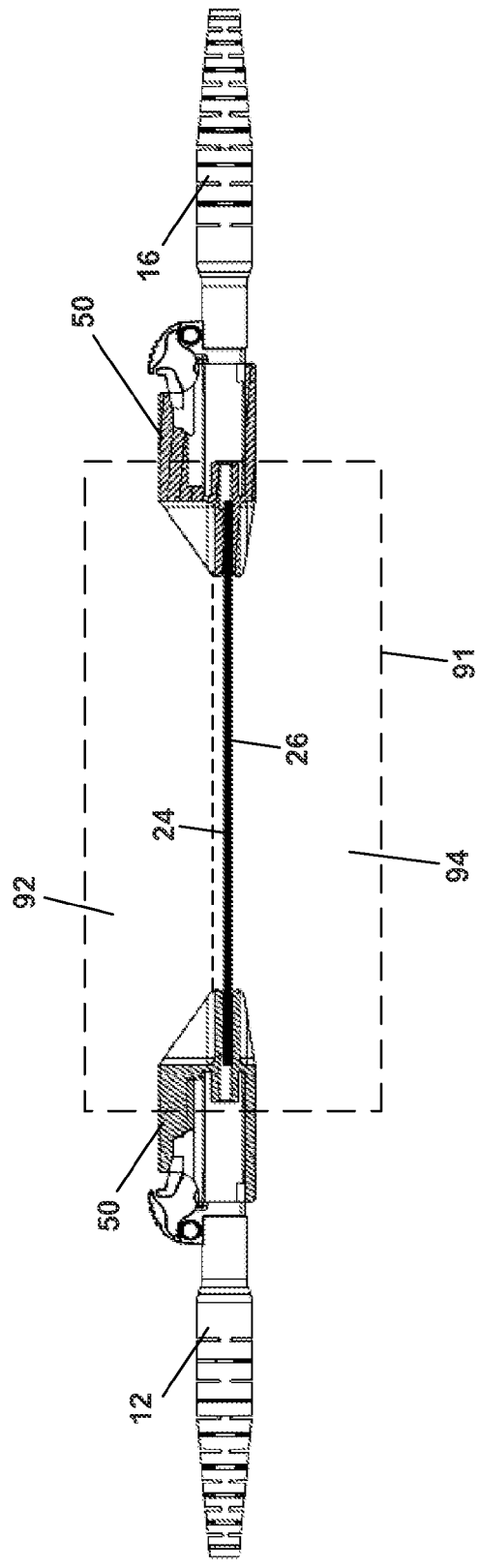
FIG. 2 shows a cross-sectional side view of the optical waveguide module shown in FIG. 1.
Figure 3:
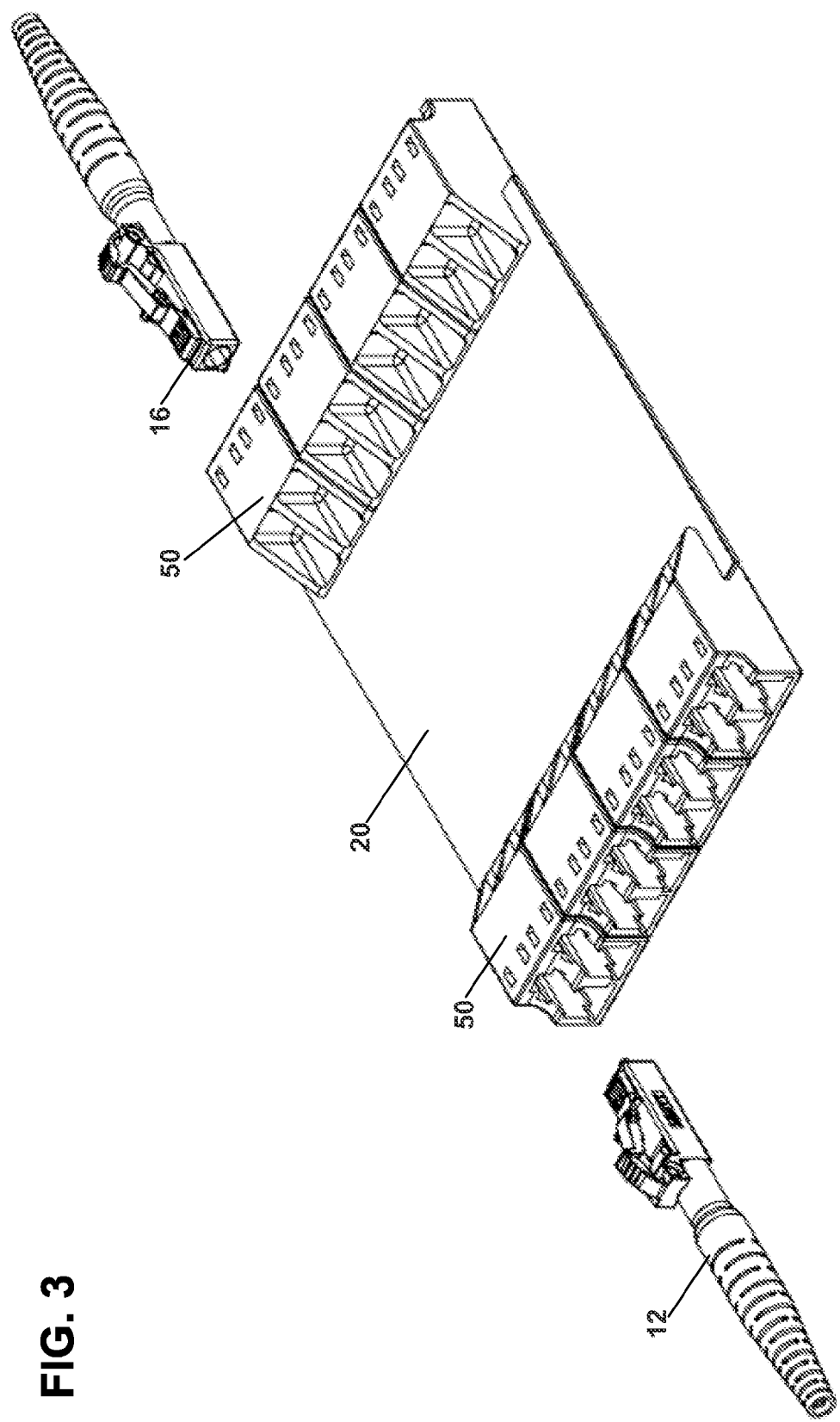
FIG. 3 shows a perspective view of the assembled optical waveguide module of FIG. 1 that is disconnected from the shown connectors.
Figure 4:
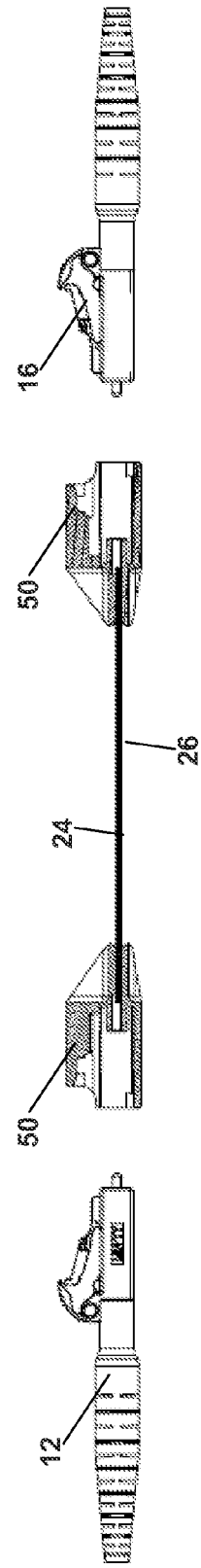
FIG. 4 shows a cross-sectional side view of the optical waveguide module shown in FIG. 3.

Non-limiting and non-exhaustive embodiments are described with reference to the following figures, which are not necessarily drawn to scale, wherein like reference numerals refer to like parts throughout the various views unless otherwise specified.

Referring now to FIGS. 1-7, a first example of an optical waveguide module 10 in accordance with the disclosure is presented. The optical waveguide module 10 operates as a passive interface with passive alignment features that allow fiber optic connectors, for example connectors 12, 16, to be placed in optical communication with each other.

As is discussed in greater detail below, this function is achieved through the use of a planar optical light guide 20 to which edge connectors 50 are attached. The edge connectors 50 each include one or more adapters to interface with an optical plug, such as LC-duplex, LC-simplex, MPO/MTP, or MT-RJ. Opposite the adapters, the connectors 50 will install along the edge of the planar optical light guide 20 and align to optical pathways 36 present on or within the light guide 20. The optical pathways 36 may be provided with different cross-sectional shapes, for example round and rectangular cross-sectional shapes. An optical signal is transmitted from a first edge connector 50 through an optical pathway 36 to a second edge connector 50. In one embodiment, the optical signal will remain passive within the modular unit 10.

As can be seen at FIGS. 2, 44-47, and 68-69 the various disclosed modules may be provided with a sealed clamshell housing. A housing 91 is shown schematically at FIG. 2, while exemplary housing embodiments 591, 791, and 791' are shown at FIGS. 44-45, 46-57, and 68-69, respectively. As shown, housing 91 has an upper half 92 and a lower half 94, while housing 591 likewise has an upper half 592 and a lower half 594. As shown, upper half 592 and lower half 594 are identically shaped, although this is not necessary. To enable the connectors to extend through the housing 591, the upper housing half 592 can be provided with notched openings 591a, 593a and the lower housing half can be likewise be provided with similar notched openings 591b, 593b.

Figure 44:
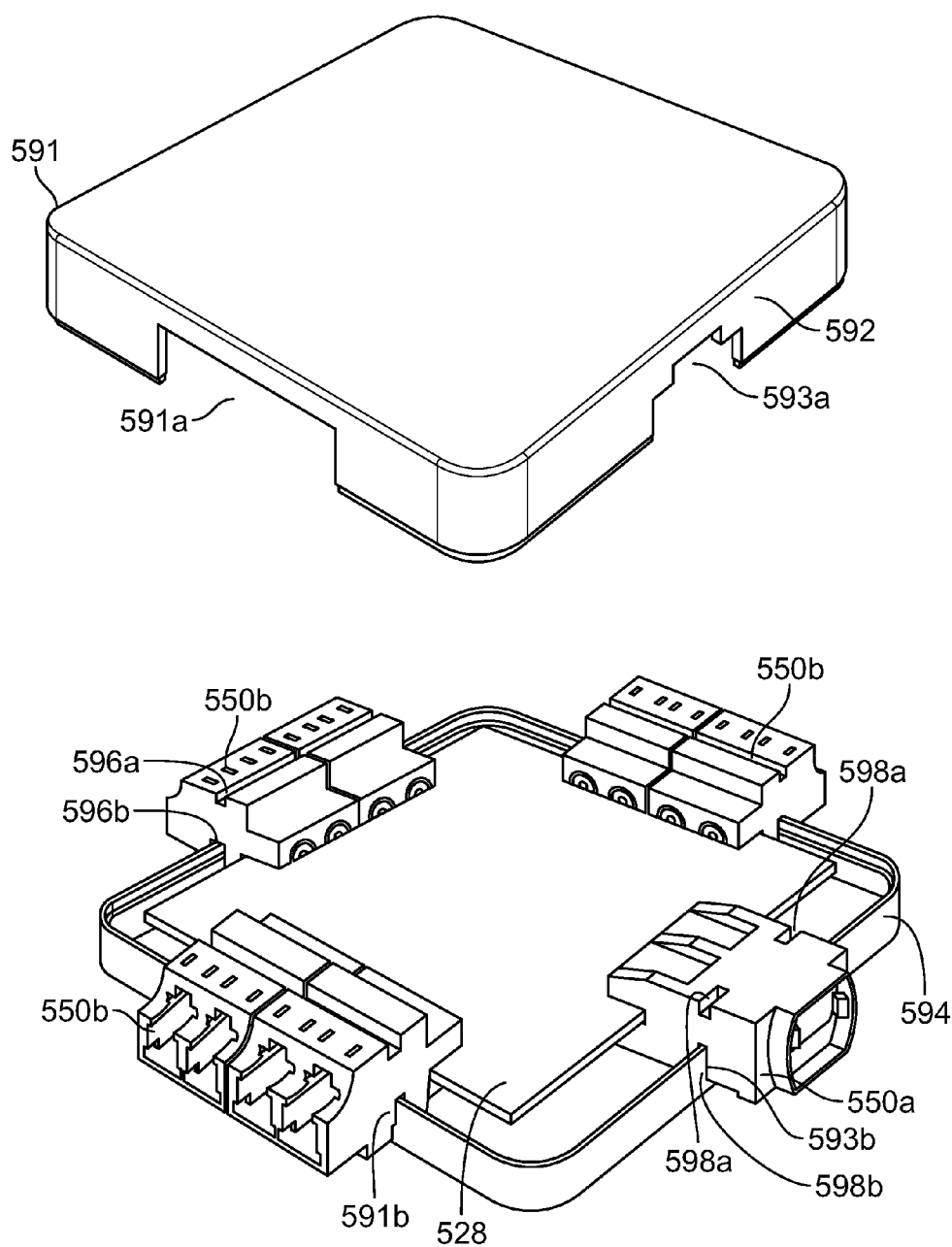
FIG. 44 shows a perspective view of the sixth embodiment of the assembled optical waveguide module of FIG. 32 inside of an unassembled housing wherein the connectors are additionally provided with slots for receiving edges of the housing.
Figure 45:
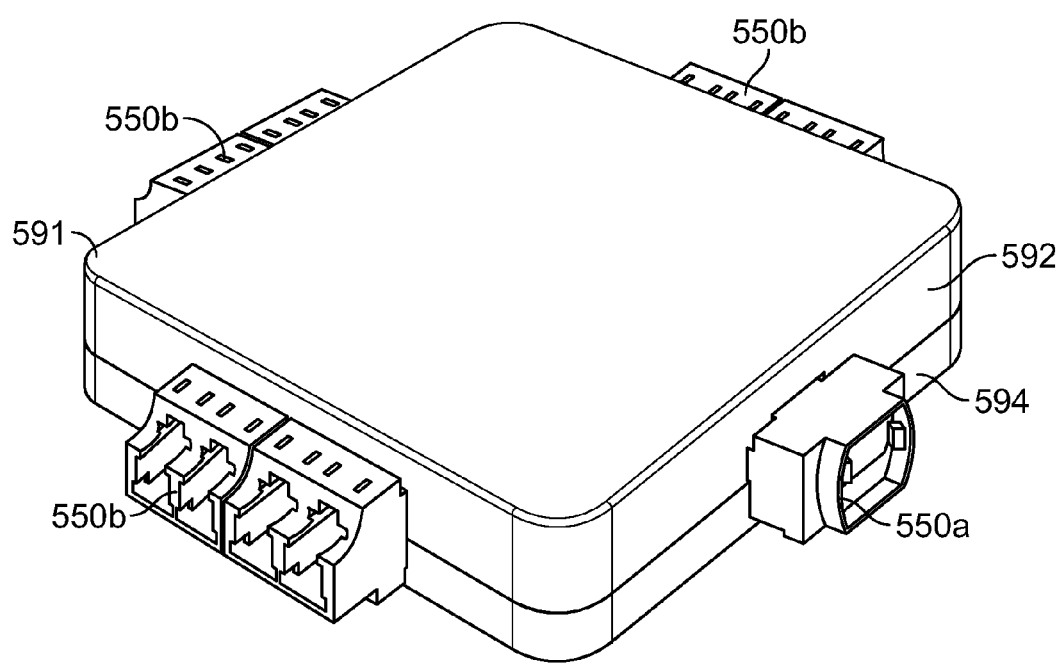
FIG. 45 shows a perspective view of the optical waveguide module of FIG. 32 inside of the assembled housing of FIG. 44.
Figure 46:
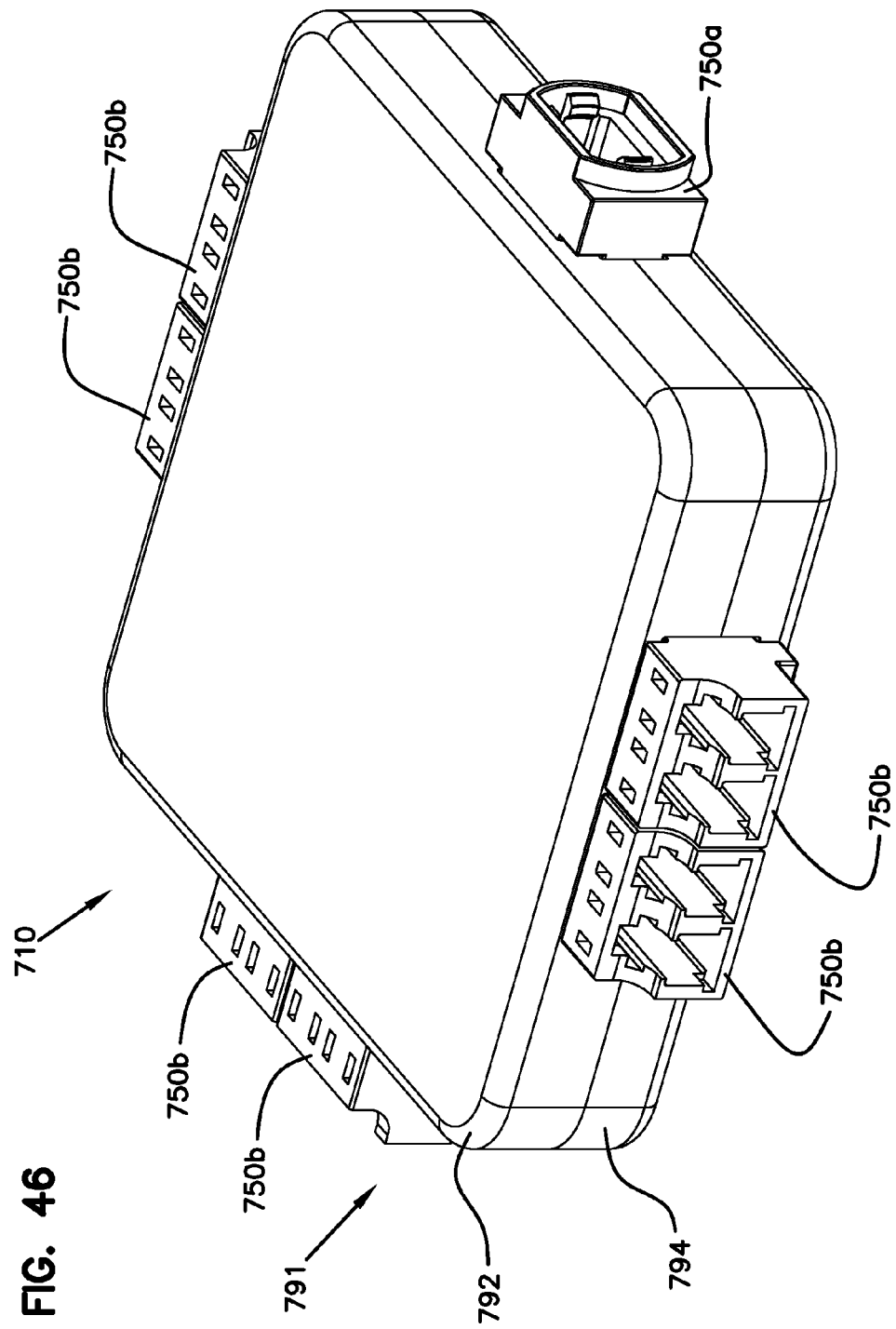
FIG. 46 shows a perspective view of an eighth embodiment of an assembled optical waveguide module within a housing having features that are examples of aspects in accordance with the principles of the present disclosure.
Figure 47:
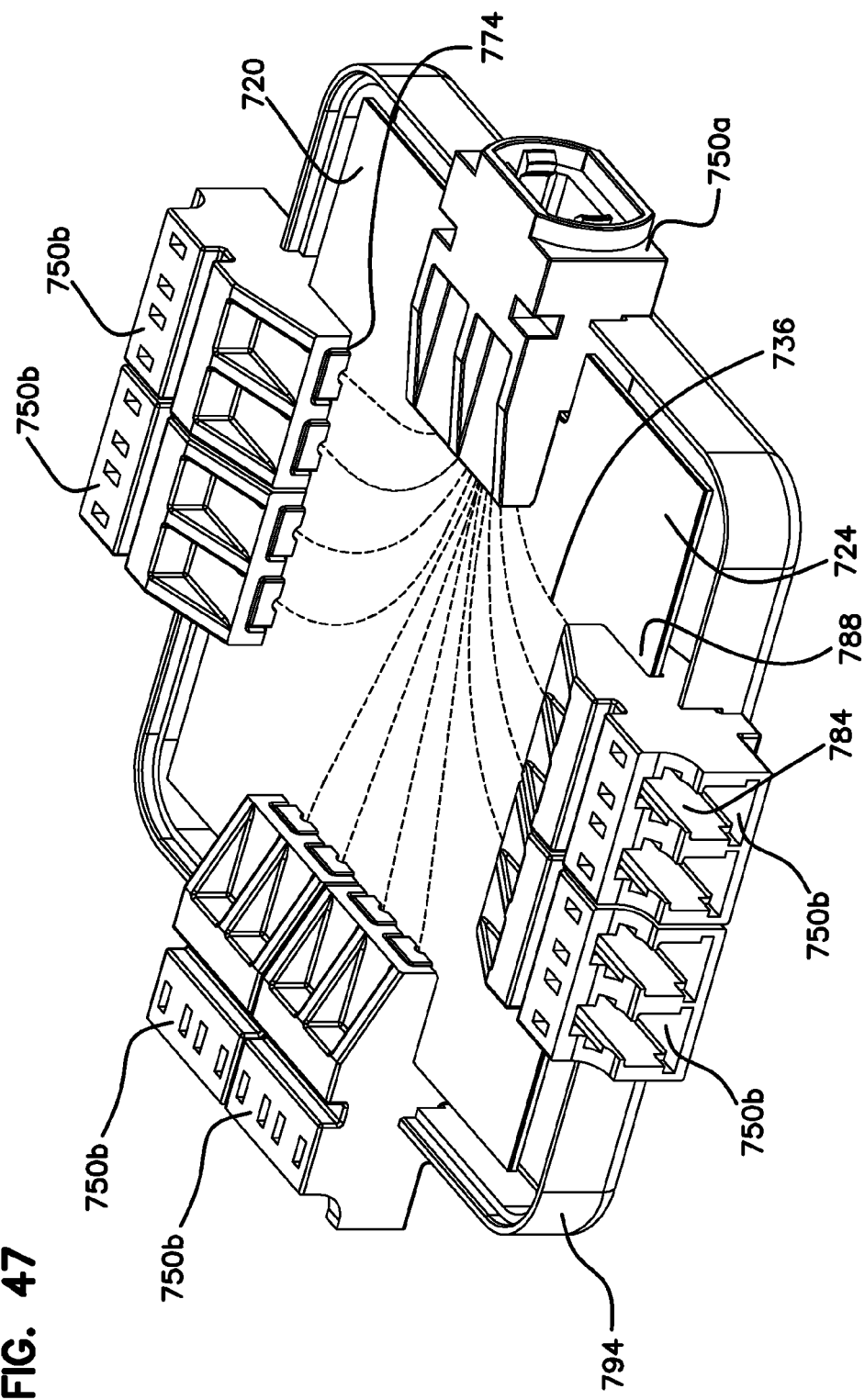
FIG. 47 shows a perspective view of the assembled optical waveguide module of FIG. 46 with a top portion of a housing removed.
Figure 48:
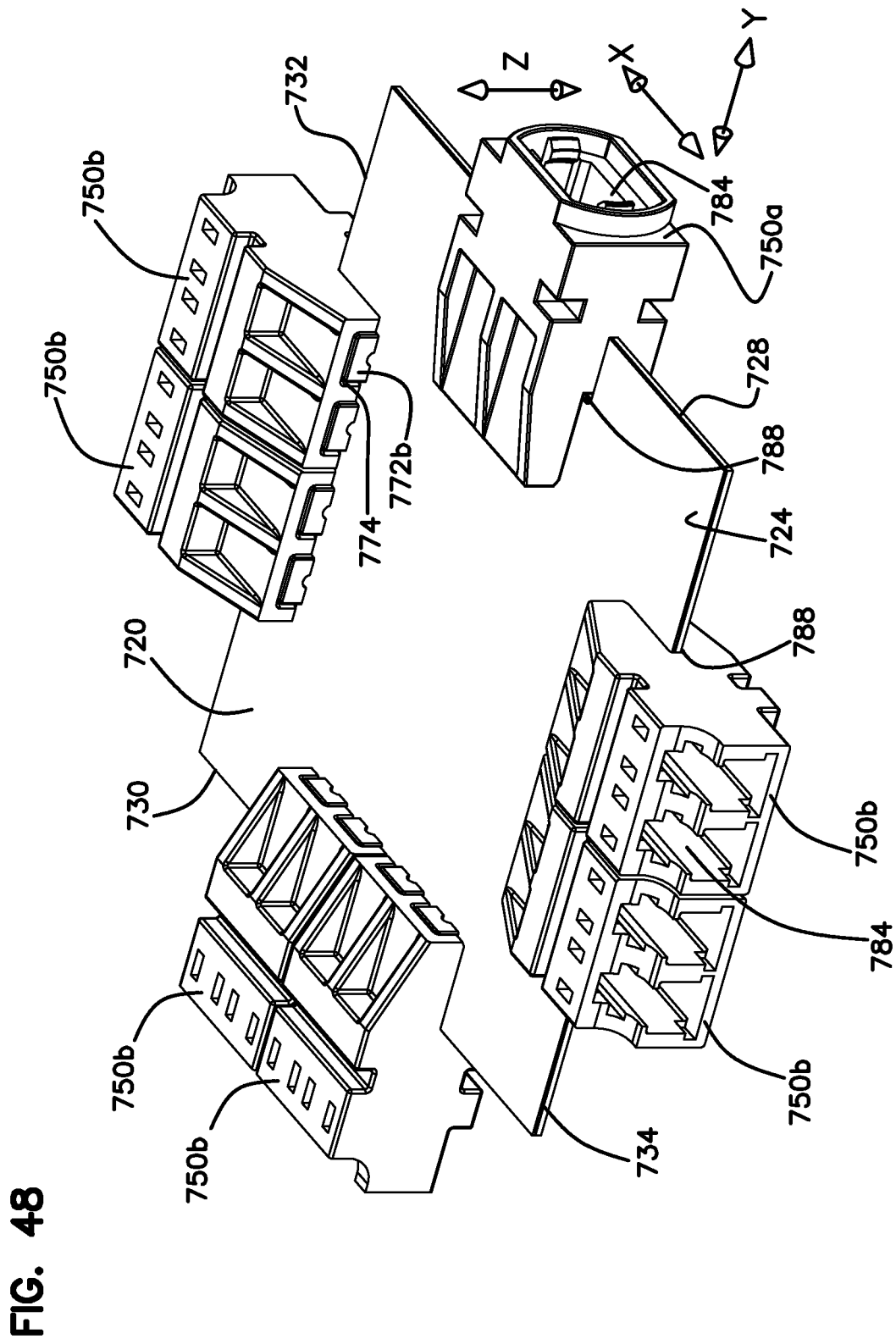
FIG. 48 shows a perspective view of the assembled optical waveguide module of FIG. 46 removed from the housing.
Figure 49:
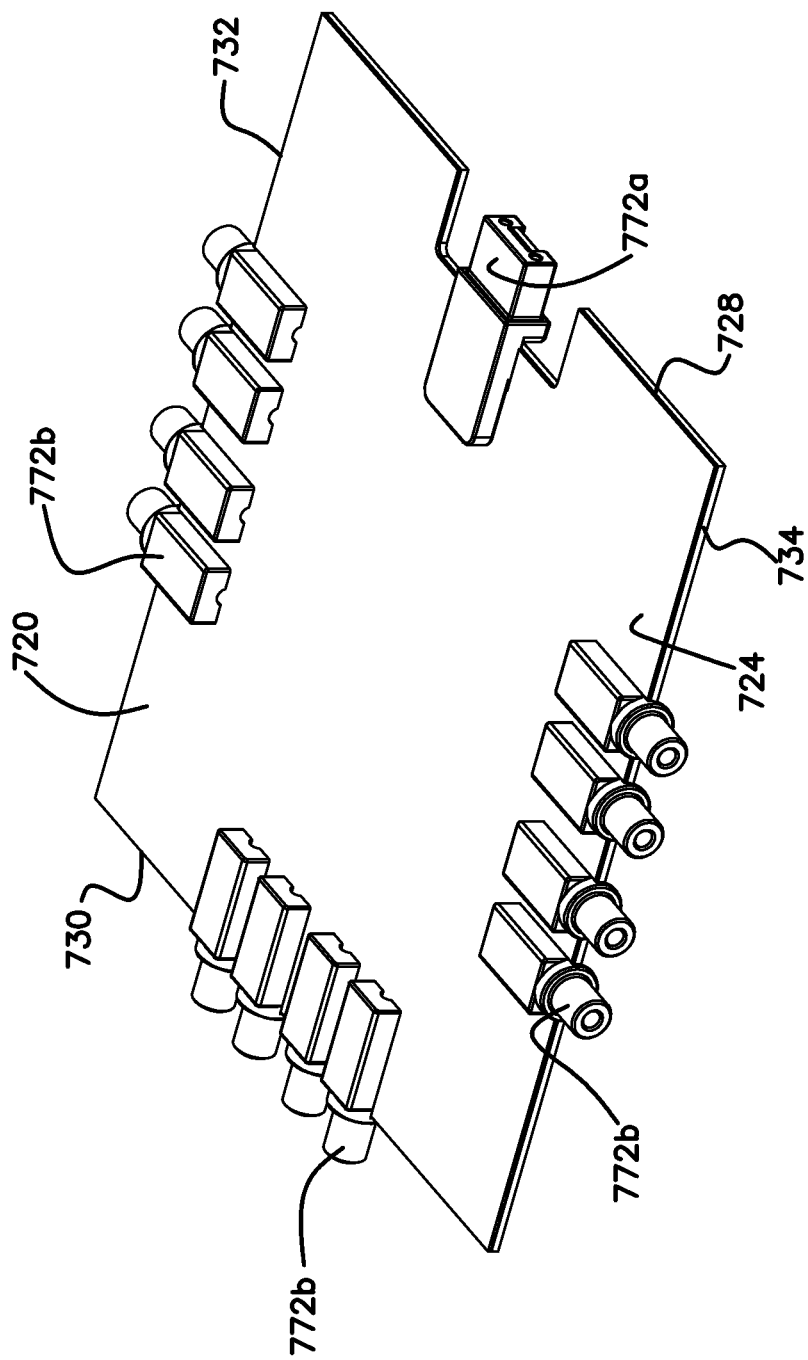
FIG. 49 shows a perspective view of an optical light guide and connector sleeves of the optical waveguide module of FIG. 46.
Figure 50:
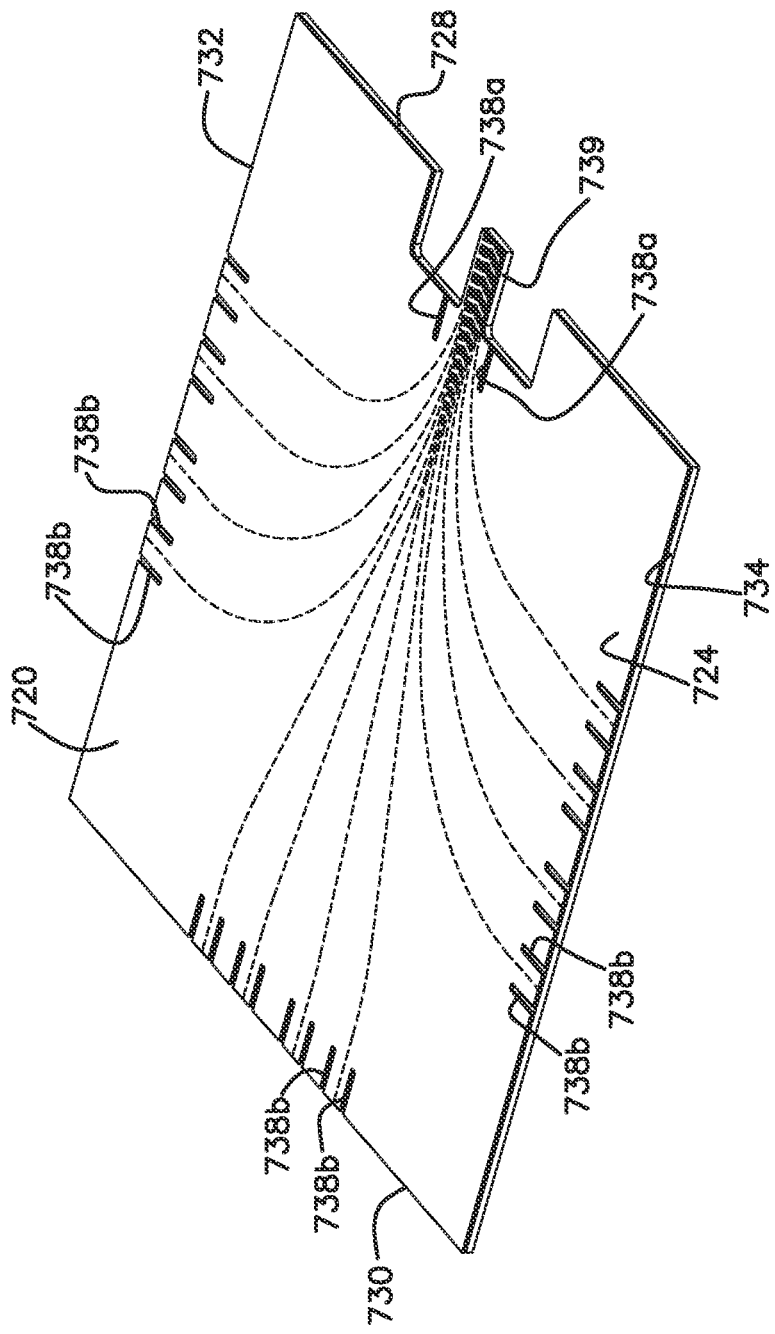
FIG. 50 shows a perspective view of the optical light guide shown in FIG. 49.
Figure 51:
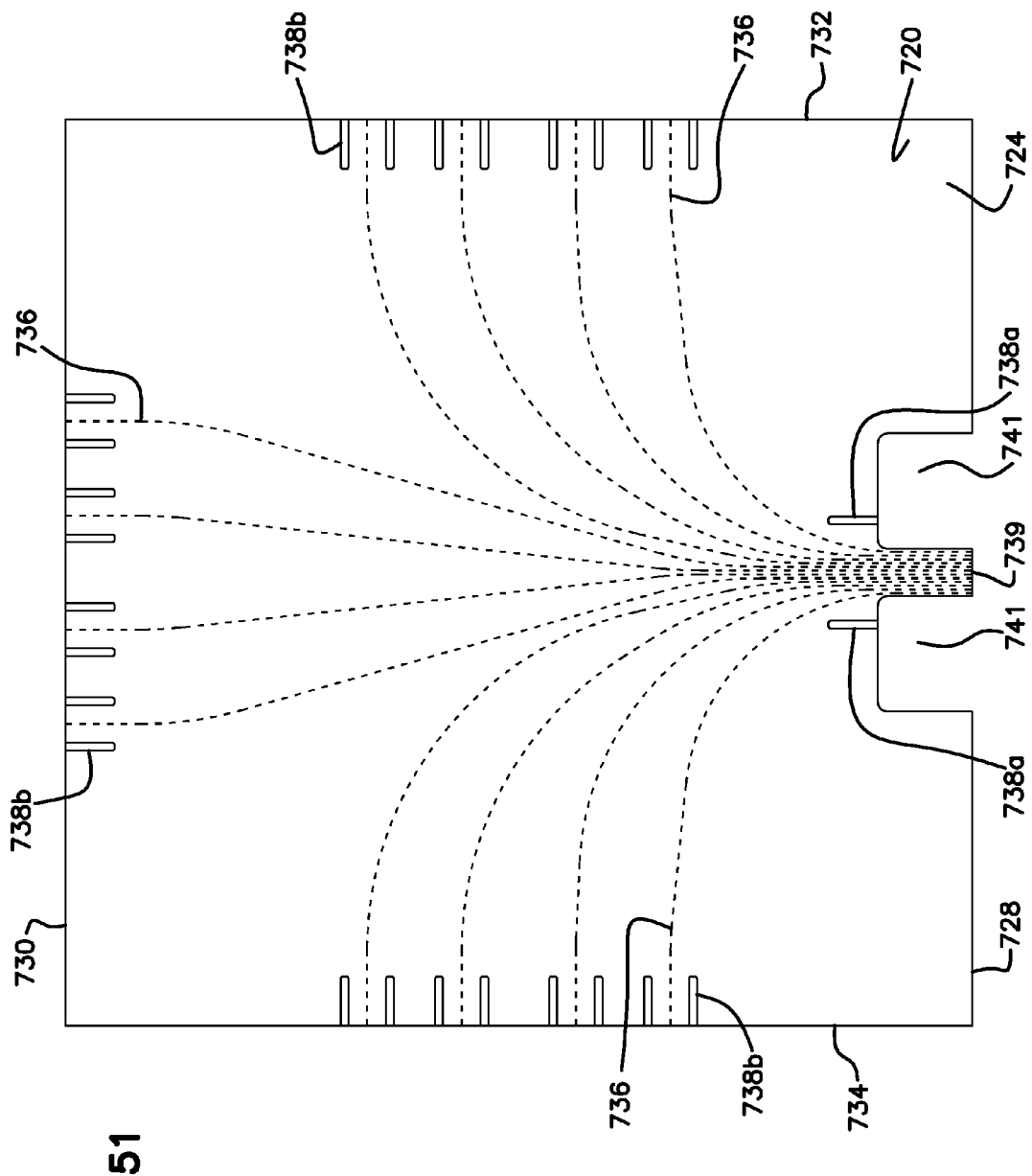
FIG. 51 shows a top view of the optical light guide shown in FIG. 49.
Figure 54:
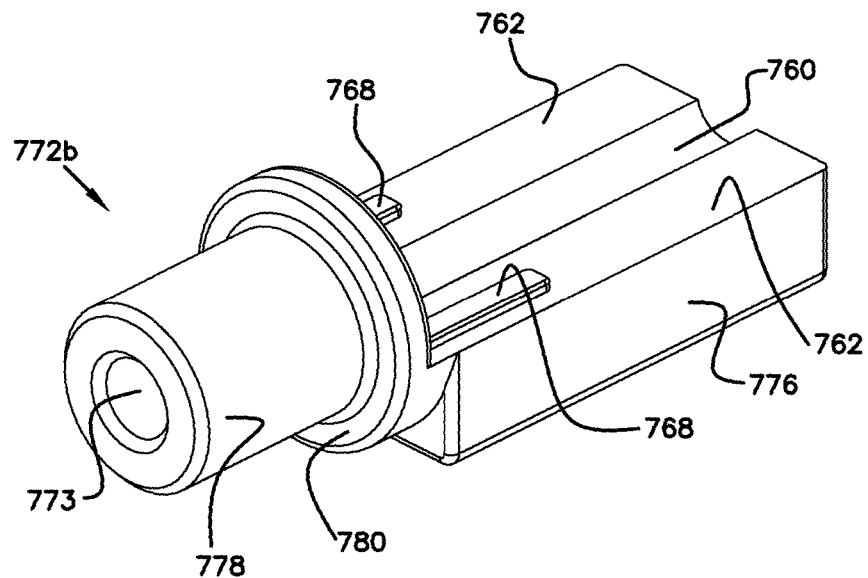
FIG. 54 shows a front perspective view of an LC-type connector sleeve of the optical waveguide module shown in FIG. 49.
Figure 55:
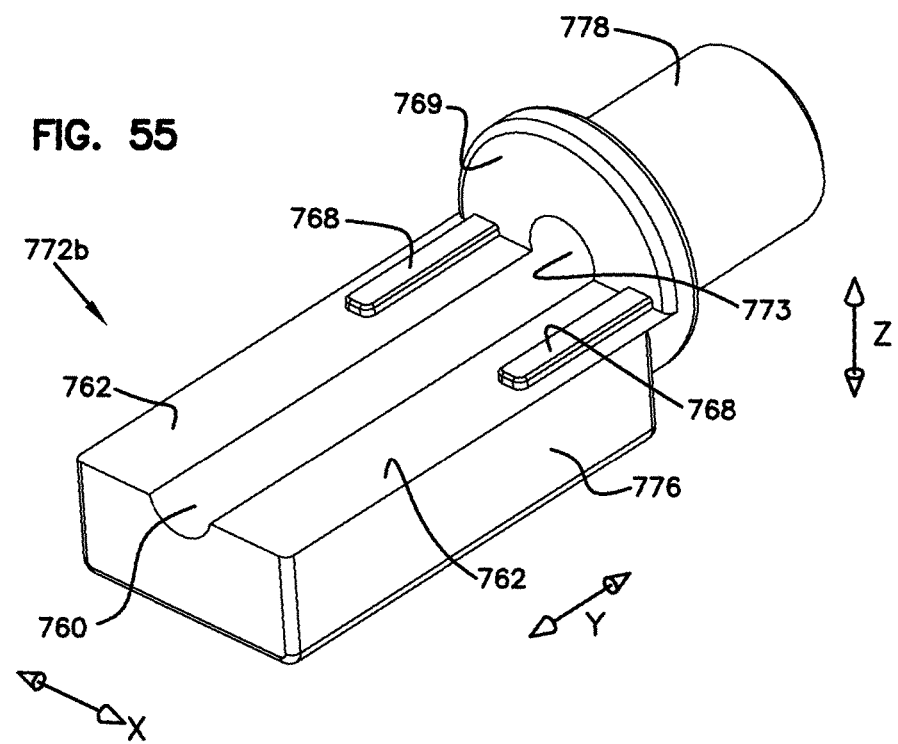
FIG. 55 shows a rear perspective view of the connector shown in FIG. 54.
Figure 61:
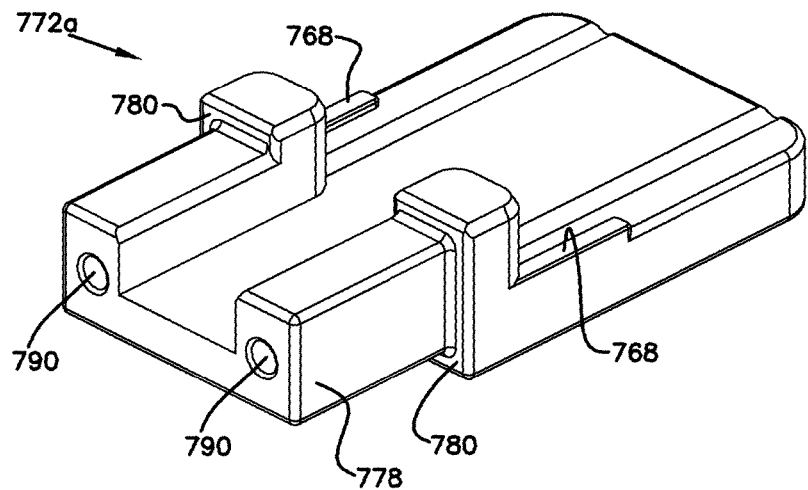
FIG. 61 shows a front perspective view of an MPO-type connector sleeve of the optical waveguide module shown in FIG. 49.
Figure 62:
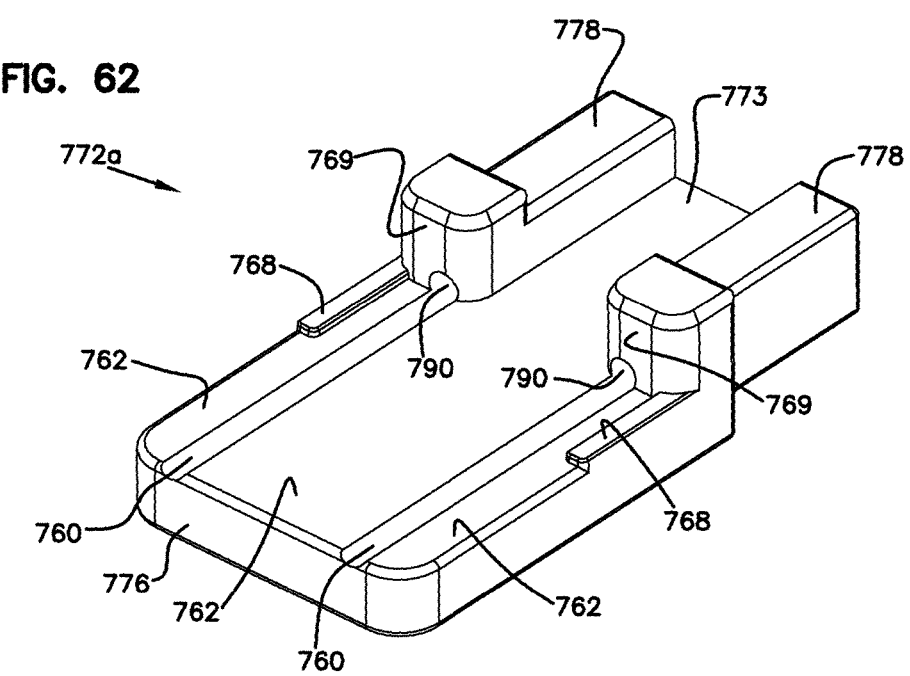
FIG. 62 shows a rear perspective view of the connector shown in FIG. 61.
Figure 65:
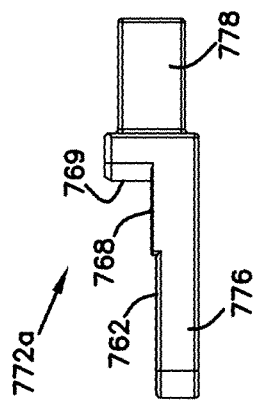
FIG. 65 shows a side view of the connector shown in FIG. 61.
Figure 64:
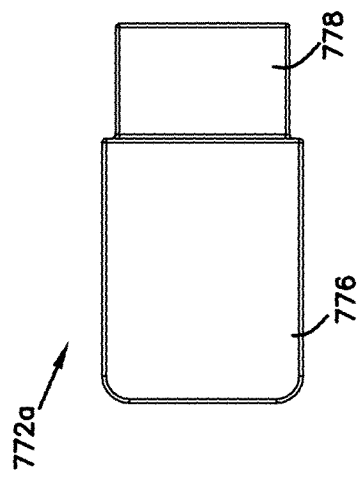
FIG. 64 shows a top view of the connector shown in FIG. 61.
Figure 63:
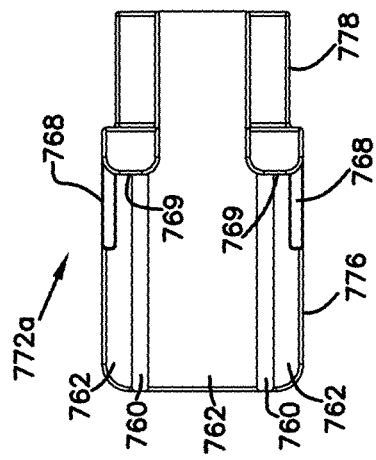
FIG. 63 shows a bottom view of the connector shown in FIG. 61.
Figure 67:
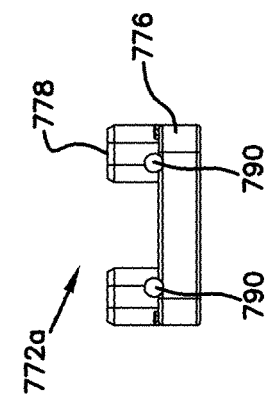
FIG. 67 shows a second end view of the connector shown in FIG. 61.
Figure 66:
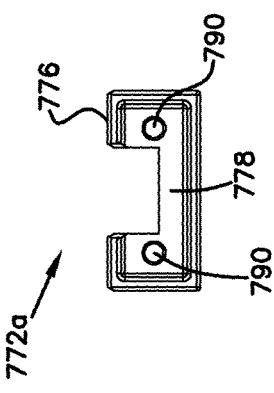
FIG. 66 shows a first end view of the connector shown in FIG. 61.
Figure 69:
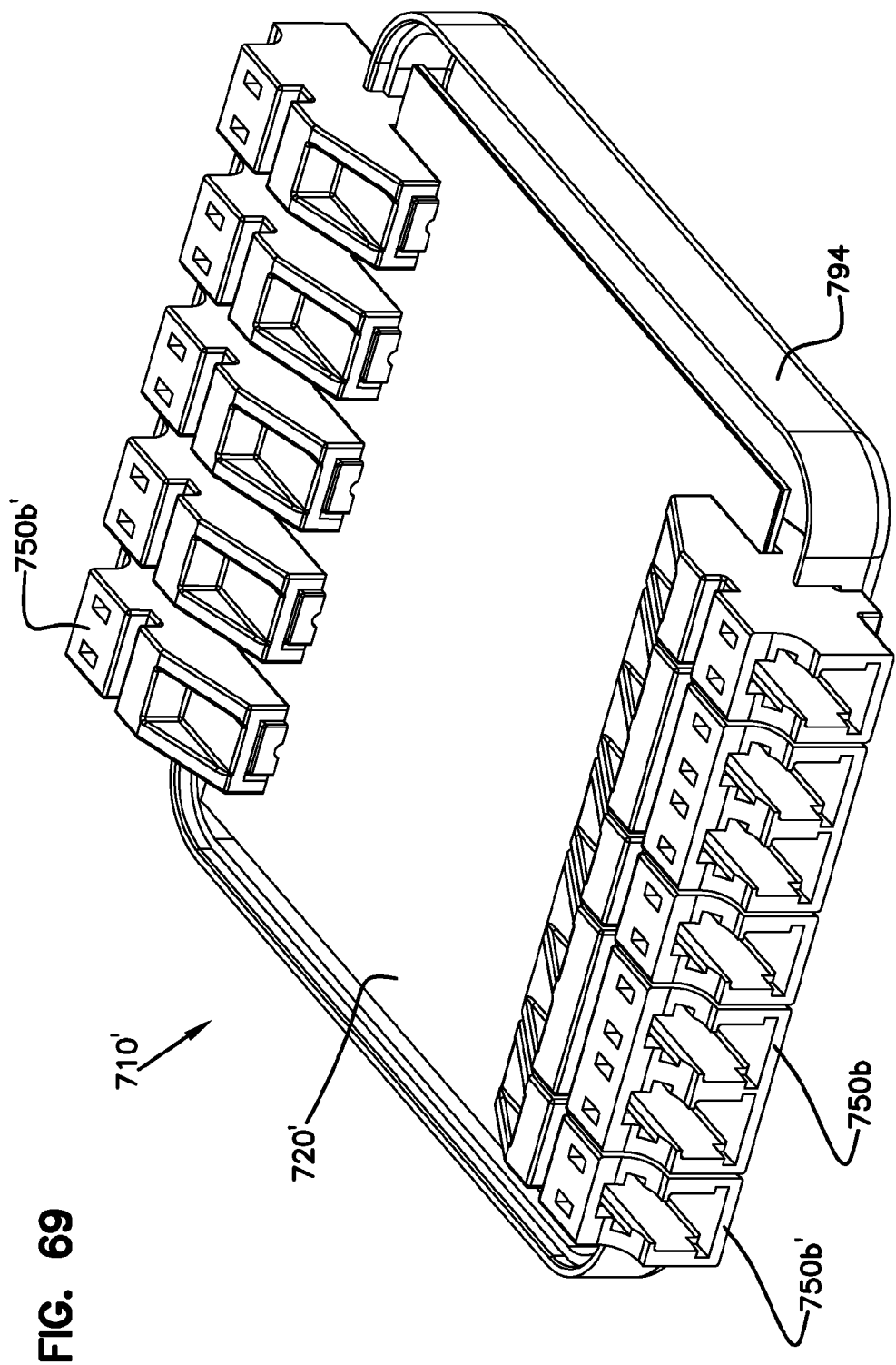
FIG. 69 shows a perspective view of the assembled optical waveguide module of FIG. 68 with a top portion of a housing removed.
Figure 70:
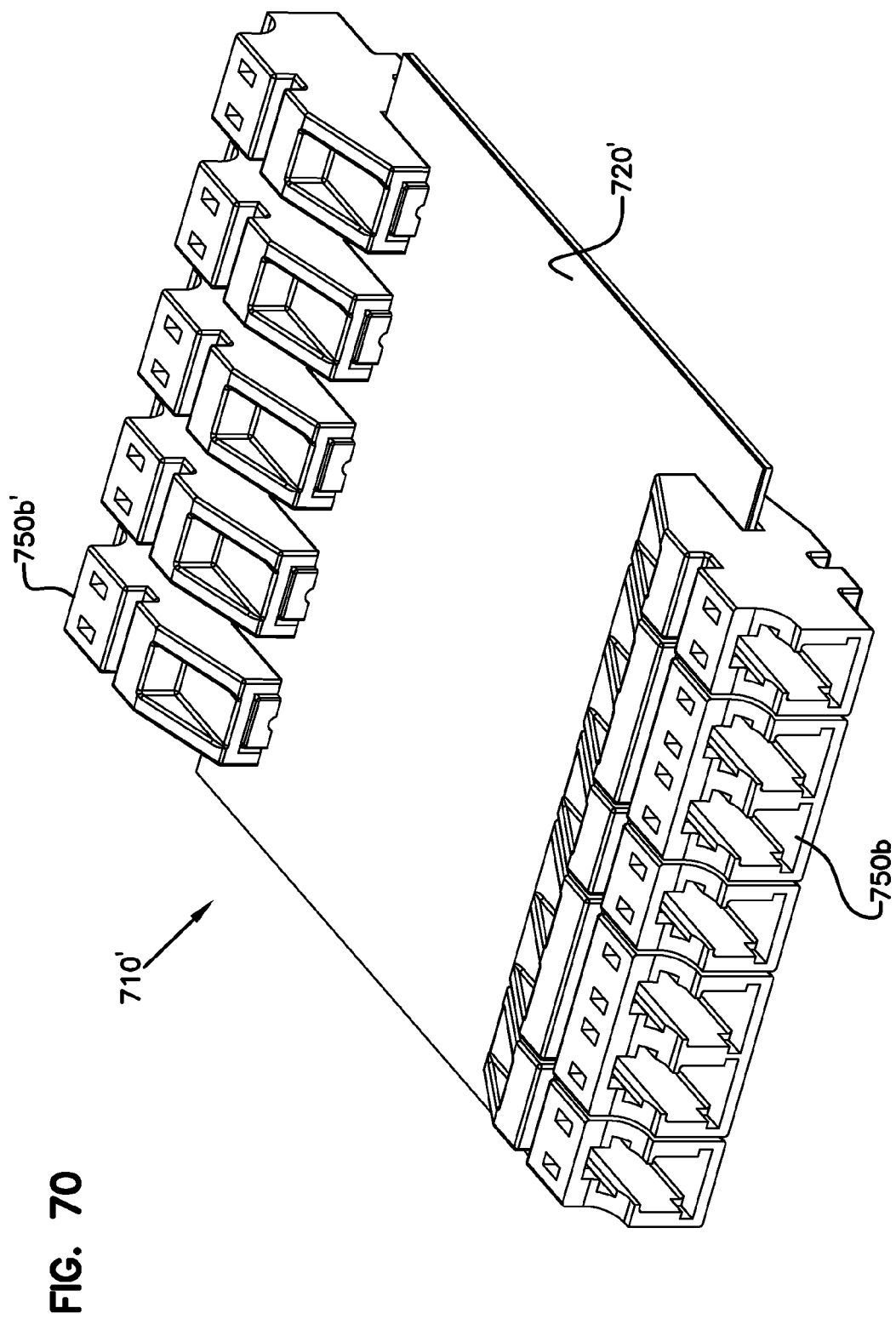
FIG. 70 shows a perspective view of the assembled optical waveguide module of FIG. 68 removed from the housing.
Figure 71:
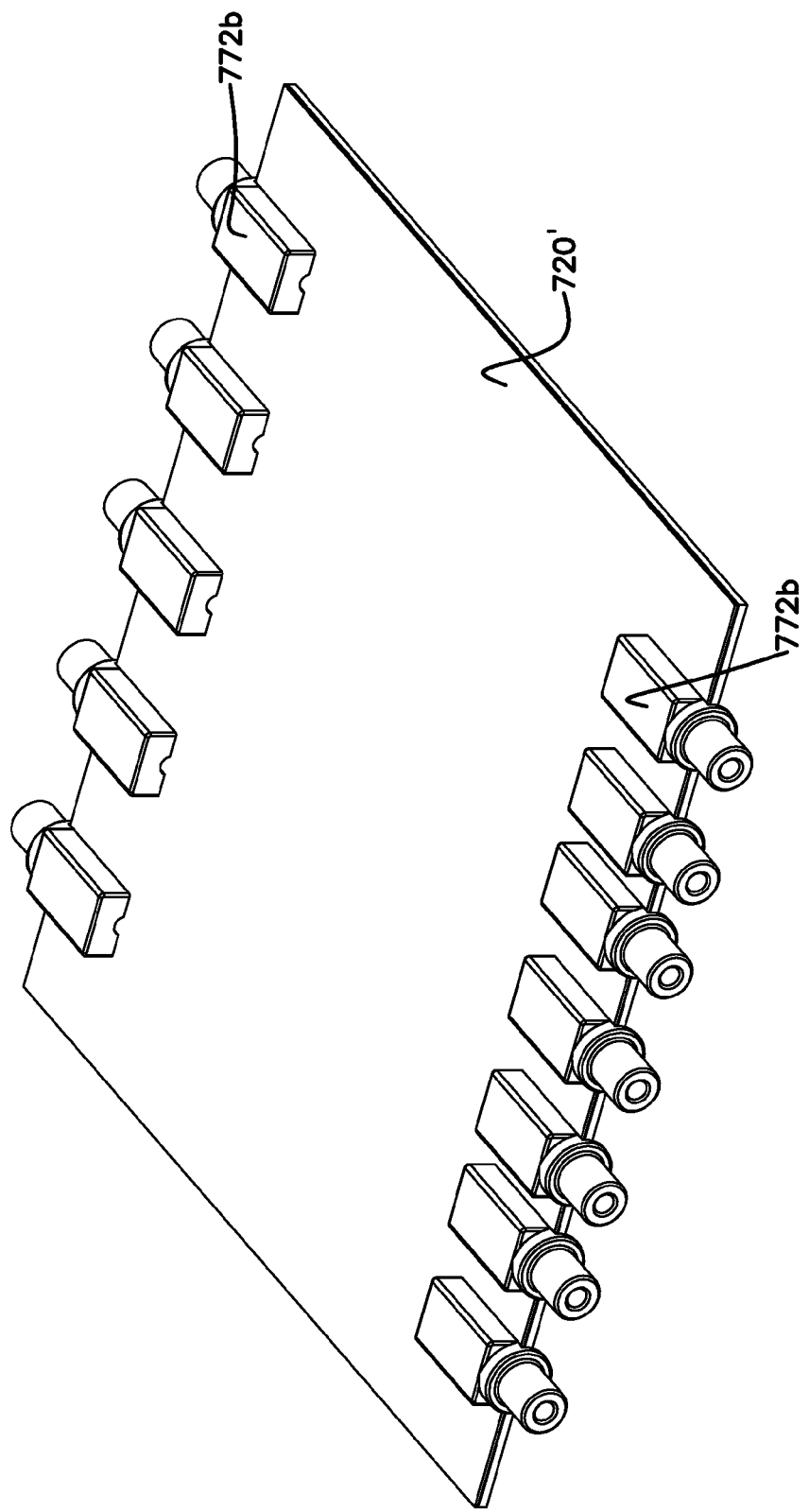
FIG. 71 shows a perspective view of an optical light guide and connector sleeves of the optical waveguide module of FIG. 68.
Figure 72:
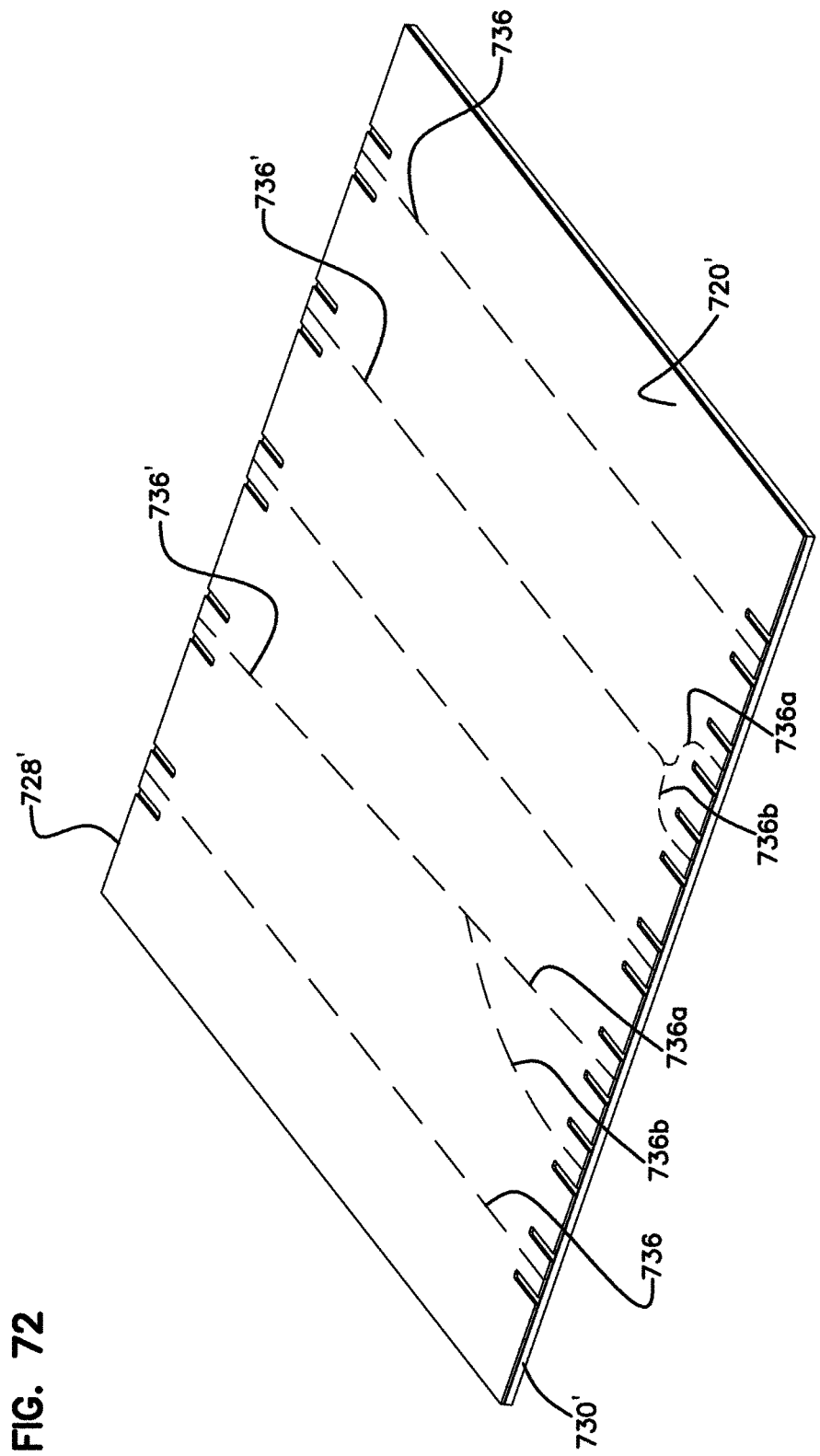
FIG. 72 shows a perspective view of the optical light guide shown in FIG. 71.

With reference to FIG. 44, it can be seen that the connectors 550b are provided with continuous slots 596a, 596b that are configured for accepting and securing the edges of the upper and lower housing halves 592, 594, respectively. Connector 550a is also shown as having partially extending slots 598a, 598b. These features also help to deflect forces on the substrate caused by the insertion or movement of the corresponding fiber optic plug. It is also noted that the connectors, such as connectors 550a, 550b may be provided with upper and lower slots 596, 598 for accepting and securing the edges of the housing halves 592, 594. The housing material may be silicone-sealed plastic, thermoplastic resin, die-cast, or sheet metal, so that the planar optical light guide is protected. As the housings 791 and 791' and the related connector features are generally similar to that for housing 591, the above description is equally applicable and incorporated by reference for housing 791 and 791'. Also, it is noted that housings and connector configurations described for housings 91 and 591 are applicable for each and every embodiment disclosed herein, although the opening and slot configurations may differ based on the particular connector type and locations utilized.

Planar Optical Light Guide

As shown, the module 10 includes a planar optical light guide 20 which has a first surface 24 and an opposite second surface 26. The first and second surfaces 24, 26 extend between four side edges 28, 30, 32, 34. In one embodiment, the optical light guide 20 base substrate is manufactured from a silicon material.

Figure 8:
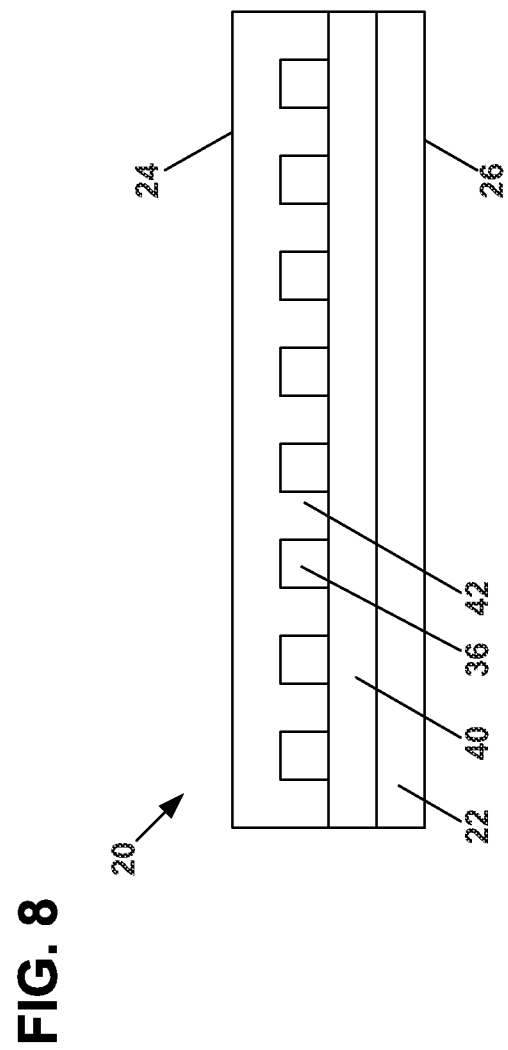
FIG. 8 shows a cross-sectional schematic view of a planar optical light guide usable with the optical waveguide module shown in FIG. 1.
Figure 9:
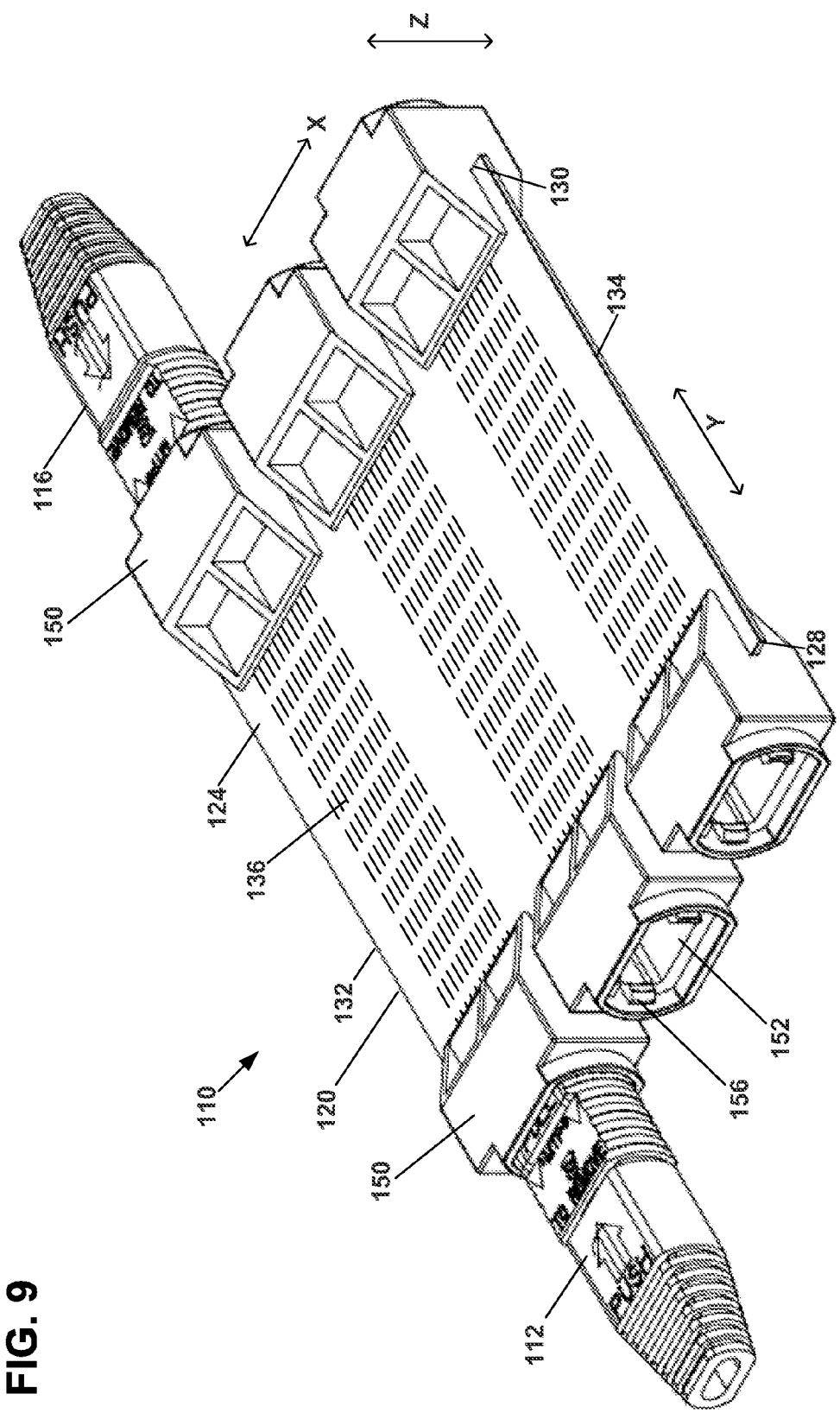
FIG. 9 shows a perspective view of a second embodiment of an assembled and connected optical waveguide module having features that are examples of aspects in accordance with the principles of the present disclosure.

The planar optical light guide 20 includes a base substrate layer 22 that is a carrier for one or more optical pathways 36 which extend between the first side edge 28 and the second side edge 30. In one embodiment, the optical pathways 36 are optical cores, surrounded by an optical cladding layer 40 and 42. As shown schematically in FIG. 8, a plurality of optical cores 36 are shown, on top of a lower optical cladding layer 40, and covered by an upper optical cladding layer 42. The optical cores 36 and cladding layers 40, 42 extend across the base substrate layer 22 and terminate at one or more of the edges (e.g. side edges 28, 30) of the planar optical light guide 20.

The base substrate 22 material can be a glass-reinforced epoxy laminate sheet such as an FR-4 PCB (printed circuit board), silicon wafer (Si substrate with SiO2 layer), or another suitable material. Where a PCB is used, the substrate can include copper laminated on one or both sides of an FR-4 PCB or layered onto another type of PCB composite. Various processes known in the art, such as vapor deposition and spin-coating in conjunction with a photo-thermal process, may be utilized to form the optical cores 36 and cladding layers 40, 42. In one embodiment, the optical pathways 36 are optical fiber cores 36 that are separately formed and subsequently fixed onto the base substrate 22 between the lower cladding layer 40 and upper cladding layer 42.

In an exemplary embodiment, the optical cladding layer 42 has a thickness of about 100 micrometers (μm) and the optical cladding layer 40 has a thickness of about 50 μm. The optical pathways or cores have a square cross-sectional shape with a height and width of about 50 μm and are spaced (pitched) about 250 μm (center-to-center) apart from each other. The substrate 22 utilized below the waveguide layers can be a standard FR-4 PCB having a thickness between about 0.8 μm and about 1.5 μm with top and bottom copper laminate layers having a thickness of 35.6 μm (1 ounce). Other configurations and thicknesses are possible without departing from the concepts presented herein.

Figure 5:
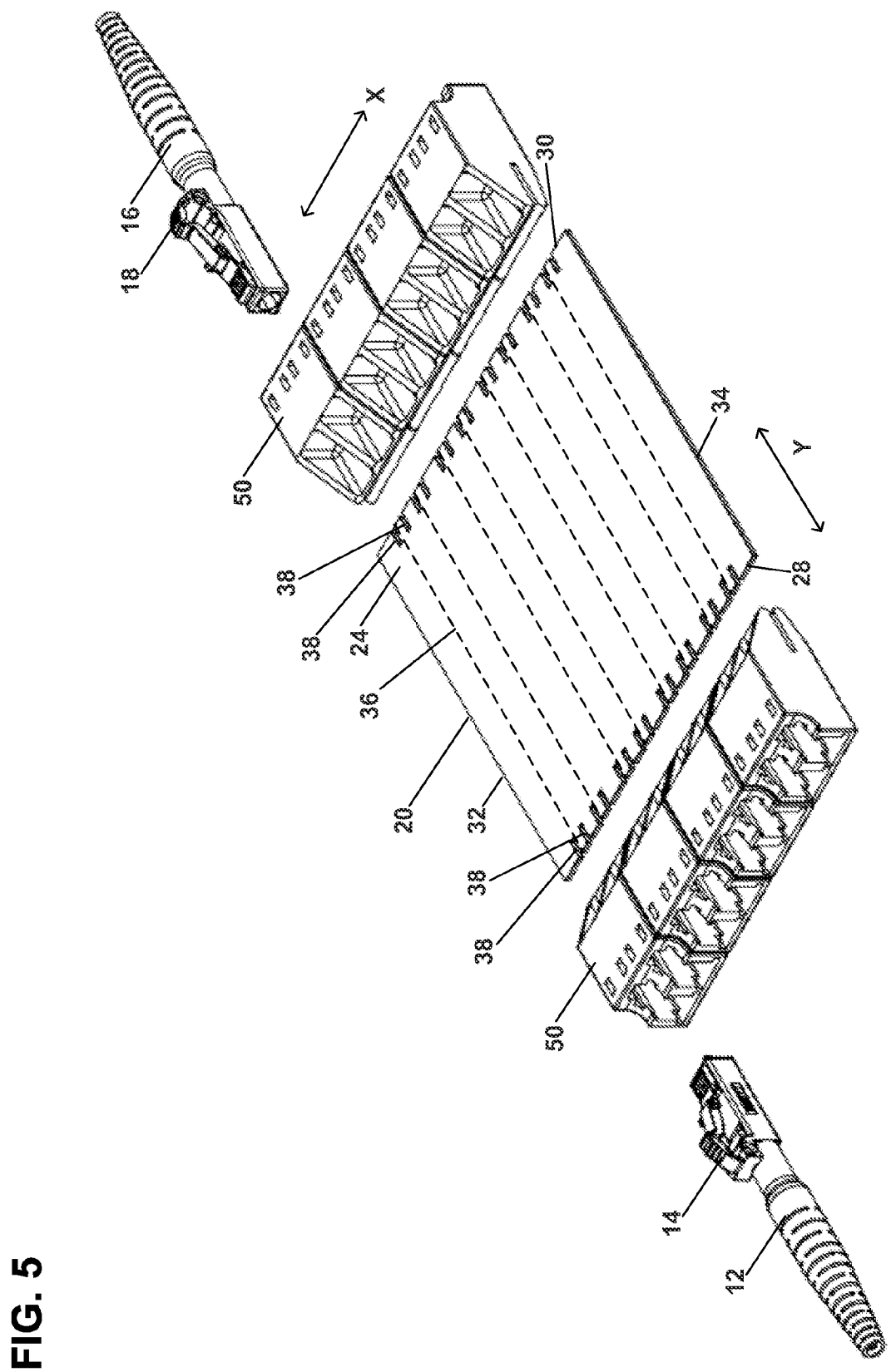
FIG. 5 is an exploded perspective view of the optical waveguide module shown in FIG. 1.

Referring to FIG. 5, the side edges 28, 30 of the planar optical light guide 20 can be polished or otherwise processed to permit optical signal transmission to other planar optical light guides 20 or other fiber optic components, such as fiber optic connectors. In one embodiment, the side edges 28, 30 are laser cut, for example by a UV laser cutting machine, such that polishing is not required or minimum polishing will be required. The planar optical light guide 20 is shown in a generally planar state. It is to be appreciated that it need not be perfectly planar. It is to be appreciated that it need not be inflexible. Some flexibility is possible, if desired.

In one embodiment, the planar optical wave guide 20 may be fabricated in a three-stage process comprising creating the bottom cladding layer 40, patterning material to make the optical cores or pathways 36, and encapsulating the cores 36 with a final cladding layer 42. The materials used can be negative-tone photoresists that can be spun and patterned using photolithography techniques, and in particular soft photolithography using a mold fabricated with polydimethylsiloxane (PDMS). In one aspect, the wave guide 20 can be characterized as having an inorganic-organic hybrid polymer construction wherein cladding layers 40, 42 are formed to have an index of refraction of 1.5306 and the optical cores are formed to have an index of refraction of 1.55475 with a loss of about 0.06 dB per centimeter. As configured, the planar optical wave guide 20 has a numerical aperture (NA) of 0.273, an acceptance angle ($\alpha_0$) of 15.8 degrees, and a critical angle ($\theta_C$) of 80 degrees.

In one step of the process, the starting substrates are conditioned with an oxygen ash followed by a thirty-minute bake on a hot plate at 200° C. The surface is then preferably spun with an adhesion promoter and baked for five minutes at 150° C. It is noted that it is possible to proceed without the adhesion promoter for some constructions. The bottom cladding layer 40 can then be spun on to the substrate 22 with a spin-coating process targeting for 50 μm. The resulting film can then be given a three-minute soft-bake at 80° C. Subsequently, the film can be hardened, for example with a blanket UV exposure, which can then be followed by another three-minute bake at 80° C. In one embodiment, the UV exposure is performed by a Karl Suss MA6 mask aligner which is a top and bottom side contact printer used for fine lithography down to 1 micron or better. Where the exposure is done in atmosphere, a thin layer of uncured liquid polymer may remain on the wafers which can be removed with a ninety-second dip in developer. A final hard-bake can be performed with a three-hour bake at 150° C. in a nitrogen-purged oven.

Preferably, the process of patterning the core material 36 would immediately follow the hard-bake of the bottom cladding layer 40; otherwise, a hot-plate bake can be necessary to drive off moisture. Furthermore, it has been found that the adhesion of patterned waveguide pathways 36 is more reliable if the top surface of cladding layer 40 is pre-treated with an oxygen plasma. This treatment can be performed done with a barrel asher. However, it is noted that while such a treatment can greatly improve the adhesion, over-etching the surface is possible, which can cause cracks and craze lines to form in the surface after the developing process. In one approach, the core material 36 is applied with a spin-coating process targeting 50 μm thickness and given a three-minute soft-bake at 80° C. Subsequently a mask aligner and a dark-field mask can be used to expose the core material 36.

Using the above described process, the photo-patterning of the waveguide structures 36 can be a difficult part of the process as the unexposed material is still wet after the soft-bake. Accordingly, with such an approach, steps should be taken to prevent the mask from contacting the polymer surface and the exposure should be done with a proximity mode. Exposures can be performed for ninety seconds at 12 mW/cm2 (milliwatts per centimeter squared), although lower exposures are possible. Subsequently, a post-exposure bake of a three-minute soft-bake at 80° C. can be applied. The patterns can then be developed, for example, by agitating the wafer in the developer and rinsing with isopropyl alcohol. Once again, a final hard-bake can be performed with a three-hour bake at 150° C. in a nitrogen-purged oven.

It is noted that top cladding layer 42 must sufficiently encapsulate the core 36 with enough thickness to prevent loss from the waveguide. Although such a structure can be produced that accomplishes this in one step, doing so requires a low spin-speed which reduces the thickness control. The slower spin-speed also increases the difficulty in keeping bubbles in the resist from getting hung up on the topology of the waveguides. Accordingly, the process can be easier to control when the top cladding is produced in two steps; each step consisting of the same cycle of spin-coat, soft-bake, exposure, post-expose bake and hard-bake described above. In one embodiment, the final cladding layer 40 would be targeted for a 50 μm thickness over the patterned core for a total thickness of 100 μm.

Edge Connectors and Assembly

As shown, module 10 includes a plurality of edge connectors 50, in the form of fiber optic adapters. Each connector 50 connects to one or more of the optical pathways 36. As shown, the optical waveguide module 10 also includes a connection arrangement for connecting LC connectors 50 to LC connectors 50. As will be described below, various alternative arrangements can be provided for the waveguide modules 10 for connecting other connector formats, or connecting one or more modules together. Module 10 shows interconnections between duplex LC connectors 50 to duplex LC connectors 50. Alternatively, the LC connectors 50 can be manufactured as a single block of any desired number of ports.

Figure 7:
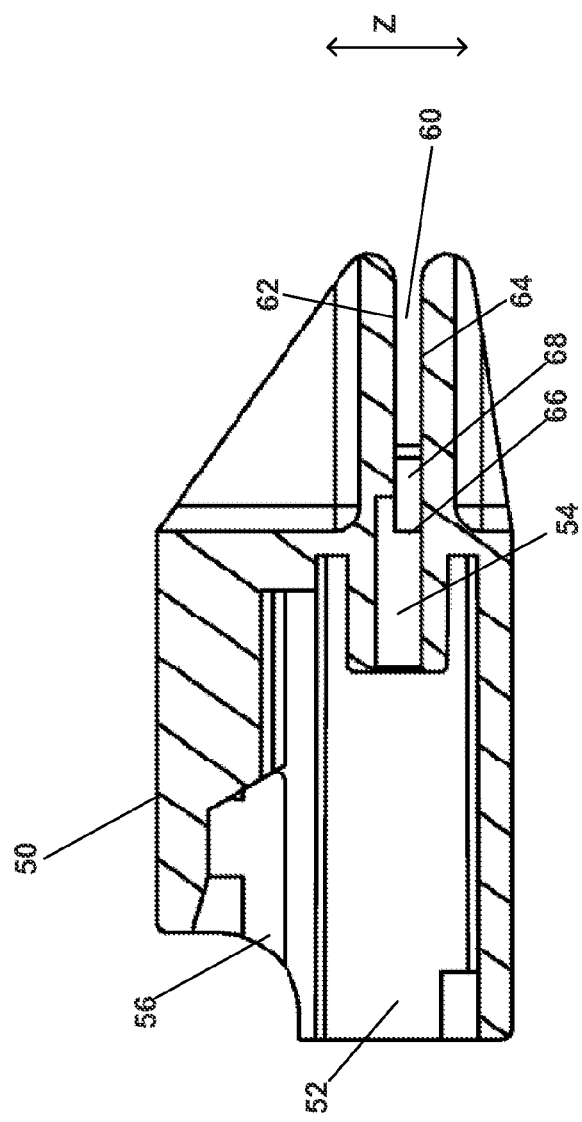
FIG. 7 shows a cross-sectional side view of an edge connector usable with the optical waveguide module shown in FIG. 1.

As most easily seen at FIG. 7, each edge connector 50 includes an adapter port 52 for receiving a fiber optic connector 12, 16. Each adapter port 52 includes an internal passageway 54 configured to receive a ferrule 13, 17 of the optical connector 12, 16 to allow the ferrule 13, 17 to be placed in optical communication with the optical passageways 36 of the planar waveguide 20. The edge connector 50 can also be provided with a catch 56 for engaging and retaining a latching mechanism 14, 18 of the optical connector 12, 16.

Still referring to FIG. 7, each edge connector 50 is further shown as being provided with an alignment slot 60 opposite the adapter port 52. The alignment slot 60 is for providing alignment in a direction Z between the optical waveguide 20 and the connector 50 such that the ferrule 13, 17 will be sufficiently aligned with an optical pathway 36 in the direction Z. The direction Z is generally orthogonal to the plane defined by the first and second surfaces 24, 26 of the optical light guide 20. As configured, the alignment slot 60 is formed by a first sidewall 62, a second sidewall 64, and a base portion 66 extending between the first and second sidewalls 62, 64. When the connector 50 is installed on a side edge (e.g. side edge 28 or 30), the first sidewall 62 is adjacent to and extends over the first planar surface 24 while the second sidewall 64 is adjacent to and extends over the second planar surface 26. The spacing between the sidewalls 62, 64 is generally equal to the total thickness of the optical waveguide 20 which ensures proper alignment in direction Z of the adapter port 52, and thereby ferrules 13, 17 relative to the ends of the optical passageways 36.

Referring to FIG. 5, the planar optical light guide 20 is shown as having a plurality of alignment notches 38 at the first and second side edges 28, 30. Each of the alignment notches 38 are for providing alignment in a direction X with a corresponding protrusion 68 provided on the connector 50. Direction X is generally parallel to the length of the side edges 28, 30. As shown, each connector 60 is provided with two protrusions 68, each of which engages a corresponding notch 38 on either side of an optical pathway 36. As shown, a notch 38 is provided on each side of the optical pathway 36. Accordingly, the notches 38 and protrusions 68 index the connector 50 to the optical waveguide 20 in a direction X to ensure that the adapter port 52, and thus ferrules 13, 17, is properly aligned with the ends of the optical passageways 36. It is noted that each connector 50 may be provided with only one notch 68 or more than two notches 68, as desired.

It is also noted that the depth of the notches 38 and the length of the protrusions 68 can be configured to provide a stop position for insertion of the connector 50 onto the optical waveguide 20 such that the edge connector has minimum end separation in a direction Y. Many typical fiber optic connectors, such as connectors 12, 16, have ferrules 13, 17 that are spring loaded to ensure that the ends of the ferrules 13, 17 are in physical contact with another optical transmission device such that no loss in efficiency or optical power loss results through unduly large air gaps or the like. As the edges 28, 30 of the optical light guide 20 are generally rigid, it is desirable to minimize optical end separation of the edge connector 50 on the optical waveguide 20 in the Y direction such that a spring loaded ferrule 13, 17 can operate within its own range of motion to engage with the optical pathway 36 at the edges 28, 30 of the optical light guide 20. The Y direction is generally parallel to the length of the side edges 32, 34. The location of the alignment slot base 66 can also be selected to properly position the connector 50 relative to the edges 28, 30 in the Y direction.

Figure 6:
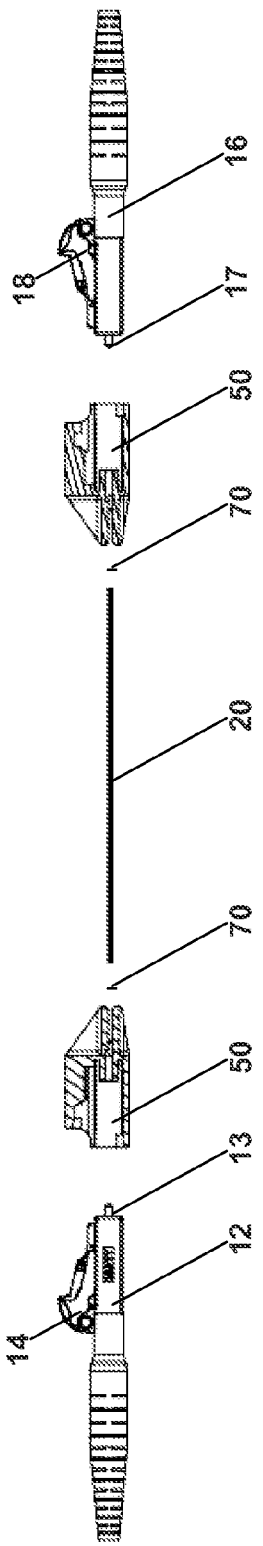
FIG. 6 is a cross-sectional side view of the optical waveguide module shown in FIG. 5.

Referring to FIG. 6, optical waveguide end face protection is provided in the form of an index matching film 70. The index matching film 70 protects the optical pathway 36 ends at the edges 28, 30 from the insertion and impact forces from receiving optical connector 12, 16. This helps to prevent damage to the optical pathway ends to ensure data integrity and to minimize the occurrence of errors, link failures, and optical power degradation. As shown, the index matching film 70 is applied at least to the side edges 28, 30. The index matching film 70 may also be formed along waveguide first surface 24 and the second surface 26 adjacent to the side edges 28, 30 to provide better attachment and durability of the film 70. In such an application, the connector slot sidewalls 62, 64 extend over the index matching film 70 to help hold film 70 in position for assembly purposes.

Another way to prevent optical waveguide end face damage from the insertion and impact forces from receiving an optical plug is to provide a physical contact distance between waveguide side edges 28, 30 and ferrule 13, 17 within the optical coupling limits. One embodiment will have a physical contact feature which engages the optical connector 12, 16 and prevents physical contact between the ferrule 13, 17 end face and the waveguide side edges 28, 30. In one embodiment, the optical waveguide side edges 28, 30 are recessed back from the physical contact interface area between the optical plug ferrule 13, 17 and optical waveguide side edges 28, 30. The resulting gap or distance between the optical waveguide end face and the optical plug end face can be an air gap or filled with an index matching gel.

In order to secure the connectors 50 to the optical light guide 20, an adhesive may be applied at the interface of the alignment slot 60 and the first and second planar surfaces 24, 26 of the optical light guide 20. In one embodiment, the adhesive is an epoxy adhesive.

Referring to FIGS. 9-12, a second embodiment of an optical waveguide module 110 is presented. As many of the concepts and features are similar to the first embodiment shown in FIGS. 1-8, the description for the first embodiment is hereby incorporated by reference for the second embodiment. Where like or similar features or elements are shown, the same reference numbers will be used where possible (e.g. reference number 150 instead of reference number 50 for the edge connector). The following description for the second embodiment will be limited primarily to the differences between the first and second embodiments.

The primary difference of the second embodiment is that MPO type edge connectors 150 are shown instead of LC duplex type connectors 50. A typical MPO type connector 112, 116 has twelve fiber optic connections. Accordingly, the planar optical light guide 120 has significantly more optical pathways 136 (e.g. 36 optical pathways with three MPO connectors on each side) than that shown for the first embodiment 10.

Figure 10:
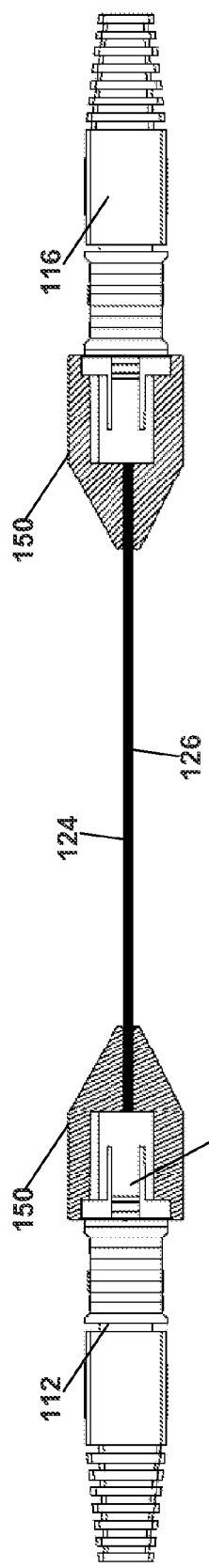
FIG. 10 shows a cross-sectional side view of the optical waveguide module shown in FIG. 9.
Figure 11:
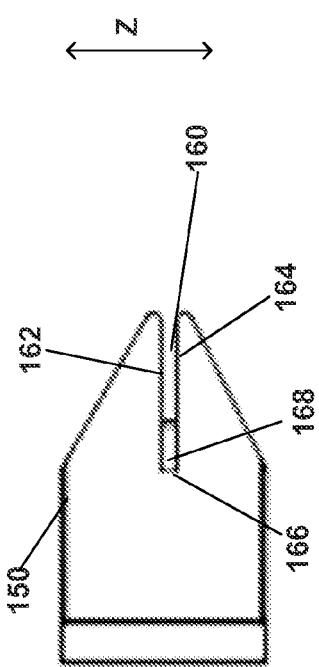
FIG. 11 shows a side view of an edge connector usable with the optical waveguide module shown in FIG. 9.
Figure 12:
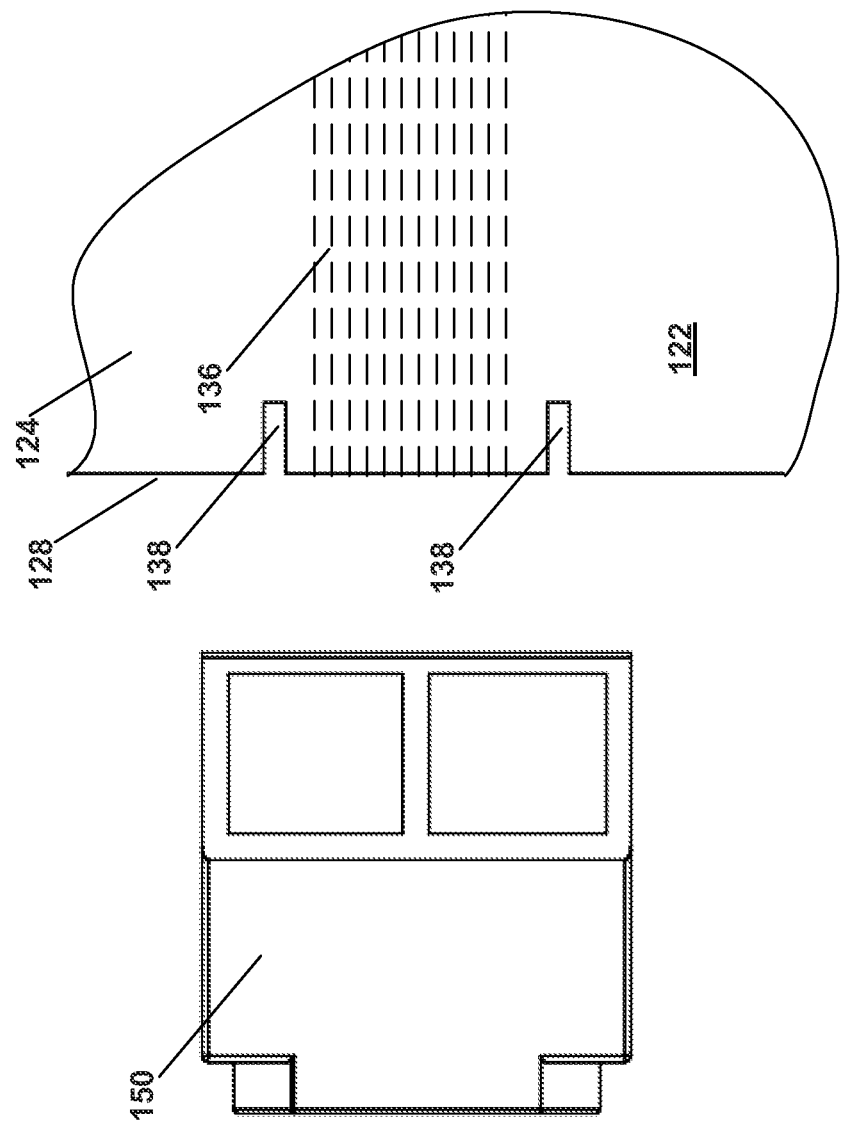
FIG. 12 shows a partial exploded top view of the optical waveguide module shown in FIG. 9.
Figure 13:
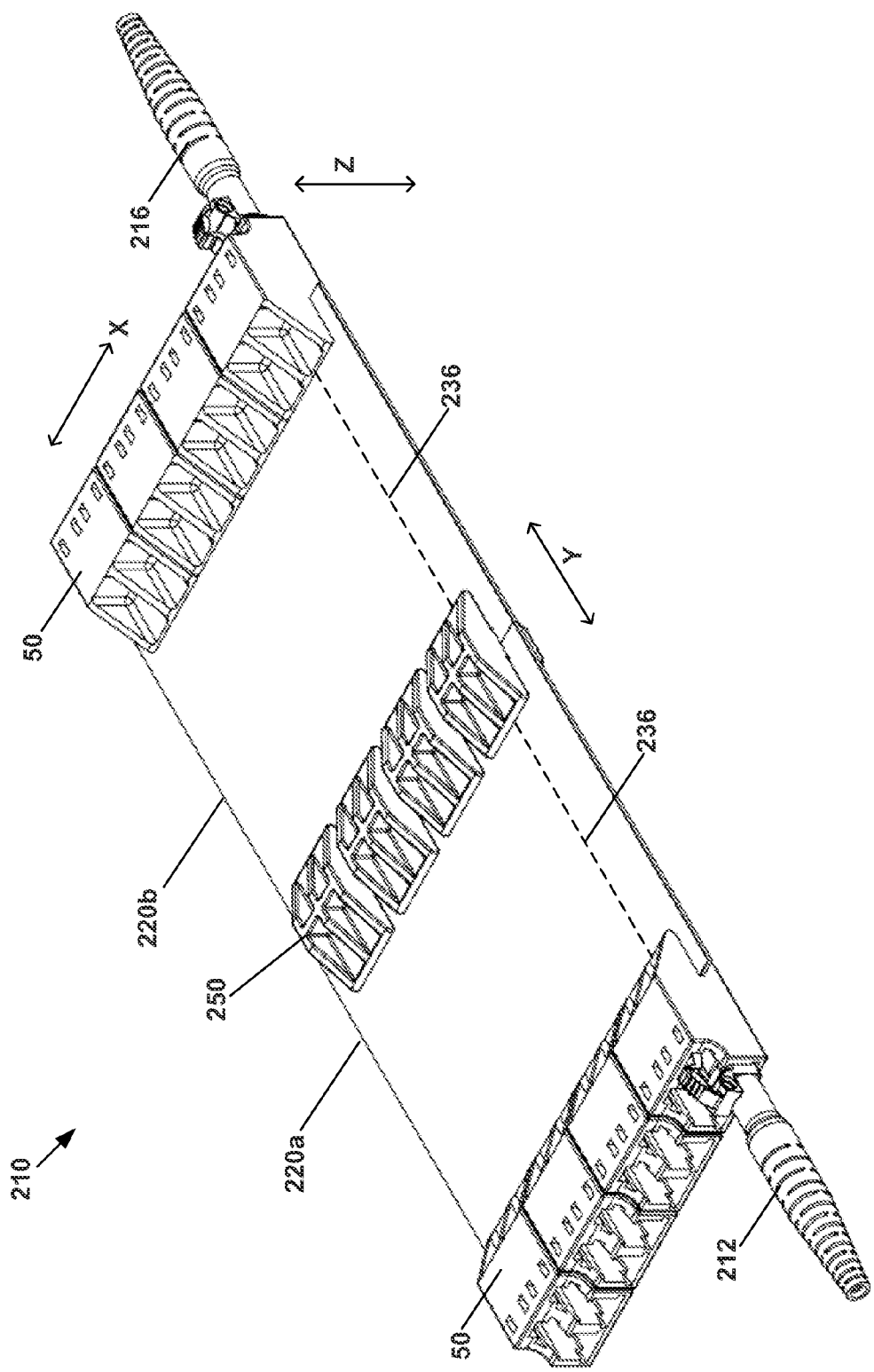
FIG. 13 shows a perspective view of a third embodiment of an assembled and connected optical waveguide module having features that are examples of aspects in accordance with the principles of the present disclosure.
Figure 14:
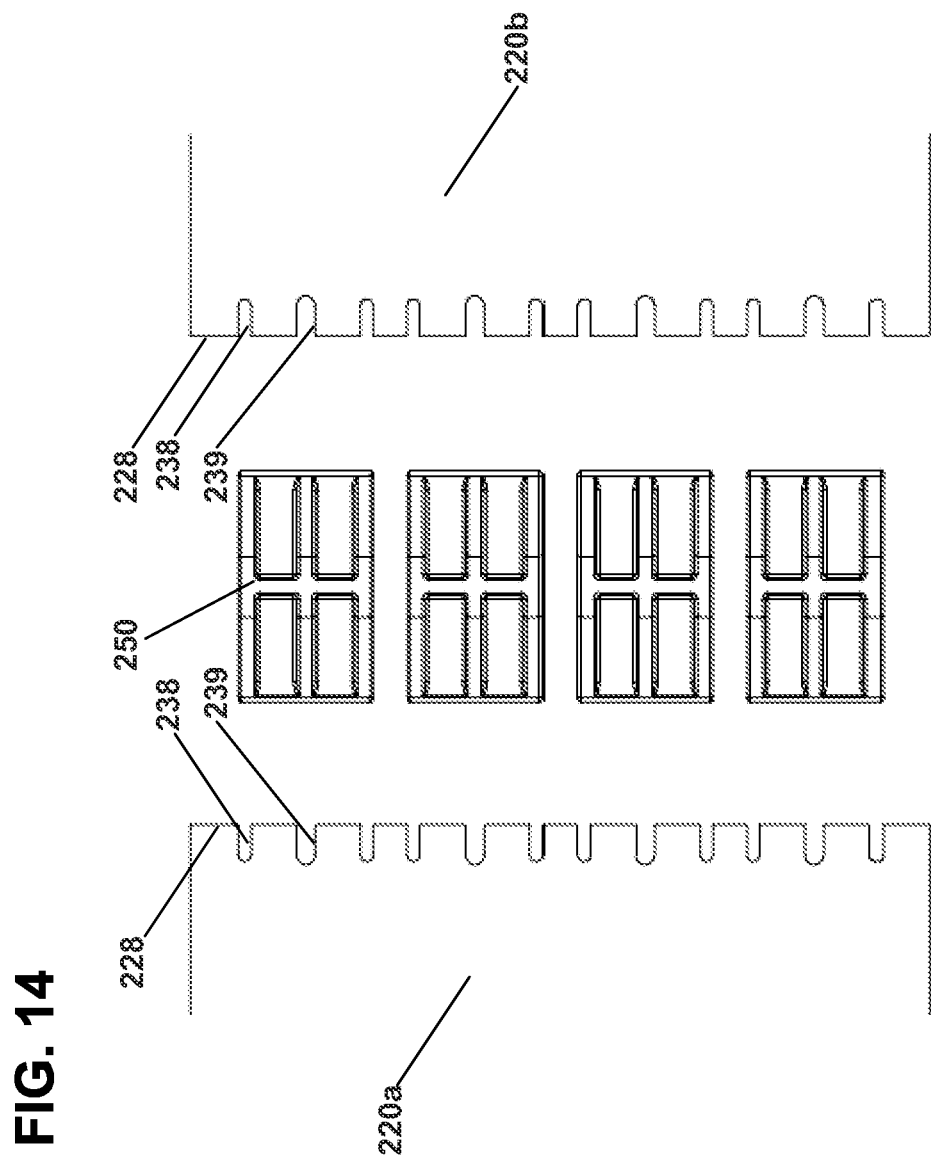
FIG. 14 shows an exploded top view of a center portion of the waveguide module shown in FIG. 13.

As shown, the connectors 150 have an adapter port 152 and a catch mechanism 156 for receiving and retaining an MPO type connector. Referring to FIGS. 10 and 11, each connector 150 has an alignment slot 160 having a first sidewall 162, a second sidewall 164, and a base portion 166 extending between the first and second sidewalls 162, 164. The first and second sidewalls 162, 164 engage with the first and second planar surfaces 124, 126 of the optical light guide 120, respectively. Each connector 150 is also shown as having a pair of protrusions 168 that interface with corresponding notches 138 in the planar optical light guide 120. Accordingly, the connector 150 and planar optical light guide 120 have features that align the adapter port 152 in the X, Y, and Z directions in generally the same manner as for the first embodiment.

Referring to FIGS. 13-17, a third embodiment of an optical waveguide module 210 is shown. As many of the concepts and features are similar to the first and second embodiments shown in FIGS. 1-12, the description for the first and second embodiments are hereby incorporated by reference for the third embodiment. Where like or similar features or elements are shown, the same reference numbers will be used where possible (e.g. reference number 250 instead of reference number 50 for the edge connector). The following description for the third embodiment will be limited primarily to the differences between this embodiment and previously described embodiments.

The primary difference for the third embodiment is that an edge connector 250 is provided that allows two planar optical light guides 220a, 220b to be connected together. As such, edge connector 250 enables a degree of platform modularity in that preassembled planar optical light guides having any number of different connector types and arrangements can be connected together to create an even larger number and variety of waveguide module 210 configurations.

Figure 15:
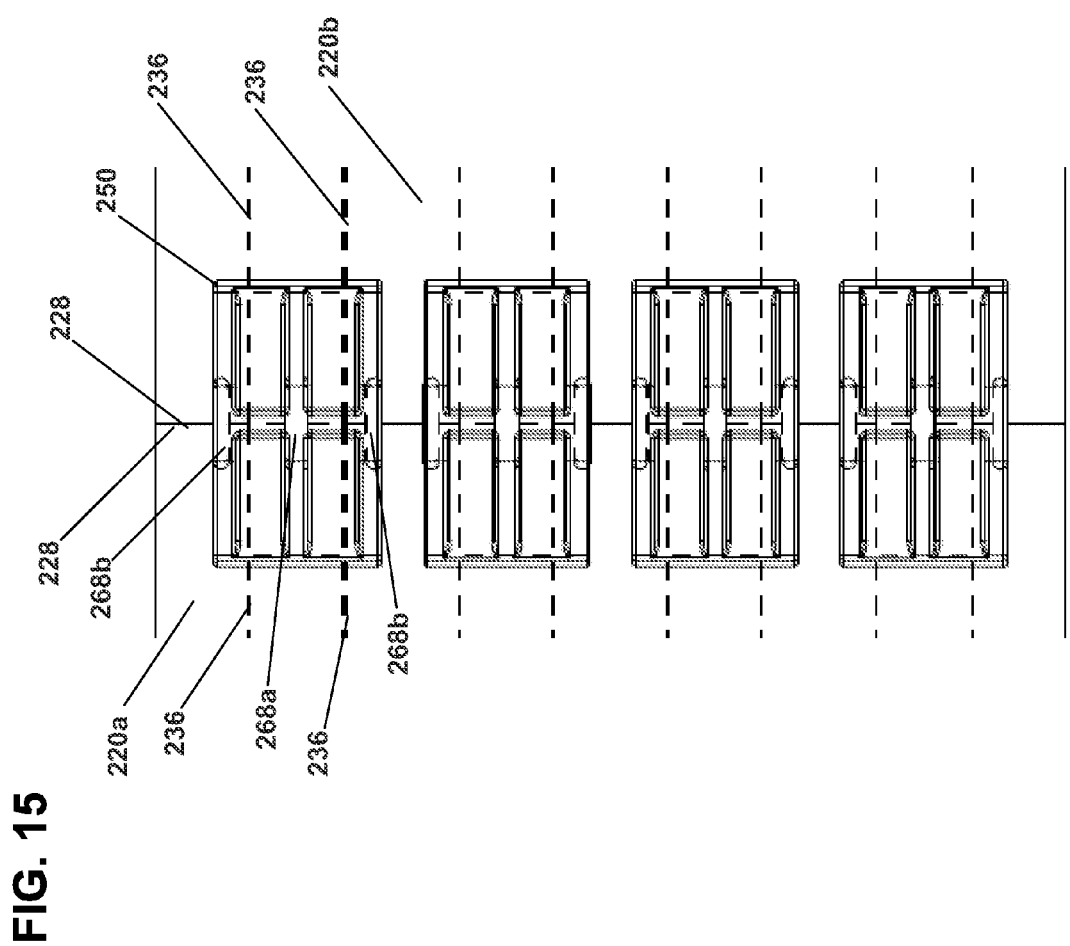
FIG. 15 shows a top view of the center portion of the waveguide module shown in FIG. 13.

As shown, the edge connector 250 joins the side edges 228 of two optical light guides 220a, 220b such that one or more first fiber optic connectors 212 can be placed in optical communication with one or more second fiber optic connectors 216. Referring to FIG. 15, it can be observed that the first side edges 228 are adjacent to each other when the optical light guides 220a, 220b are joined by connectors 250. An index matching film or gel may be applied to the first side edges 228 for protection and prevention of signal power loss.

Referring to FIGS. 16 and 17, the edge connector 250 is shown as having a first alignment slot 260a and a second alignment slot 260b opposite the first alignment slot 260a. The first alignment slot 260a has a first sidewall 262a and a second sidewall 264a that engage with the first and second planar surfaces 224, 226 of the optical light guides 220, respectively. The second alignment slot 260b has a first sidewall 262b and a second sidewall 264b that engage with the first and second planar surfaces 224, 226 of the optical light guide 220, respectively. As with other described embodiments, the alignment slots 260a, 260b ensure proper alignment between the optical pathways 236 of the light guides 220a, 220b in the Z direction.

The edge connector 250 is also provided with a central protrusion 268a and a pair of side protrusions 268b. The central protrusion engages with notches 239 in the light guide 220a, 220b while the side protrusions 268b engage with notches 238 in the light guide 220a, 220b. In the embodiment shown, notches 239 are larger than the notches 238, although variations are possible. The notches and protrusions cooperate to provide alignment of the optical pathways 236 of each light guide 220a, 220b in the X direction. Likewise, the length of the notches and protrusions can be selected to ensure a desired relative position along direction Y between the side edges 228 of the light guides 220a, 220b.

Figure 18:
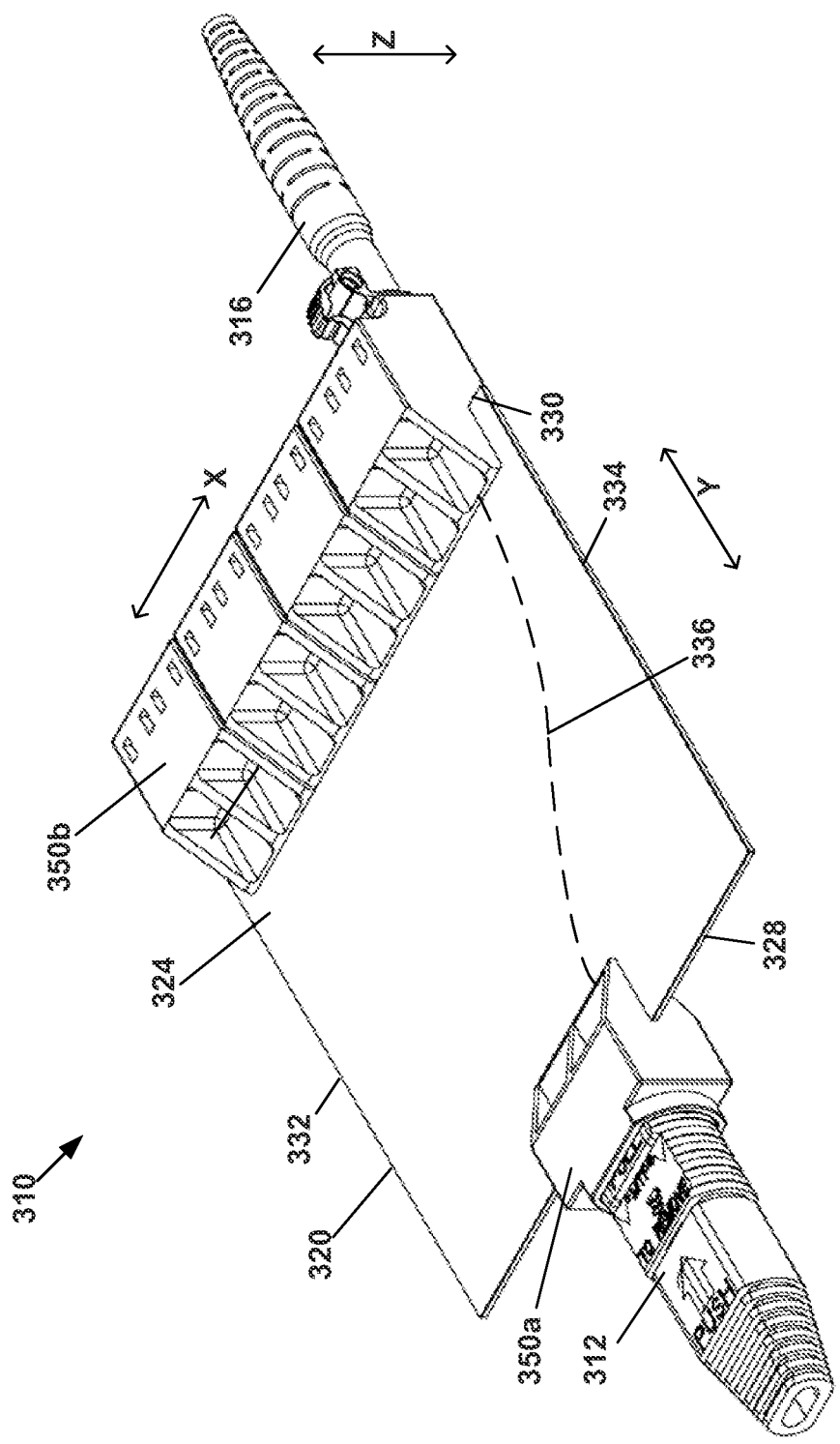
FIG. 18 shows a fourth embodiment of an assembled and connected optical waveguide module having features that are examples of aspects in accordance with the principles of the present disclosure.
Figure 19:
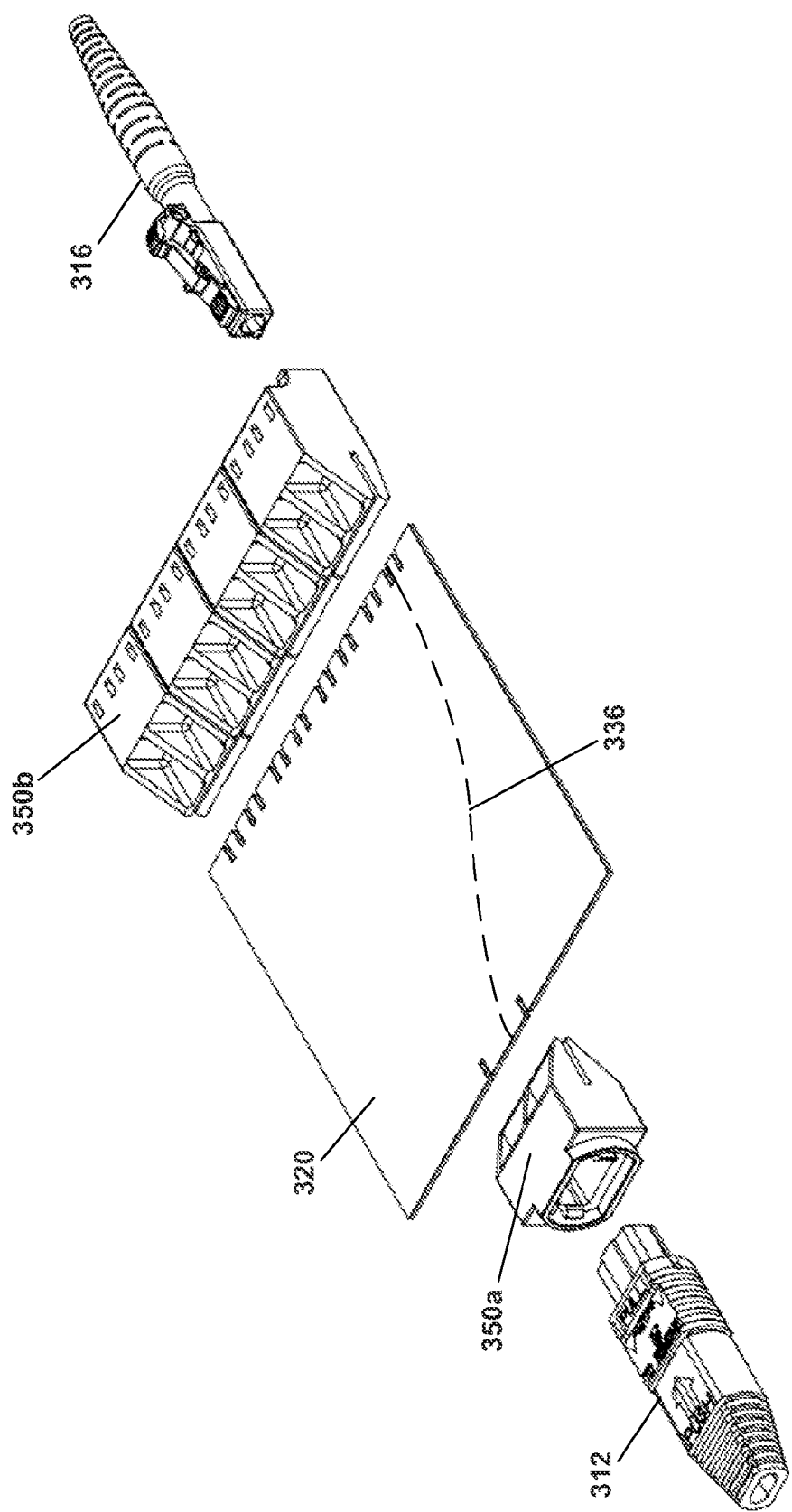
FIG. 19 is an exploded perspective view of the optical waveguide module shown in FIG. 18.

Referring to FIGS. 18-19, a fourth embodiment of an optical waveguide module 310 is presented. As many of the concepts and features are similar to the first and second embodiments shown in FIGS. 1-12, the description for the first and second embodiments are hereby incorporated by reference for the fourth embodiment. Where like or similar features or elements are shown, the same reference numbers will be used where possible (e.g. reference number 350 instead of reference number 50 for the edge connector). The following description for the fourth embodiment will be limited primarily to the differences between this embodiment and previously described embodiments.

The primary difference for the fourth embodiment is that the optical waveguide module 310 is provided as a distribution or furcation module in which a single side edge connector 350a distributes fiber optic pathways to a plurality of side edge connectors 350b, rather than there being a one-to-one relationship of oppositely positioned side edge connectors 50 or 150. More specifically, the fourth embodiment 310 shows a single side edge connector 350a having an adapter port for an MPO type fiber optic connector 312 from which optical pathways 336 are distributed across the optical light guide 320 to four side edge connectors having duplex adapter ports for LC type connectors 316.

It is noted that a typical MPO connector generally carries twelve optical fiber connections, and therefore the embodiment shown does not use four of the connections provided by the MPO connector. However, it is to be understood that optical waveguide module 310 could be configured with a sufficient number of LC type, or other types of side edge connectors 350b to utilize all or fewer of the available connections provided by the MPO type side edge connector 350a, as shown in later discussed embodiments.

Figure 20:
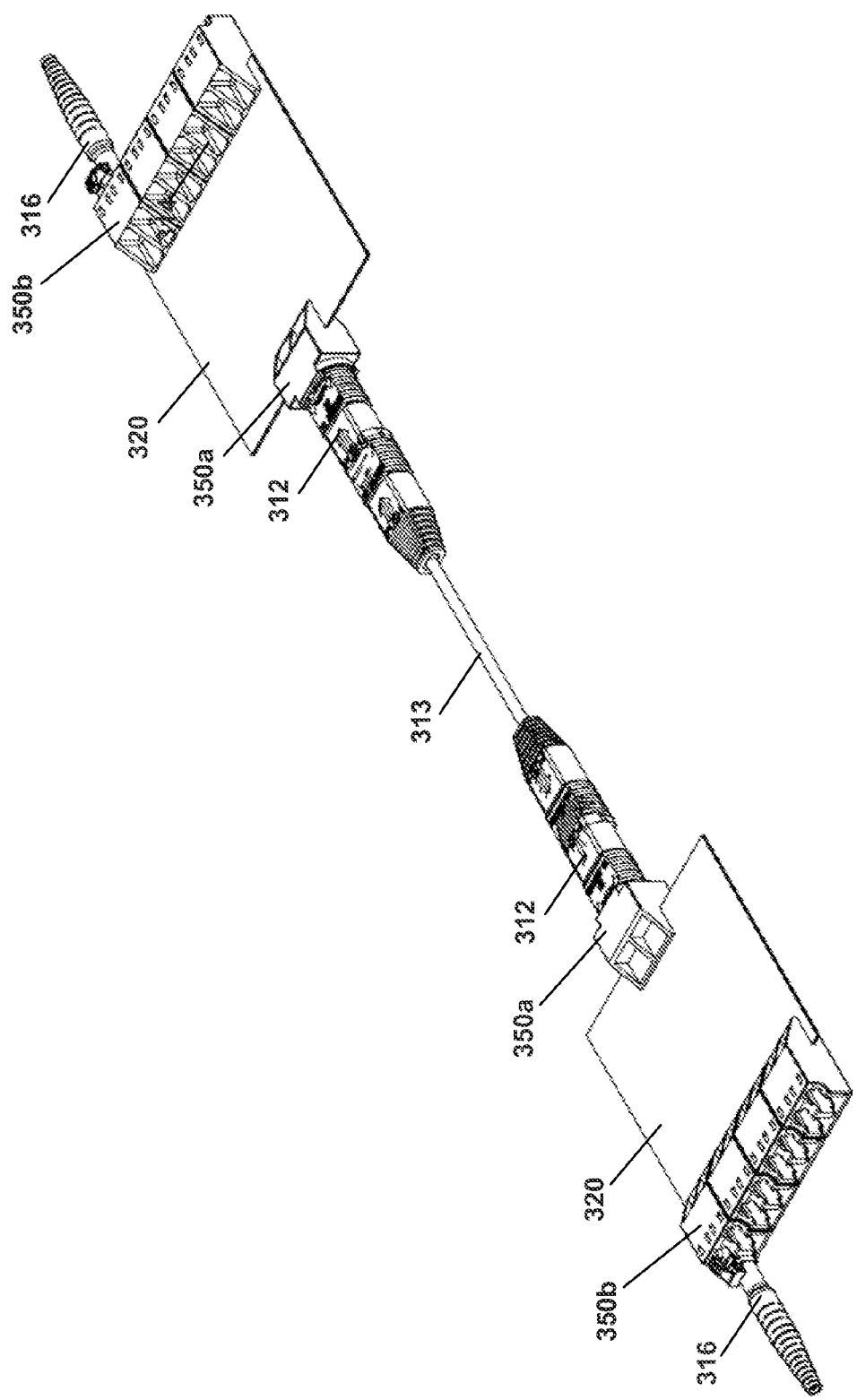
FIG. 20 shows a pair of the optical waveguide modules shown in FIG. 18 connected to each other.
Figure 21:
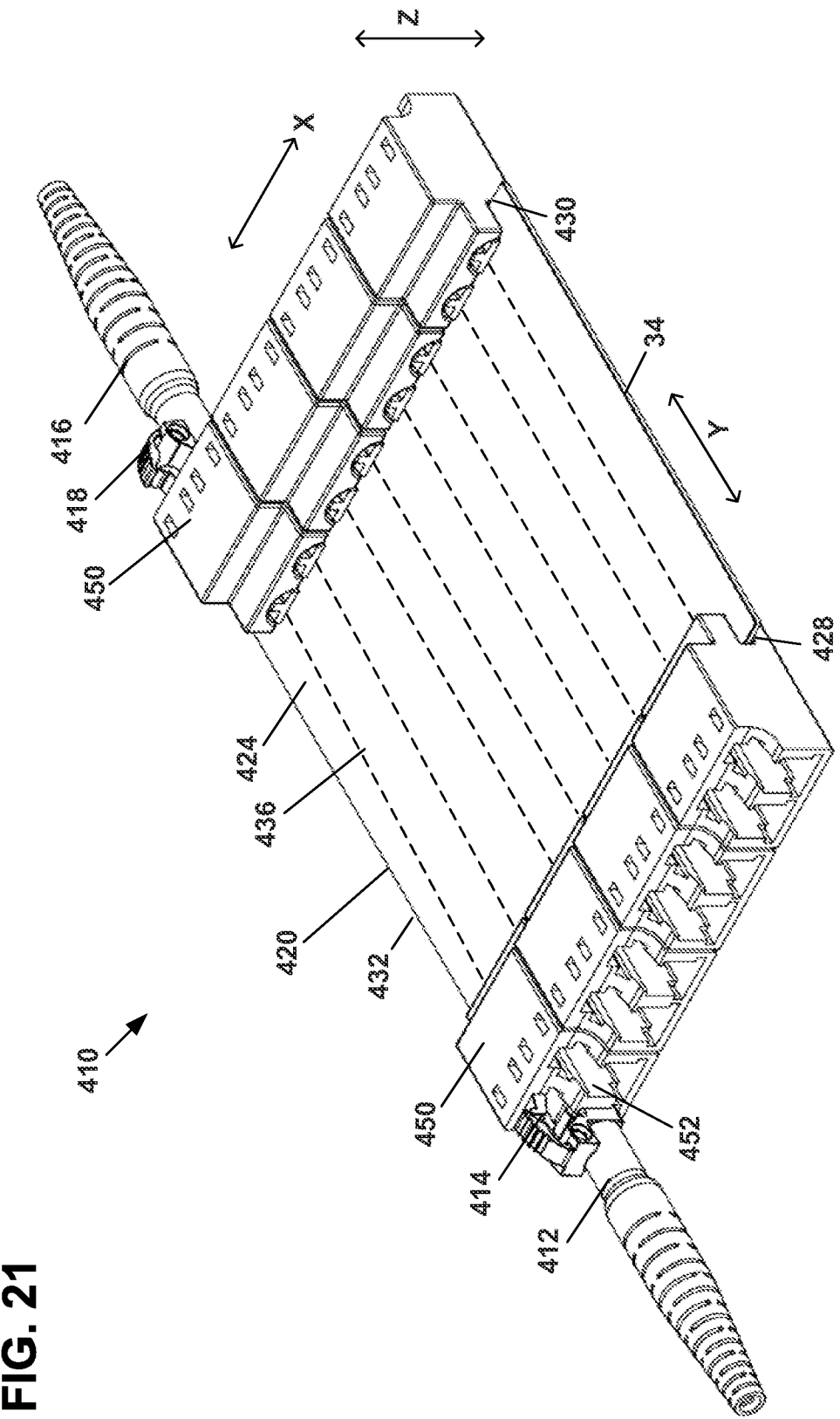
FIG. 21 shows a perspective view of a fifth embodiment of an assembled and connected optical waveguide module having features that are examples of aspects in accordance with the principles of the present disclosure.
Figure 22:
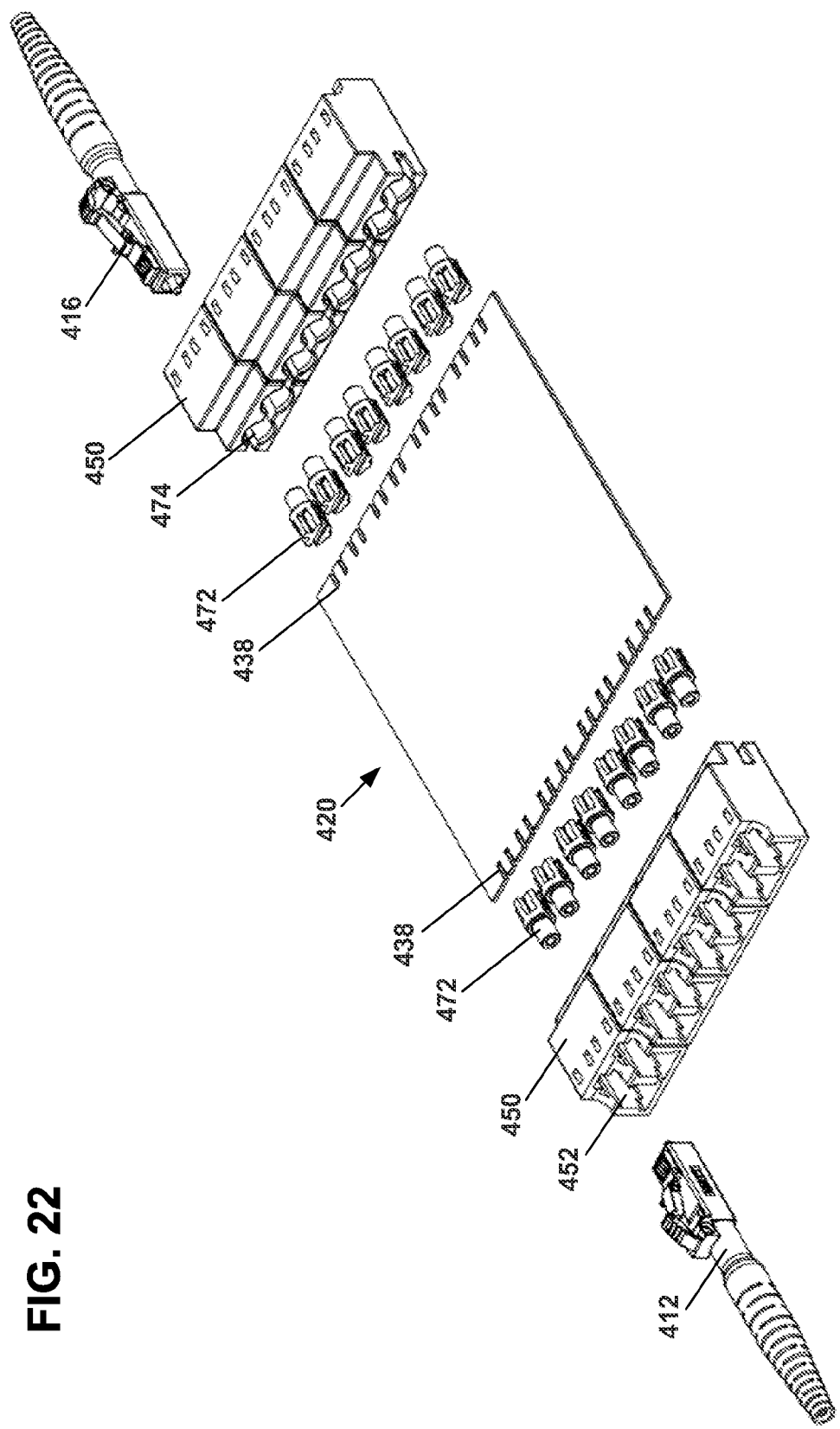
FIG. 22 shows an exploded perspective view of the optical waveguide module of FIG. 21.
Figure 23:
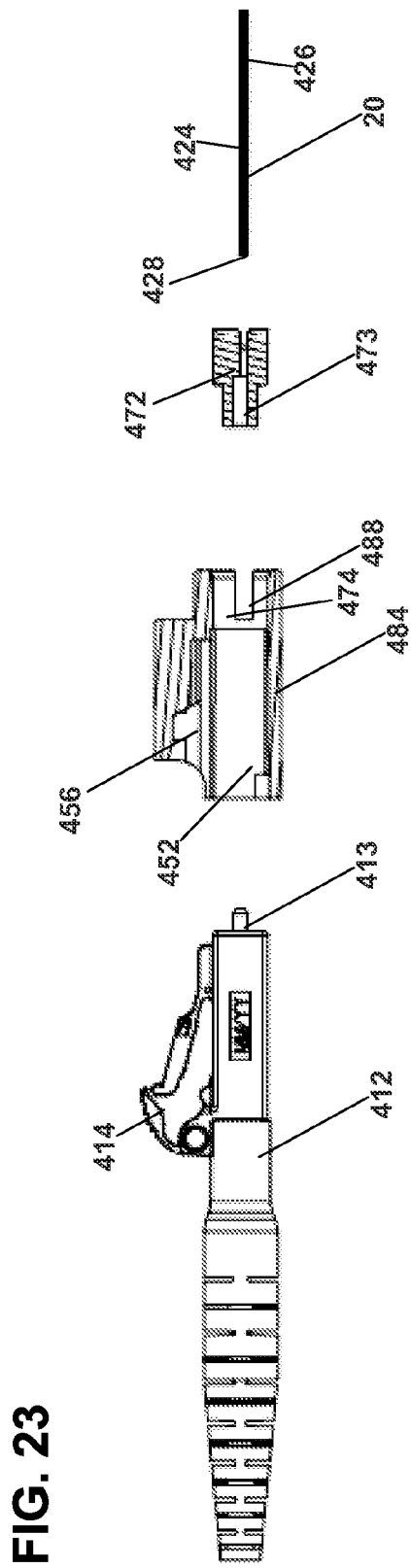
FIG. 23 shows an exploded cross-sectional side view of one end of the optical waveguide module of FIG. 21.
Figure 24:
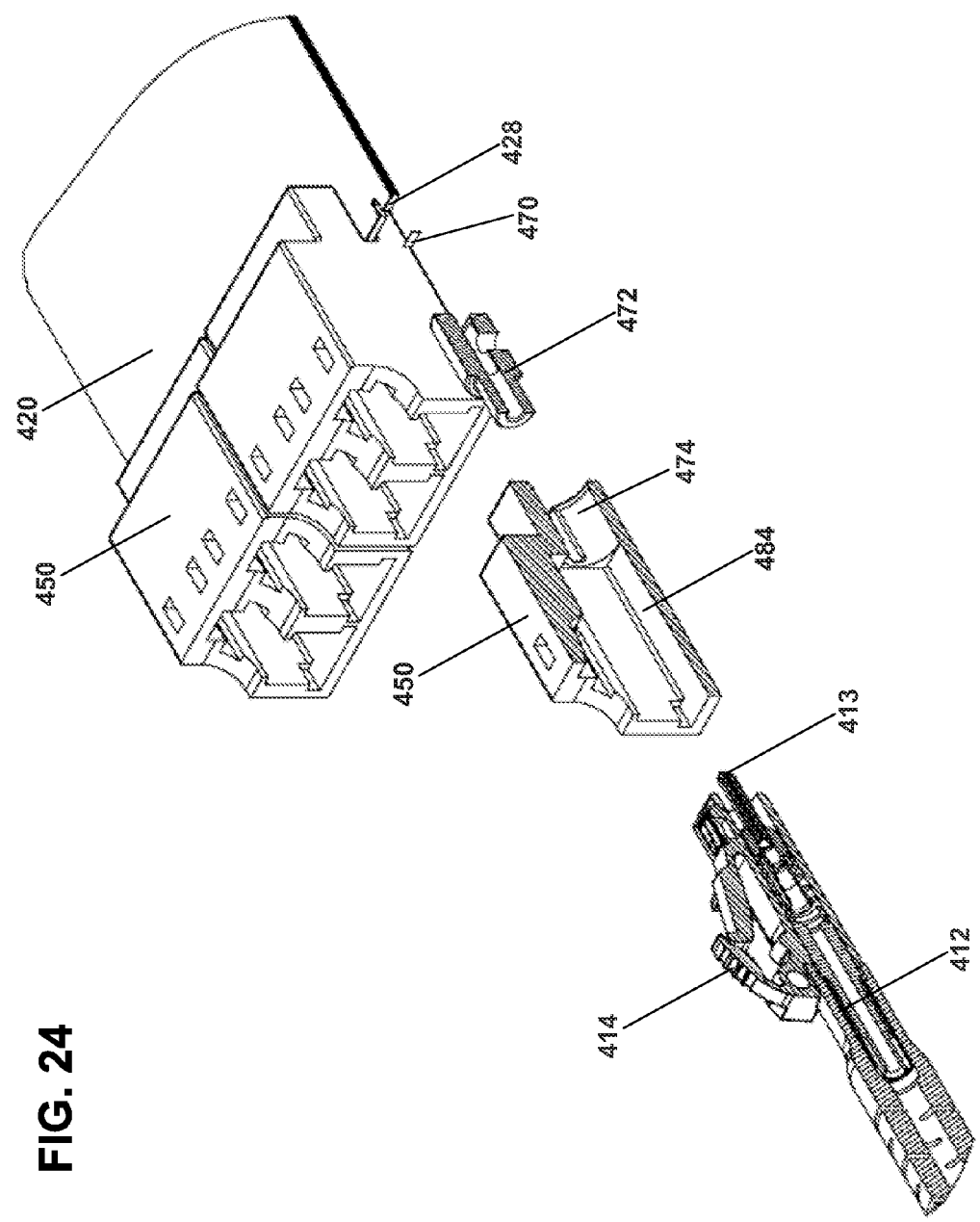
FIG. 24 shows an exploded perspective view of a portion of one end of the optical waveguide modules of FIG. 21, FIG. 32, and FIG. 43.
Figure 25:
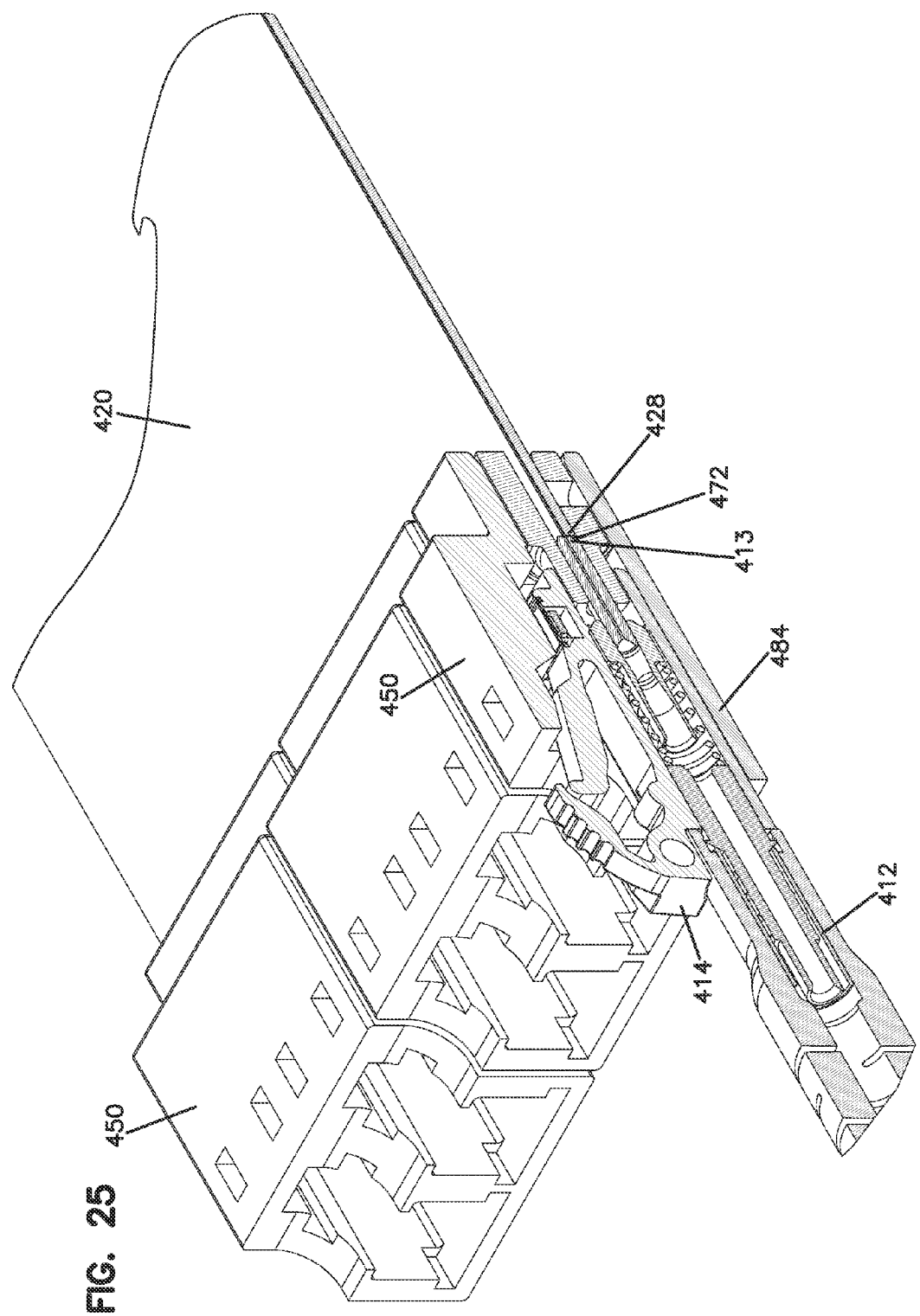
FIG. 25 shows a perspective view of a portion of one end of the optical waveguide modules of FIG. 21, FIG. 32, and FIG. 43 in an assembled state.

As shown, the side edge connector 350a and its engagement with the planar optical waveguide module 320 is the same as that for connector 150, and therefore will not be discussed further. Likewise, the side edge connectors 350b and their engagement with planar optical light guide 320 are the same as that for connector 50, and also do not need to be further discussed. However, the planar optical light guide 320 differs in that the optical pathways 336 are not provided in a straight line, as is the case for waveguides 20, 120, and 220. Instead, the optical pathways extend from a central location at the first side edge 328 and bend radially outwards to be further spaced apart at the second side edge 330. It is noted, because the dimensions and configuration of the optical pathways 336 can be precisely manufactured, the distance between the first and second side edges 328 and 330 can be significantly reduced, as compared to other types of optical furcation means. Referring to FIG. 20, a configuration is shown in which two optical waveguide modules 310 are connected to each other via a cable 313 having MPO type connectors 312 at each end.

Referring to FIGS. 21-31, a fifth embodiment of an optical waveguide module 410 is presented. As many of the concepts and features are similar to the previous embodiments shown in FIGS. 1-20, the description for the previous embodiments are hereby incorporated by reference for the fifth embodiment. Where like or similar features or elements are shown, the same reference numbers will be used where possible (e.g. reference number 450 instead of reference number 50 for the edge connector). The following description for the fourth embodiment will be limited primarily to the differences between this embodiment and previously described embodiments.

As shown, the optical waveguide module 410 includes a planar optical light guide 420 having features similar to that shown for the first embodiment 20 wherein the light guide 420 extends between a first side edge 428 and a second side edge 430 with a plurality of notches 438 being provided at each edge. The edge connectors 450 are shown as having LC duplex adapter ports 452, although other connector types may be used. However, the edge connectors 450 are different from previous embodiments in that the edge connectors 450 are provided with a two-piece design wherein a sleeve 472 is inserted into a cavity 474 of a body 484 of the edge connector 450.

As can be most easily seen at FIGS. 28-31, each sleeve 472 is provided with an internal passageway 473 extending into an alignment slot 460 and a pair of alignment protrusions 468 within the slot 460. As with previously discussed embodiments, the slot 460 sidewalls 462, 464 and the protrusions 468 engage with the first and second planar surfaces 424, 426 and the notches 438 of the optical light guide 420 to align the sleeve 472 in the X, Y, and Z directions. As shown, the protrusions 468 have rounded ends to enable easier initial insertion of the protrusions 468 into the notches 438.

Figure 27:
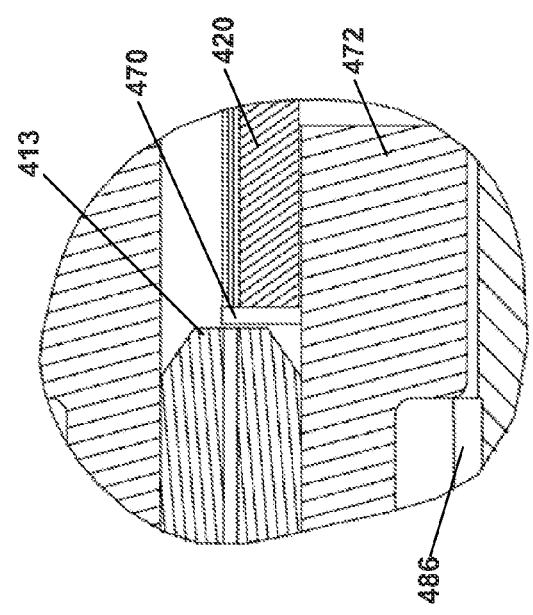
FIG. 27 shows an enlarged cross-sectional side view of a portion of the optical waveguide module of FIG. 26.
Figure 29:
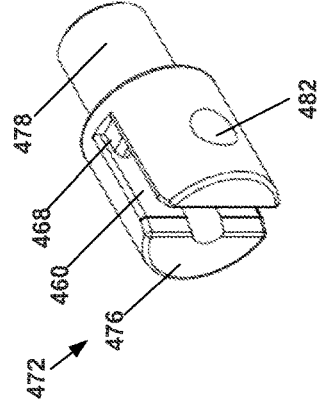
FIG. 29 is a second perspective view of the sleeve shown in FIG. 28.
Figure 31:
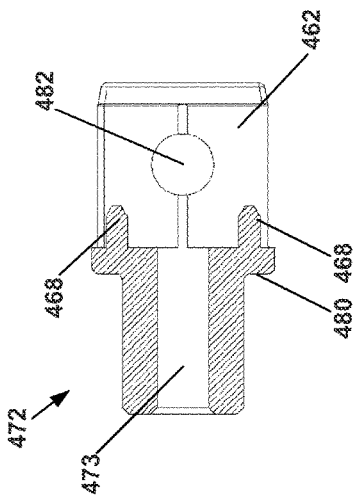
FIG. 31 is a cross-sectional top view of the sleeve shown in FIG. 28.
Figure 28:
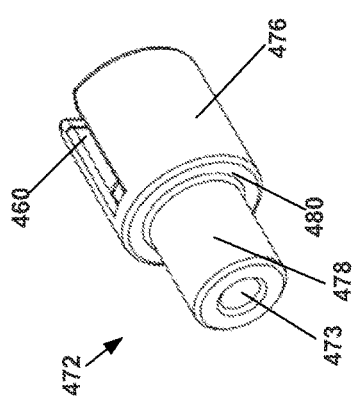
FIG. 28 shows a first perspective view of a sleeve that is part of the optical waveguide modules shown in FIG. 21, FIG. 32, and FIG. 43.
Figure 30:
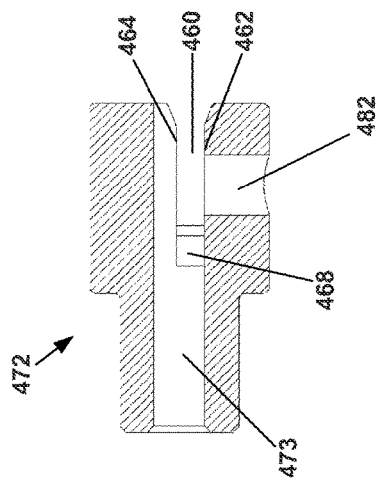
FIG. 30 is a cross-sectional side view of the sleeve shown in FIG. 28.
Figure 33:
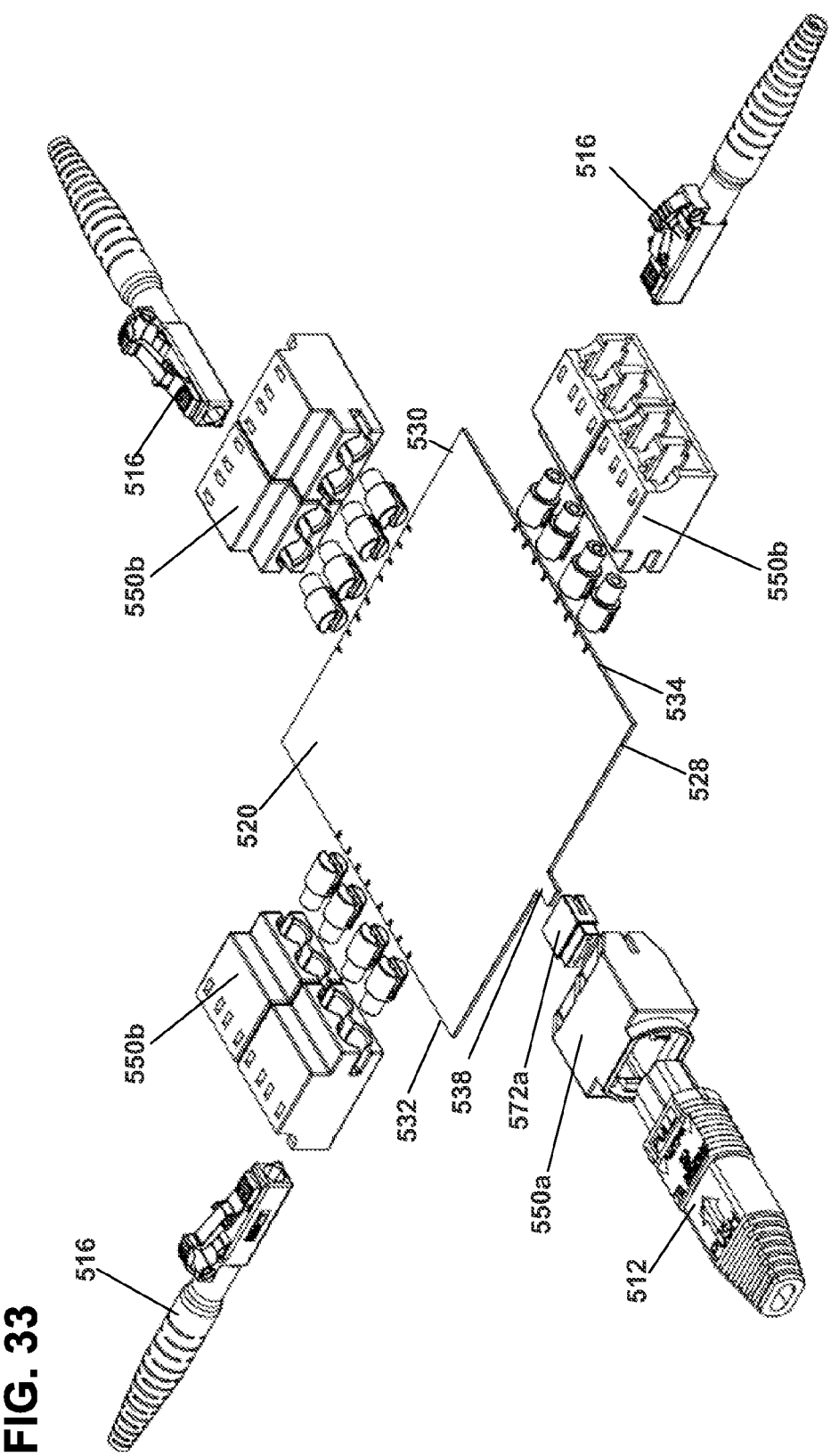
FIG. 33 shows an exploded perspective view of the optical waveguide module of FIG. 32.
Figure 35:
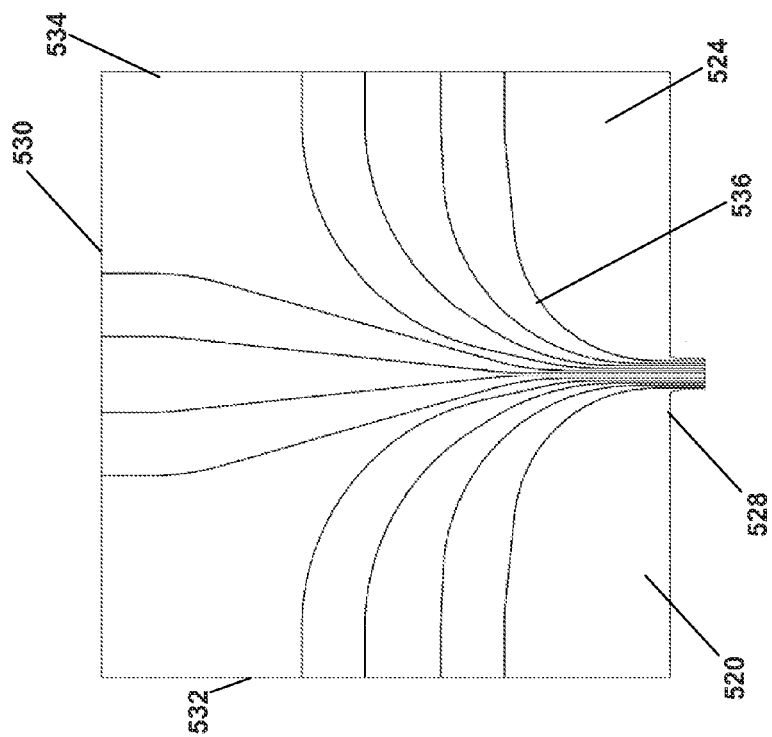
FIG. 35 shows a top view of an optical light guide of the optical waveguide module of FIG. 32.
Figure 34:
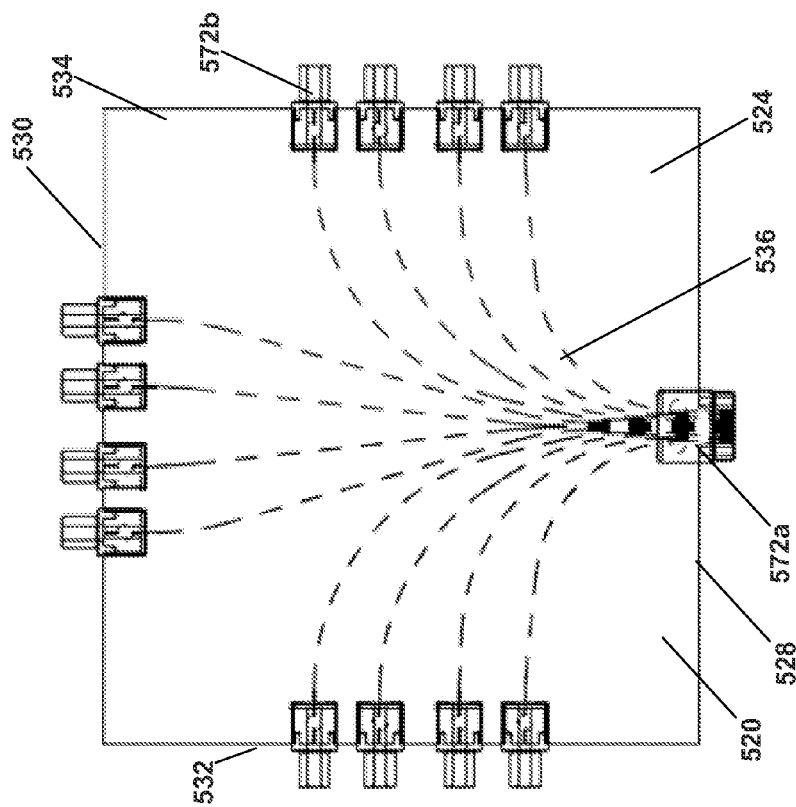
FIG. 34 shows a top view of an optical light guide and connector sleeves of the optical waveguide module of FIG. 32.
Figure 36:
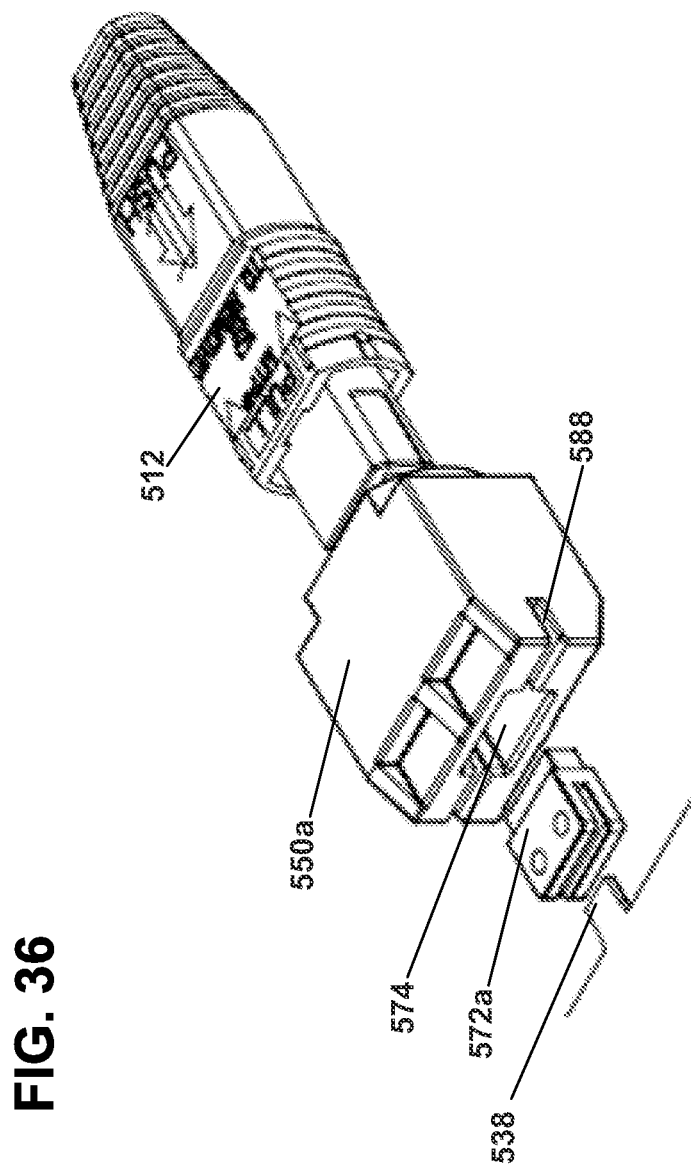
FIG. 36 shows a perspective exploded bottom view of one of the connectors associated with the optical waveguide module of FIG. 32.
Figure 37:
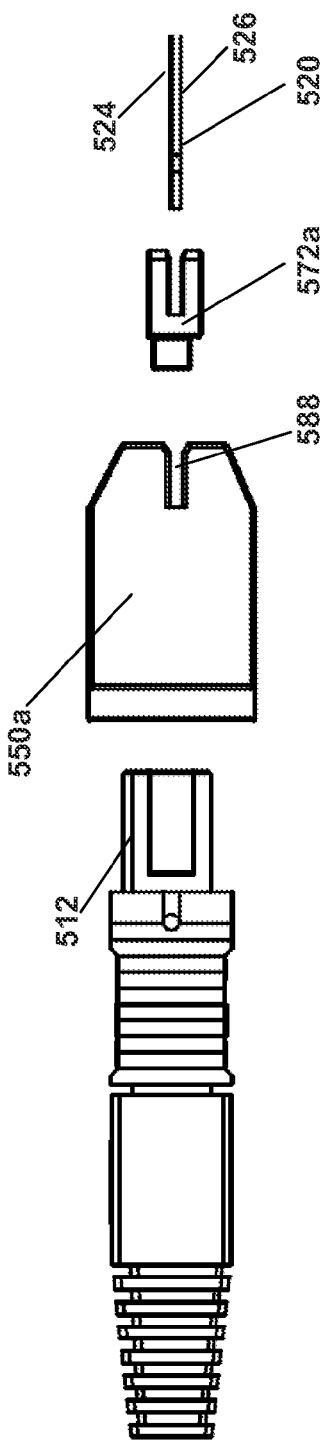
FIG. 37 shows a side view of a portion of the optical waveguide of FIG. 32.
Figure 38:
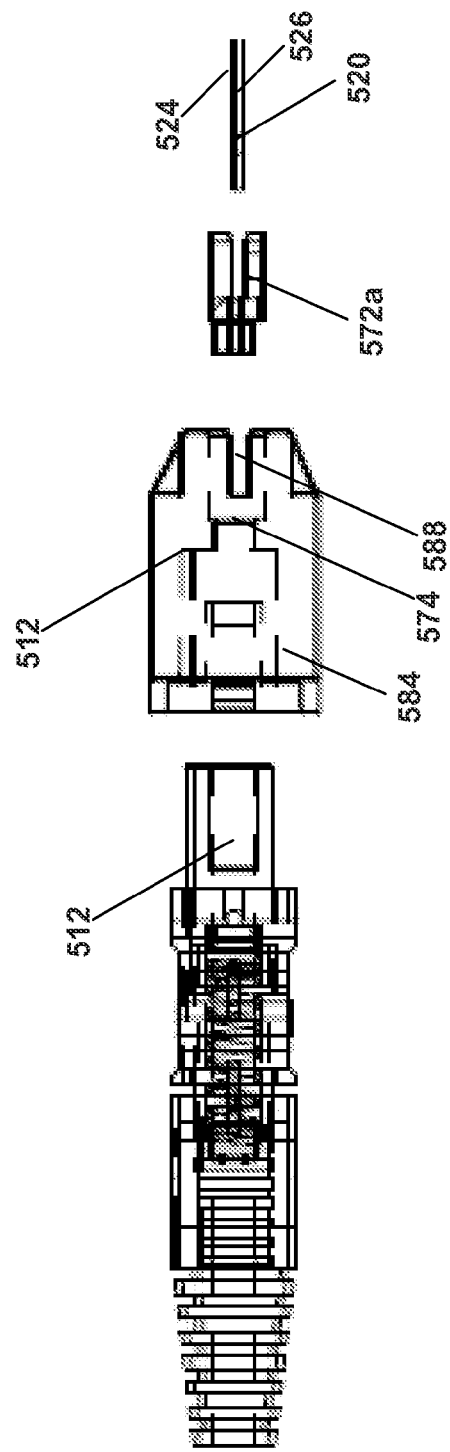
FIG. 38 shows an exploded side view of a portion of the optical waveguide of FIG. 32.
Figure 40:
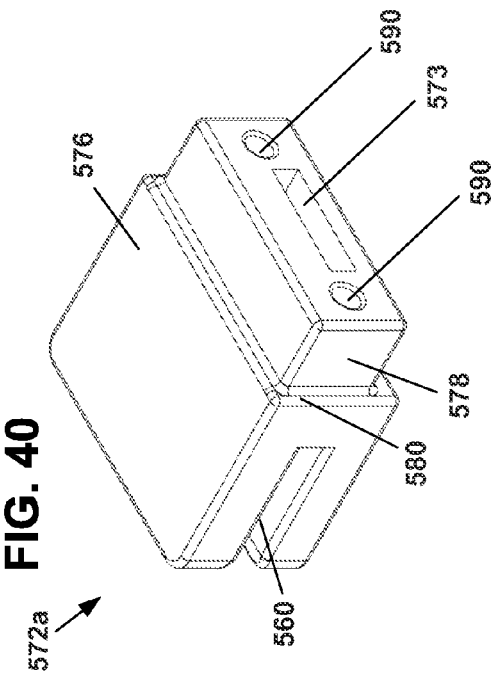
FIG. 40 is a second perspective view of the sleeve shown in FIG. 39.
Figure 42:
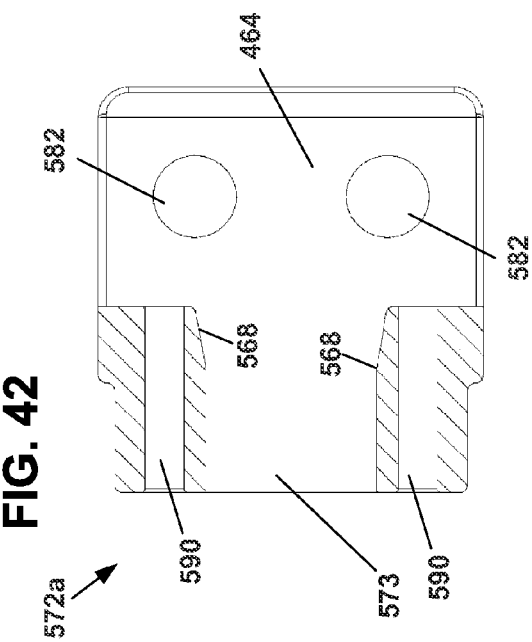
FIG. 42 is a cross-sectional top view of the sleeve shown in FIG. 39.
Figure 39:
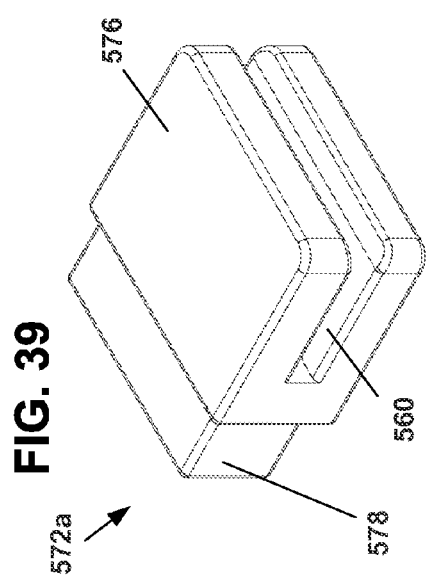
FIG. 39 shows a first perspective view of a sleeve that is part of the optical waveguide module shown in FIG. 32.
Figure 41:
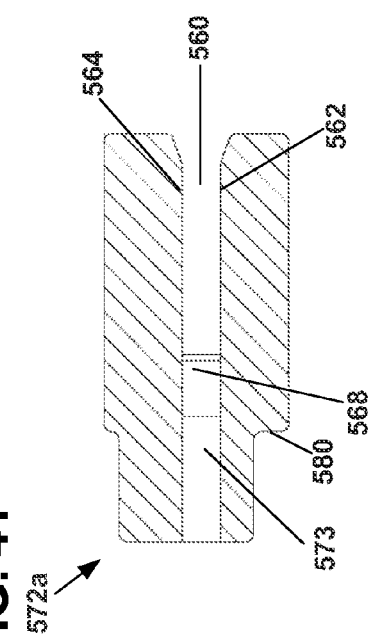
FIG. 41 is a cross-sectional side view of the sleeve shown in FIG. 39.

As shown, the sleeve 472 has a first portion 476 having a slot 460 with first and second sidewalls 462, 464. As most easily seen at FIG. 30, the sidewalls 462, 464 are provided with a chamfer type cut at their ends to enable easier initial insertion of the optical light guide 420 into the slot 460. The sleeve 472 also has a second portion 478 that has a smaller outside dimension than the first portion 476 such that a shoulder 480 is formed. As can be seen at FIG. 27, the shoulder 480 can provide a position stop for the sleeve 472 against a corresponding stop surface 486 on the connector body 484. When assembled, the sleeve first portion 476 fits tightly with the connector body cavity 474 such that adequate alignment between the internal passageway 473 and the adapter port 452 is maintained. To allow the connector body 484 to pass over the optical light guide surfaces 424, 426, an enlarged slot 488 is provided that does not come into contact with the optical light guide 420. However, slot 488 may be provided to tightly fit against the optical light guide first and second surfaces 424, 426 to further aid in alignment.

Figure 26:
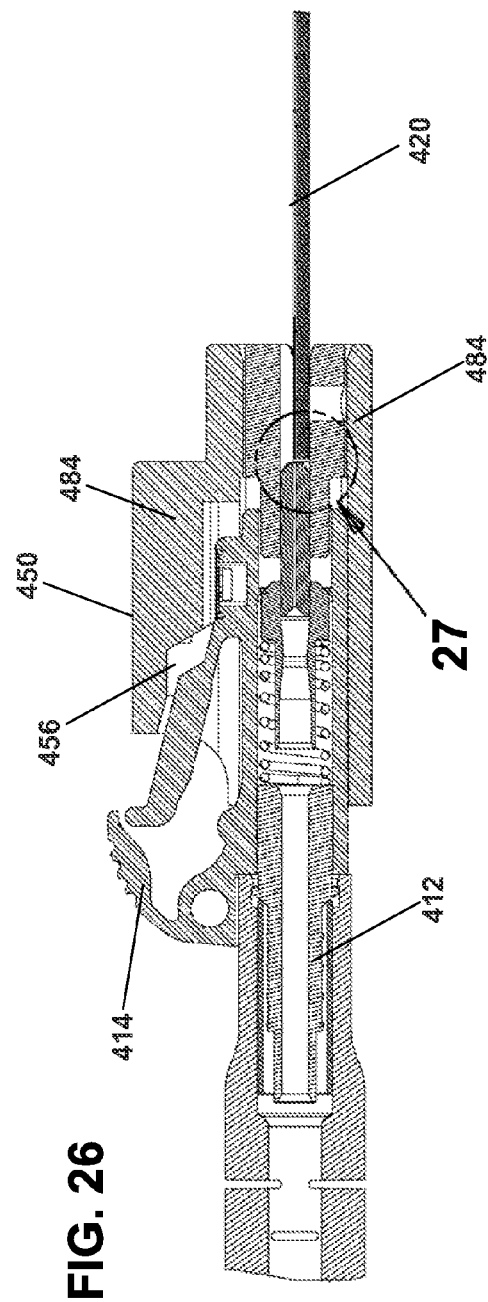
FIG. 26 shows a cross-sectional side view of one end of the optical waveguide modules of FIG. 21, FIG. 32, and FIG. 43 in an assembled state.

In one embodiment, the sleeve 472 is provided with an aperture 482 through which an adhesive, such as an epoxy, can be applied to secure the sleeve 472 to the optical light guide 420 and/or the edge connector body 484. As shown at FIGS. 26 and 27, an optional index matching film 470 may be provided.

Referring to FIGS. 32-42, a sixth embodiment of an optical waveguide module 510 is presented. As many of the concepts and features are similar to the previous embodiments shown in FIGS. 1-31, the description for the previous embodiments are hereby incorporated by reference for the sixth embodiment. Where like or similar features or elements are shown, the same reference numbers will be used where possible (e.g. reference number 550 instead of reference number 50 for the edge connector). The following description for the sixth embodiment will be limited primarily to the differences between this embodiment and previously described embodiments.

The sixth embodiment 510 is similar to the fifth embodiment, in that a plurality of two-piece type connectors is used for the optical light guide. The sixth embodiment 510 is also similar to the fourth embodiment, in that an optical waveguide module 510 is provided as a distribution or furcation module in which a single side edge connector 550a distributes fiber optic pathways to a plurality of side edge connectors 550b. As with the fourth embodiment, the sixth embodiment shows a single side edge connector 550a having an adapter port for an MPO type fiber optic connector 512 from which optical pathways 536 are distributed across the optical light guide 520, and in this case, to six side edge connectors 550b having duplex adapter ports for LC type connectors 516. However, the sixth embodiment is different in that a two-piece connector 550a with an MPO type adapter port is utilized, and in that the side edge connectors 550b are provided on three side edges 530, 532, 534 of the optical light guide 520. As the connectors 550b have already been discussed in detail for the fifth embodiment, they will not be discussed further.

As can be most easily seen at FIGS. 32-42, each sleeve 572a is provided with an internal passageway 573 extending into an alignment slot 560 and a pair of alignment walls 568 within the slot 560. It is noted that optical light guide 520 includes a protrusion 538 that engages with the walls 568 to align the sleeve 572a in the X direction and in the Y direction. As with previously discussed embodiments, the slot 560 sidewalls 562, 564 engage with the first and second planar surfaces 524, 526 of the optical light guide 520 to align the sleeve 572a in the Z direction. As shown, the alignment walls 568 have rounded ends to enable easier initial insertion of the sleeve 572a onto the protrusion 538. It is noted, that although the protrusion 538 and alignment wall 568 configuration is described for an MPO type connector, this configuration could also be used for other types of connectors, such as LC type connectors.

As shown, the sleeve 572a has a first portion 576 having a slot 560 with first and second sidewalls 562, 564. As most easily seen at FIG. 41, the sidewalls 562, 564 are provided with a chamfer type cut at their ends to enable easier initial insertion of the optical light guide 520 into the slot 560. The sleeve 572a also has a second portion 578 that has a smaller outside dimension than the first portion 576 such that a shoulder 580 is formed. In one embodiment, the shoulder 580 can provide a position stop for the sleeve 572a against a corresponding stop surface on the connector body 584. When assembled, the sleeve first portion 576 fits tightly with the connector body cavity 574 such that adequate alignment between the internal passageway 573 and the adapter port 552 is maintained. To allow the connector body 584 to pass over the optical light guide surfaces 524, 526, a slot 588 is provided that can be configured to not come into contact with the optical light guide 520 or configured to contact the first and second surfaces 524, 526 to additionally aid in alignment.

In one embodiment, the sleeve 572a is provided with apertures 582 through which an adhesive, such as an epoxy, can be applied to secure the sleeve 572a to the optical light guide 520 and/or the edge connector body 584. The sleeve 572a is also shown as being provided with receptacles 590 that are configured for receiving corresponding alignment pins on the connector 512. An optional index matching film 570 may be also provided on the side edges 528, 530, 532, and 534.

Figure 43:
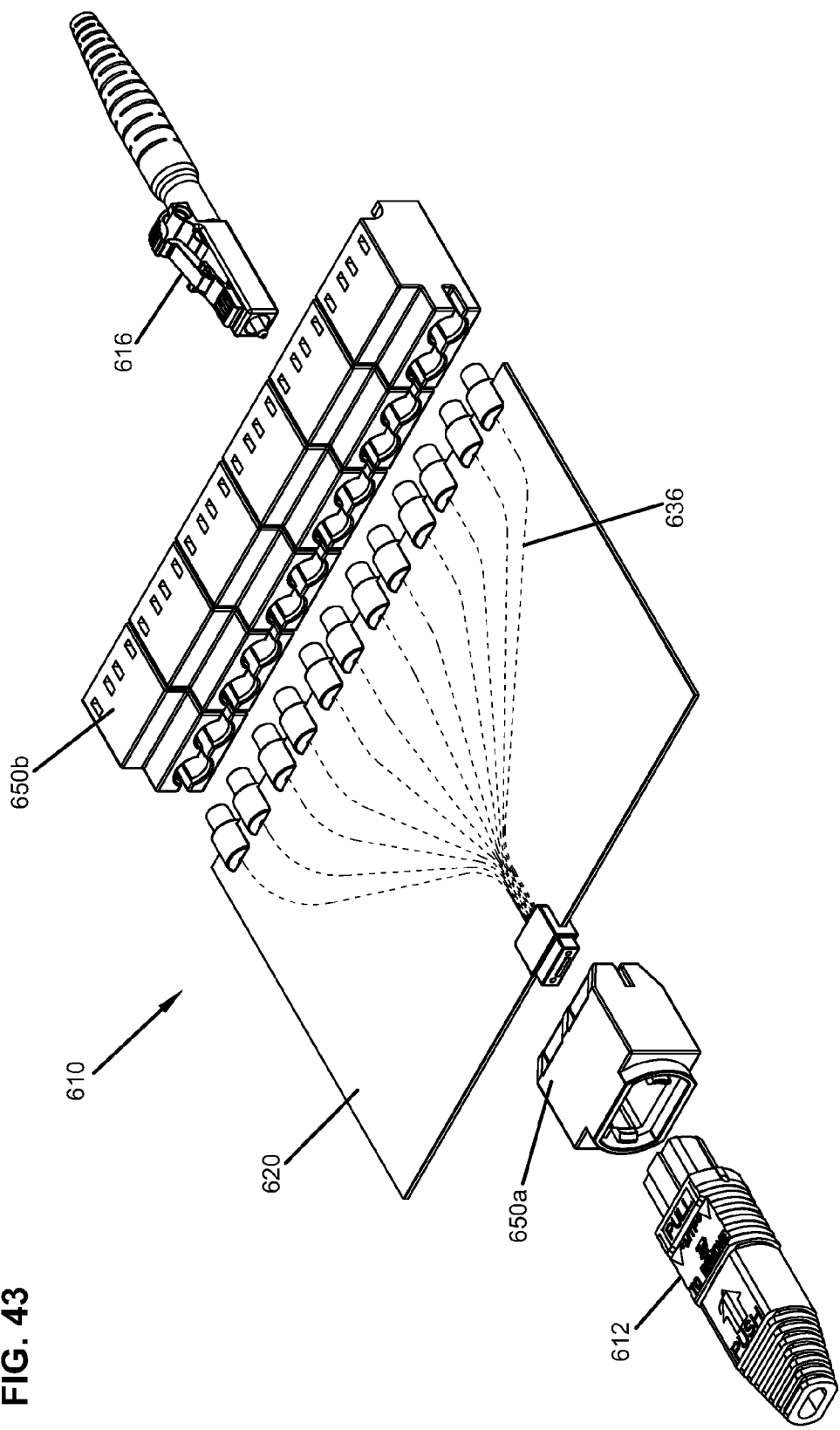
FIG. 43 shows a perspective view of a seventh embodiment of an assembled optical waveguide module having features that are examples of aspects in accordance with the principles of the present disclosure.

Referring to FIG. 43, a seventh embodiment of an optical waveguide module 610 is presented. As many of the concepts and features are similar to the previous embodiments shown in FIGS. 1-42, the description for the previous embodiments are hereby incorporated by reference for the sixth embodiment. Where like or similar features or elements are shown, the same reference numbers will be used where possible (e.g. reference number 650 instead of reference number 50 for the edge connector).

The seventh embodiment 610 is similar to the sixth embodiment 510, in that a plurality of two-piece type connectors is used for the optical light guide in a furcation application. The seventh embodiment 610 is also similar to the fourth embodiment in that all of the side edge connectors 650a, 650b are on opposite sides of the optical light guide 620. As with the sixth embodiment, the seventh embodiment shows a single side edge connector 650a having an adapter port for an MPO type fiber optic connector 612 from which optical pathways 636 are distributed across the optical light guide 620, and in this case, to six oppositely positioned side edge connectors 650b having duplex adapter ports for LC type connectors 616. As the connectors 650a, 650b have already been discussed in detail for the fifth and sixth embodiments, they will not be discussed further.

Referring to FIGS. 46-67, an eighth embodiment of an optical waveguide module 710 is presented. As many of the concepts and features are similar to the previous embodiments shown in FIGS. 1-45, the description for the previous embodiments are hereby incorporated by reference for the eighth embodiment. Where like or similar features or elements are shown, the same reference numbers will be used where possible (e.g. reference number 750 instead of reference number 50 for the edge connector). The following description for the eighth embodiment will be limited primarily to the differences between this embodiment and previously described embodiments.

The eighth embodiment 710 is similar to the fifth through seventh embodiments, in that a plurality of two-piece type connectors is used in conjunction with an optical light guide 720. The eighth embodiment 710 is also similar to the sixth embodiment in that an optical waveguide module 710 is provided as a distribution or furcation module in which a single side edge connector 750a distributes fiber optic pathways to a plurality of side edge connectors 750b. As with the sixth embodiment, the eighth embodiment shows a single side edge connector 750a having an adapter port for an MPO type fiber optic connector (e.g. 512) from which optical pathways 736 are distributed across the optical light guide 720, and in this case, to six side edge connectors 750b having duplex adapter ports for LC type connectors (e.g. 516). However, the eighth embodiment is different in that the two-piece MPO type adapter port connector 750a utilizes a sleeve 772a that engages with only one side 724 and an edge 728 of the optical light guide 720 instead of a slot that engages both sides (e.g. 24, 26) and the edge (e.g. 28) of the light guide 720. Similarly, the eighth embodiment is also different in that the LP type adapter port connector 750b utilizes a sleeve 772b that engages with only one side 724 and one edge 730, 732 or 734 of the optical light guide 720 instead of a slot that engages both sides (e.g. 24, 26) and an edge (e.g. 28) of the light guide 720. Accordingly, each edge connector 750a and 750b continues to have a slot 788 that extends across the sides 724 and 726 of the optical light guide 720, but in which the cavity 774 is only provided adjacent the side 724 of the light guide 720 at which the optical pathways 736 are provided.

As can be most easily seen at FIGS. 54-60, each sleeve 772b is provided with an internal passageway 773 extending into an alignment channel 760 with a pair of alignment protrusions 768 adjacent the channel 760. As shown, the channel is bounded by sidewalls 762 and planar surface 769 extending in a perpendicular direction from the sidewalls 762. As shown, the sleeve 772b has a first portion 776 including the channel 760 with the sidewalls 762. The sleeve 772b also has a second portion 778 through which passageway 773 extends and which forms a shoulder 780. The shoulder 780 can provide a position stop for the sleeve 772b against a corresponding stop surface on the connector body 750b, as shown for other embodiments. When assembled, the sleeve first portion 776 fits tightly with the connector body cavity 774 such that adequate alignment between the internal passageway 473 and the adapter port is maintained. To allow the connector 750b to pass over the optical light guide surfaces 724, 726, an enlarged slot 788 is provided that does not come into contact with the optical light guide 720. However, slot 788 may be provided to tightly fit against the optical light guide first and second surfaces 724, 726 to further aid in alignment. As shown for other embodiments, the sleeve 772b may be provided with an aperture through which an adhesive, such as an epoxy, can be applied to secure the sleeve 772b to the optical light guide 720 and/or the edge connector body 750b. An optional index matching film may also be provided.

Referring to FIGS. 61-67, sleeve 772a is shown in greater detail. As presented, each sleeve 772a is provided with a channel 773 configured to receive a tab portion 739 adjacent recess portions 741 of the optical light guide 720. The sleeve 772a is also shown as being provided with receptacles 790 that are configured for receiving corresponding alignment pins on the connector (e.g. connector 512). The sleeve 772a is also provided with alignment channels 760 with a pair of alignment protrusions 768 adjacent the channels 760. As shown, the channels 760 are bounded by sidewalls 762 and planar surfaces 769 extending in a perpendicular direction from the sidewalls 762. As shown, the sleeve 772a has a first portion 776 including the channels 760 with the sidewalls 762. The sleeve 772a also has a second portion 778 through which channel 773 extends and which forms a shoulder 780. The shoulder 780 can provide a position stop for the sleeve 772a against a corresponding stop surface on the connector body 750a, as shown for other embodiments. When assembled, the sleeve first portion 776 fits tightly with the connector body cavity 774 such that adequate alignment between the channel 773 and the adapter port is maintained. To allow the connector 750a to pass over the optical light guide surfaces 724, 726, an enlarged slot 788 is provided that does not come into contact with the optical light guide 720. However, slot 788 may be provided to tightly fit against the optical light guide first and second surfaces 724, 726 to further aid in alignment. As shown for other embodiments, the sleeve 772a may be provided with an aperture through which an adhesive, such as an epoxy, can be applied to secure the sleeve 772a to the optical light guide 720 and/or the edge connector body 750a. An optional index matching film may also be provided.

In one aspect, the planar surface 769 of each of the sleeves 772a, 772b engages with the side edge 728, 730, 732, or 734 of the optical light guide 720 to align the position of the sleeve 772a, 772b in the Y direction while the sidewalls 762 engage with the first planar surface 724 of the optical light guide 720 to align the sleeve in the Z direction. As with other embodiments, the protrusions 768 engage with notches 738 of the optical light guide 720 to align the sleeve 772a, 772b in the X direction. As shown, the protrusions 768 have rounded ends to enable easier initial insertion of the protrusions 768 into the notches 738. Because the sleeve 772a, 722b is provided with sidewalls 762 instead of a slot, the sleeve 772 can be installed onto the first surface 724 of the optical light guide 720 in a downward direction instead of sliding the sleeve onto the optical light guide 720 from one of the side edges 728, 730, 732, 734. Furthermore, the use of sidewalls 762 instead of a slot allow the sleeve 772a, 772b to be positioned onto the optical light guide 720 without reliance on the exact thickness of the optical light guide 720 for proper positioning of the sleeve 772a, 772b in the Z direction.

In contrast to other embodiments, and as most easily seen at FIGS. 52 and 53, the optical light guide 720 can be provided with notches 738 that extend only partially through the thickness of the optical light guide 720 at a first depth d from the first surface 724. In one embodiment, the notches 738 have a depth d that is the same as the thickness of the cladding layer 742, while in another embodiment, the notches 738 have a depth d that is equal to the thickness of the cladding layers 740 and 742. In another embodiment, the notches 738 extend through the cladding layers 740, 742 and into the base substrate layer 722. Of course, the notches 738 may also extend all of the way through the cladding layers 740, 742 and the base substrate layer 722 as with the other shown embodiments. Likewise, the other shown embodiments may be provided with notches that do not extend completely through the optical light guide as well. Where a partial depth notch 738 is provided, the protrusions 768 can be provided with a corresponding height h that is equal to or less than the depth d of the notch 738 such that the sidewalls 762 can engage with the first surface 724 of the optical light guide 720.

Because the sleeves 772a and/or 772b are provided with open sidewalls 762 and mounted in a downward direction onto the optical light guide 720, it is also possible to provide the notches 738 with shapes other than the longitudinal opening that would be normally associated with a slotted sleeve. By using a shape or shapes for the notch 738 that also extend in the X direction on the optical light guide 720 in conjunction with similarly shaped protrusions 768, the sleeves 772a and/or 772b can be fixed in both the X and the Y directions by the notch 738 engaging with the protrusion 768. Non-limiting examples of shapes that extend in the X and Y directions are intersecting orthogonal slots, as shown at FIG. 73, polygonal shapes (e.g. a circle, square, rectangle, etc.), and combinations of shapes having dimensions that extend in the X and Y direction, as shown at FIG. 74.

In one configuration, each sleeve 772a and/or 772b is aligned and mounted to the optical light guide 720 in a temporary fixture. In the temporary fixture, the sleeves 772a and/or 772b can be permanently attached to the optical light guide 720, for example with epoxy.

Referring to FIGS. 68-72, a ninth embodiment of an optical waveguide module 710' is presented that is generally similar to the eighth embodiment 710. As many of the concepts and features are similar to the previous embodiments shown in FIGS. 1-67, the description for the previous embodiments are hereby incorporated by reference for the ninth embodiment. Where like or similar features or elements are shown, the same reference numbers will be used where possible (e.g. reference number 750 instead of reference number 50 for the edge connector).

The ninth embodiment 710' is similar to the eighth embodiment 710, in that a plurality of two-piece type connectors with non-slotted sleeves is used for the optical light guide. The ninth embodiment 710' is also similar to the fifth embodiment in that all of the side edge connectors are on opposite sides of the optical light guide 720'. For the ninth embodiment, a plurality of LC-simplex type side edge connectors 750b' are provided at a first side edge 728' of the optical light guide 720' while a combination of LC-simplex type side edge connectors 750b' and LC-duplex type side edge connectors 750b are provide at a second opposite side edge 730' of the optical light guide 720'. As shown, five LC-simplex type edge connectors 750b' are provided on the first side edge for a total of five optical pathway connections. The second side edge includes three LC-simplex type edge connectors 750b' and two LC-duplex type side edge connectors 750b for a total of seven optical pathway connections. As most easily seen at FIG. 72, the optical light guide 720' for this embodiment is provided with three linear optical pathways 736 extending between the first and second side edges 728', 730' and between oppositely positioned connectors 750b'. The optical light guide 720' is also provided with two split pathways 736' that extend from the first side edge 728' and from a connector 750b' which split into a first pathway 736a and a second pathway 736b before reaching the second side edge 730' and a connector 750b. As the connectors 750a, 750b have already been discussed in detail they will not be discussed further for this embodiment.

In one embodiment, the above described connectors and sleeves are formed from a thermoplastic resin material, for example polyetherimide (PEI) thermoplastic resin. In one embodiment, the thermoplastic resin material is formed into the connectors and sleeves through the use of a micro molding process which allows for very high tolerances to be achieved.

The various embodiments described above describe a platform that will have minimum components and assembly processes with short lead-time and low cost for final module product. The embodiments can also be used for optical modules such as signal splitters (OLS/GPON), monitor testing (TAP), wavelength division multiplexing (WDM), transceivers for optical to electrical converters, backplane interconnects, physical layer management, and MEMS integration for optical cross-connects. Furthermore, as the side edge connectors are configured with adapter ports that receive standard fiber optic connectors, the fiber optic connectors and side edge connectors are easily connected and disconnected from each other in a repeatable fashion without the need for time consuming optical alignment procedures. Furthermore, the above described connectors and alignment features provide for fiber optic connectivity between the connectors and cores/pathways that satisfies international standard IEC-61754-20 (for LC connectors) and standard IEC-61754-7 (for MPO connectors).

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the disclosure. It is particularly noted that the disclosure is not limited to the discrete embodiments disclosed, as many combinations of features among and between the disclosed embodiments can be combined in a number of ways.

It is claimed:
1. An optical waveguide module comprising:
   a. an optical light guide having opposite first and second planar surfaces defining a first side edge and a second side edge, the optical light guide including one or more optical pathways extending to the first and second side edges, the optical light guide includes a plurality of notches at the first side edge;
   b. one or more first edge connectors, each first edge connector having a first sleeve received within a cavity of a first body, the first body having a first adapter port, the first sleeve having a first alignment slot opposite the first adapter port, the first alignment slot extending over the optical light guide first and second planar surfaces at the first side edge to align the first adapter port with the one or more optical pathways in a first direction, the first sleeve including an alignment protrusion engaging with one of the plurality of notches to align the first adapter port with the one or more optical pathways in a second direction that is orthogonal to the first direction; and
   c. one or more second edge connectors having a second adapter port aligned along the second side edge.

2. The optical waveguide module of claim 1, wherein the first adapter port of the one or more first edge connectors is an LC adapter port.

3. The optical waveguide module of claim 2, wherein the first adapter port of the one or more first edge connectors is a duplex LC adapter port.

4. The optical waveguide module of claim 1, wherein the first adapter port of the one or more first edge connectors is an MPO adapter port.

5. The optical waveguide module of claim 1, wherein the optical waveguide module includes a plurality of first edge connectors and a plurality of second edge connectors.

6. The optical waveguide module of claim 5, wherein the first adapter ports of the first edge connectors are LC duplex adapter ports and the second adapter ports of the second edge connectors are LC duplex adapter ports.

7. The optical waveguide module of claim 5, wherein the first adapter ports of the first edge connectors are MPO adapter ports and the second adapter ports of the second edge connectors are MPO adapter ports.

8. The optical waveguide module of claim 1, wherein the optical waveguide module includes a single first edge connector and a plurality of second edge connectors, the adapter port of the first edge connector being an MPO adapter port, the adapter ports of the second edge connector being LC duplex adapter ports.

9. The optical waveguide module of claim 8, wherein the first side edge and the second side edge are opposite each other.

10. The optical waveguide module of claim 1, further comprising:
   a. one or more third edge connectors, each third edge connector having a third sleeve received within a cavity of a third body, the third body having a third adapter port, the third sleeve having a third alignment slot opposite the third adapter port, the third alignment slot extending over the optical light guide first and second planar surfaces at a third side edge to align the third adapter port with the one or more optical pathways in the first direction; and
   b. one or more fourth edge connectors, each fourth edge connector having a fourth sleeve received within a cavity of a fourth body, the fourth body having a fourth adapter port, the fourth sleeve having a fourth alignment slot opposite the fourth adapter port, the fourth alignment slot extending over the optical light guide first and second planar surfaces at a fourth side edge to align the fourth adapter port with the one or more optical pathways in the first direction.

11. The optical waveguide module of claim 10, wherein the optical waveguide module includes a single first edge connector and a plurality of second, third, and fourth edge connectors, the adapter port of the first edge connector being an MPO adapter port, the adapter ports of the plurality of second, third, and fourth edge connectors being LC duplex adapter ports.

12. The optical waveguide module of claim 1, wherein the first body has an alignment slot that extends over the first and second planar surfaces of the optical light guide.

\* \* \* \* \*